(12) United States Patent
Minsky et al.

(10) Patent No.: US 12,165,073 B2
(45) Date of Patent: Dec. 10, 2024

(54) COMPUTER VISION LEARNING SYSTEM

(71) Applicant: Leela AI, Inc., Newtonville, MA (US)

(72) Inventors: Henry Bowdoin Minsky, Newton, MA (US); Milan Singh Minsky, Newton, MA (US); Cyrus Shaoul, Dummerston, VT (US); Max Carlson, Tallin (EE)

( * ) Notice: Subject to any disclaimer, the term of this patent is extended or adjusted under 35 U.S.C. 154(b) by 405 days.

(21) Appl. No.: 17/243,442

(22) Filed: Apr. 28, 2021

(65) Prior Publication Data

US 2021/0334544 A1 Oct. 28, 2021

Related U.S. Application Data

(60) Provisional application No. 63/016,598, filed on Apr. 28, 2020.

(51) Int. Cl.
*G06K 9/62* (2022.01)
*G06F 11/30* (2006.01)
(Continued)

(52) U.S. Cl.
CPC ......... *G06N 5/025* (2013.01); *G06F 11/3075* (2013.01); *G06F 16/2237* (2019.01);
(Continued)

(58) Field of Classification Search
CPC ...... G06V 10/70; G06V 10/74; G06V 10/764; G06V 10/776; G06V 10/82; G06V 10/84;
(Continued)

(56) References Cited

U.S. PATENT DOCUMENTS 9,262,698 B1 2/2016 George et al.
9,373,085 B1 6/2016 George et al.
(Continued)

OTHER PUBLICATIONS

Kai-yuh Hsiao, Steganie Tellex, Soroush Vosoughi, Rony Kubat and Deb Roy, "Object schemas for grounding language in a responsive robot", Connection Science, vol. 20, No. 4, Dec. 2008, pp. 253-276 (Year: 2008).*

(Continued)

*Primary Examiner* — Eric Rush
(74) *Attorney, Agent, or Firm* — Blueshift IP, LLC; Cynthia M. Gilbert

(57) ABSTRACT

A computer vision learning system and corresponding computer-implemented method extract meaning from image content. The computer vision learning system comprises at least one image sensor that transforms light sensed from an environment of the computer vision learning system into image data representing a scene of the environment. The computer vision learning system further comprises a digital computational learning system that includes a network of actor perceiver predictor (APP) nodes and a library of visual methods available to the APP nodes for applying to the image data. The digital computational learning system employs the network in combination with the library to determine a response to a query and outputs the response determined. The query is associated with the scene. The computer vision learning system is capable of answering queries not just about what is happening in the scene, but what would happen based on the scene in view of hypothetical conditions and/or actions.

48 Claims, 34 Drawing Sheets

(51) Int. Cl.
  *G06F 16/22* (2019.01)
  *G06F 16/2458* (2019.01)
  *G06F 18/20* (2023.01)
  *G06F 18/211* (2023.01)
  *G06F 40/279* (2020.01)
  *G06F 40/35* (2020.01)
  *G06N 3/04* (2023.01)
  *G06N 3/08* (2023.01)
  *G06N 5/02* (2023.01)
  *G06N 5/025* (2023.01)
  *G06V 10/70* (2022.01)
  *G06V 10/82* (2022.01)
  *G06V 20/40* (2022.01)

(52) U.S. Cl.
  CPC ........ *G06F 16/2477* (2019.01); *G06F 18/211* (2023.01); *G06F 18/29* (2023.01); *G06F 40/279* (2020.01); *G06F 40/35* (2020.01); *G06N 3/04* (2013.01); *G06N 3/08* (2013.01); *G06N 5/02* (2013.01); *G06V 10/70* (2022.01); *G06V 10/82* (2022.01); *G06V 20/41* (2022.01); *G06V 20/44* (2022.01); *G06T 2207/20081* (2013.01)

(58) Field of Classification Search
  CPC ........ G06V 10/86; G06V 10/96; G06V 20/40; G06V 20/41; G06V 20/44; G06V 20/56; G06V 20/58; G06V 2201/06; G06V 2201/07; G06N 3/006; G06N 3/02; G06N 3/04; G06N 3/044; G06N 3/0442; G06N 3/045; G06N 3/048; G06N 3/08; G06N 3/082; G06N 3/092; G06N 5/01; G06N 5/02; G06N 5/025; G06N 5/04; G06N 5/042; G06N 5/045; G06N 5/046; G06N 5/047; G06N 5/048; G06N 20/00; G06F 11/3075; G06F 16/2237; G06F 16/2477; G06F 16/3329; G06F 18/20; G06F 18/21; G06F 18/211; G06F 18/25; G06F 18/285; G06F 18/29; G06F 40/279; G06F 40/30; G06F 40/35; G06T 2207/20072; G06T 2207/20081; G06T 2207/20084; B25J 9/1602; B25J 9/161; B25J 9/1628; B25J 9/163; B25J 9/1656; B25J 9/1697
  USPC ....... 382/100, 103, 104, 153–159, 181, 224, 382/226, 227, 229; 706/12–16, 19, 21, 706/23, 25–30, 45–48; 700/1, 8, 9, 700/11–19, 28–31, 47, 48, 245, 246, 250, 700/253, 259; 701/1, 23–28, 40, 44, 59, 701/98, 117, 120
  See application file for complete search history.

(56) References Cited

U.S. PATENT DOCUMENTS

| | | | |
|---|---|---|---|
| 9,607,262 B2 | 3/2017 | George et al. | |
| 9,607,263 B2 | 3/2017 | George et al. | |
| 9,792,531 B2* | 10/2017 | Georgescu | G06T 7/0012 |
| 10,185,914 B2 | 1/2019 | Stone et al. | |
| 10,275,705 B2 | 4/2019 | George et al. | |
| 10,521,725 B2 | 12/2019 | Kansky et al. | |
| 10,799,798 B2* | 10/2020 | Aghdaie | A63F 13/822 |
| 10,885,388 B1 | 1/2021 | Kim | |
| 10,963,792 B1 | 3/2021 | Kim | |
| 11,120,303 B2* | 9/2021 | Albaghajati | G06V 10/774 |
| 11,210,585 B1* | 12/2021 | Heess | G06N 3/08 |
| 11,210,851 B1 | 12/2021 | Nussbaum | |
| 11,263,460 B1 | 3/2022 | Rattner | |
| 2006/0230008 A1 | 10/2006 | Burgener | |
| 2009/0144293 A1 | 6/2009 | Chowdhury | |
| 2010/0223216 A1* | 9/2010 | Eggert | G06V 10/95 706/12 |
| 2015/0099946 A1 | 4/2015 | Sahin | |
| 2018/0232436 A1 | 8/2018 | Elson | |
| 2018/0341632 A1 | 11/2018 | Akkiraju et al. | |
| 2019/0294673 A1 | 9/2019 | Sapugay | |
| 2019/0304157 A1 | 10/2019 | Amer | |
| 2019/0311036 A1 | 10/2019 | Shanmugan et al. | |
| 2019/0324795 A1* | 10/2019 | Gao | G06N 3/08 |
| 2019/0346272 A1* | 11/2019 | Banino | G06T 7/73 |
| 2019/0370686 A1 | 12/2019 | Pezzillo | |
| 2020/0166896 A1* | 5/2020 | Clune | G06V 20/56 |
| 2020/0226463 A1* | 7/2020 | Chen | G06N 3/045 |
| 2020/0380964 A1 | 12/2020 | Kang | |
| 2021/0073327 A1 | 3/2021 | Brunn | |
| 2021/0217418 A1 | 7/2021 | Wei | |
| 2021/0240851 A1 | 8/2021 | Badalone | |
| 2021/0279424 A1 | 9/2021 | Galitsky | |
| 2021/0279470 A1 | 9/2021 | Zadeh | |
| 2021/0334474 A1 | 10/2021 | Shaoul et al. | |
| 2021/0334544 A1 | 10/2021 | Minsky | |
| 2021/0334671 A1 | 10/2021 | Minsky et al. | |
| 2021/0334758 A1* | 10/2021 | Suchkov | G06V 40/20 |
| 2023/0267712 A1 | 8/2023 | Kommrusch | |

OTHER PUBLICATIONS

Filipo Studzinski Perotto, Jean-Christophe Buisson, Luis Otávio Alvares, "Constructivist Anticipatory Learning Mechanism (CALM)—dealing with partially deterministic and partially observable environments", Proceedings of the Seventh International Conference on Epigenetic Robotics, 2007, pp. 1-8 (Year: 2007).*
Garbis Salgian and Dana H. Ballard, "Visual Routines for Vehicle Control", Springer, The confluence of vision and control, 1998, pp. 244-256 (Year: 1998).*
International Search Report and Written Opinion mailed Jun. 19, 2023, in international patent application No. PCT/US2023/013725, 9 pages.
Dilek Hakkani-T?R et al, "Multi-Domain Joint Semantic Frame Parsing Using Bi-Directional RNN-LSTM", Interspeech 2016, (Sep. 8, 2016), vol. 2016, doi:10.21437/Interspeech.2016-402, ISSN 1990-9772, pp. 715-719, XP055406473.
International Search Report and Written Opinion for Int'l Application No. PCT/US2021/029722, titled: Natural Language System and Methods, Date of Mailing: Aug. 12, 2021. 9 pages.
PCT International Search Report and Written Opinion for International Application No. PCT/US2021/029717, entitled Learning Agent, mailed Oct. 14, 2021 23 pages.
PCT Invitation to Pay Additional Fees with Annex to Partial International Search Report and Provisional Opinion Accompanying the Partial Search Result for International Application No. PCT/US2021/029717, entitled "Learning Agent," mailed Aug. 19, 2021 17 pages.
Studzinski Perotto Filipo et al, "Constructivist Anticipatory Learning Mechanism (CALM): Dealing with Partially Deterministic and Partially Observable Environments", International Conference On Epigenetic Robotics (EPIROB), Piscataway, NJ, USA, Oct. 29, 2007-Nov. 2, 2007, (Nov. 2, 2007), pp. 117-127, URL: http://www.lucs.lu.se/LUCS/135/Perotto.pdf, (Aug. 3, 2021), XP055829984.
Baayen, R. Harold et al., "Comprehension without segmentation: a proof of concept with naïve discriminative learning," *Language, Cognition and Neuroscience*, pp. 1-23 (2015).
Chaput, Harold Henry, The Constructivist Learning Architecture: A Model of Cognitive Development for Robust Autonomous Robots, Report TR04-34, Artificial Intelligence Laboratory, The University of Texas at Austin, Austin, TX, Presented in Partial Fulfillment of the Requirements for the Degree of Doctor of Philosophy, 91 pages (Aug. 2004).
Drescher, Gary L., "Made-up Minds, A Constructivist Approach to Artificial Intelligence," The MIT Press, Cambridge, MA, 219 pages (1991).
Holmes, Michael P. and Charles Lee Isbell, Jr., "Schema Learning: Experience-Based Construction of Predictive Action Models," Advances

(56) References Cited

OTHER PUBLICATIONS in Neural Information Processing Systems, NIPS 2004, Vancouver, British Columbia, Canada, 8 pages (Dec. 13-18, 2004).

Horswill, Ian, "Visual routines and visual search: a real-time implementation and an automata-theoretic analysis," MIT Artificial Intelligence Laboratory, IJCAI'95: Proceedings of the 14th International Joint Conference on Artificial Intelligence, vol. 1: 7 pages (Aug. 1995).

Luxem, "Deep Latent Variable Models: Unravel Hidden Structures," Towards Data Science, Jul. 31, 2019.

Mahoney, James V., "Image Chunking: Defining Spatial Building Blocks for Scene Analysis," Master's Thesis, Technical Report AI-TR 980, MIT Artificial Intelligence Laboratory, Cambridge, MA, 189 pages (1987).

Mahoney, James V., "Signal-based figure/ground separation," Signal Geometry. Unpublished Technical Report, Xerox Palo Alto Research Center, 3333 Coyote Hill Rd., Palo Alto CA, 6 pages (1992).

Mahoney, James V., "Signal-based Visual Routines," Xerox Palo Alto Research Center, 3333 Coyote Hill Rd., Palo Alto CA, 32 pages (Jan. 24, 1994).

Marr, D., "Early Processing of Visual Information," Massachusetts Institute of Technology Artificial Intelligence Laboratory, A.I. Memo No. 340, 67 pages (Dec. 1975).

McCallum, Andrew Kachites, "Learning Visual Routines with Reinforcement Learning," In AAAI Fall Symposium 1996, Dept. of Computer Science, University of Rochester, Rochester, NY, pp. 82-86 (1996).

Mnih, Volodymyr et al., "Playing Atari with Deep Reinforcement Learning," 9 pages (Dec. 19, 2013).

Mugan, Jonathan and Benjamin Kuipers, "Learning Distinctions and Rules in a Continuous World through Active Exploration," In Proceedings of the International Conference on Epigenetic Robotics (EpiRob-07), 8 pages (2007).

Rao, Satyajit, "Visual Routines and Attention," Ph.D. Thesis, Massachusetts Institute of Technology, Dept. of Electrical Engineering and Computer Science, 93 pages (1998).

Salgian, Garbis and Dana H. Ballard, "Visual Routines for Autonomous Driving," In Proceedings of the 6$^{th}$ ICCV, Bombay, India, 7 pages (Jan. 4-7, 1998).

Salgian, Garbis, Supervised by: Dana H. Ballard, "Tactical Driving Using Visual Routines," Department of Computer Science, The College Arts and Sciences, University of Rochester, Rochester, NY, 95 pages (1998).

Ullman, Shimon and Amnon Sha'ashua, "Structural Saliency: The Detection of Globally Salient Structures Using a Locally Connected Network," Technical Report A.I. Memo No. 1061, Massachusetts Institute of Technology Artificial Intelligence Laboratory, Cambridge, MA, 24 pages (Jul. 1988).

Ullman, Shimon et al., "A model for discovering 'containment' relations," *Cognition*, 183: 67-81 (Feb. 2019).

Ullman, Shimon, "Visual routines," *Cognition*, 18: 97-159, (1984).

Whitehead, Steven D., Supervised by: Dana H. Ballard, "Reinforcement Learning for the Adaptive Control of Perception and Action," Technical Report 406, University of Rochester, Dept. of Computer Science, Submitted in Partial Fulfillment of the Requirements for the Degree of Doctor of Philosophy, 180 pages (Feb. 1992).

Yarbus, Alfred L., "Eye Movements and Vision," Institute for Problems of Information Transmission, Academy of Sciences of the USSR, Moscow, Translation Editor: Lorrin A. Riggs, 121 pages (1967).

Hakkani-Tür, et al., "Multi-Domain Joint Semantic Frame Parsing Using Bi-Directional RNN-LSTM," Interspeech 2016, vol. 2016, Sep. 8, 2016, pp. 715-719.

Kommrusch, et al., "Self-Supervised Learning for Multi-Goal Grid World: Comparing Leela and Deep Q Network," Proceedings of Machine Learning Research, Feb. 27, 2020 (Feb. 27, 2020), pp. 81-97.

Perotto, Filipo Studzinski et al., "Constructivist Anticipatory Learning Mechanism (CALM)—dealing with partially deterministic and partially observable environments," International Conference on Epigenetic Robotics (EPIROB), Piscataway, NJ, USA, pp. 117-127 (Nov. 2, 2007).

Perotto, Filipo Studzinski et al., "Learning Regularities with a Constructivist Agent," Proceedings of the International Joint Conference on Autonomous Agents and Multiagent Systems, ACM, 2 Penn Plaza, Suite 701, New York, NY 10121-0701, USA, pp. 807-809 (May 8, 2006).

PCT Invitation to Pay Additional Fees with Annex to Partial International Search Report and Provisional Opinion Accompanying the Partial Search Result for International Application No. PCT/US2021/029712, entitled "Computer Vision Learning System," mailed Aug. 5, 2021.

PCT International Search Report and Written Opinion for International Application No. PCT/US2021/029712, entitled "Computer Vision Learning System," mailed on Sep. 28, 2021.

Office Action (Non-Final Rejection) dated Aug. 3, 2023 for U.S. Appl. No. 17/302,260 (pp. 1-27).

Office Action (Non-Final Rejection) dated Sep. 21, 2023 for U.S. Appl. No. 18/113,247 (pp. 1-10).

Office Action (Final Rejection) dated Jan. 8, 2024 for U.S. Appl. No. 18/113,247 (pp. 1-15).

Baldassarre, Gianluca. "Planning with neural networks and reinforcement learning." (2001). (Year: 2001).

Office Action (Final Rejection) dated Feb. 13, 2024 for U.S. Appl. No. 17/302,260 (pp. 1-22).

Office Action (Non-Final Rejection) dated Jul. 18, 2024 for U.S. Appl. No. 18/113,247 (pp. 1-8).

Office Action (Non-Final Rejection) dated Sep. 16, 2024 for U.S. Appl. No. 17/302,260 (pp. 1-20).

Office Action (Non-Final Rejection) dated Oct. 7, 2024 for U.S. Appl. No. 17/243,445 (pp. 1-26).

\* cited by examiner

SCHEMA S:

SCHEMA S:

SCHEMA S:

| AI Approach | Neural Nets | Bayesian | Rules Based | APN-based |
|---|---|---|---|---|
| High accuracy pattern recognition | ✓ | | | Can inc NNs |
| Trainable by example | ✓ | ✓ | | ✓ |
| Knowledge is reusable | | | ✓ | ✓ |
| Learning is self-supervised | | | ✓ | ✓ |
| Explainability | | | | ✓ |
| On the fly concept formation | | | | ✓ |
| Planning integrated w learning | | | | ✓ |
| Learns multiple goals simultaneously | | | | ✓ |
| NLU is grounded | | | | ✓ |

FIG. 5

GRAYSCALE THRESHOLD ROUTINE

CONNECTED COMPONENT LABELING AND COUNTING ROUTINE

1. Free examination

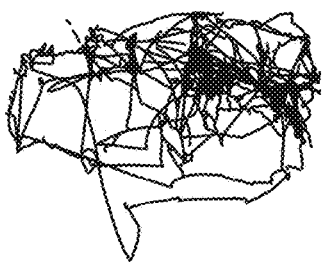

2. Estimate material circumstances of the family

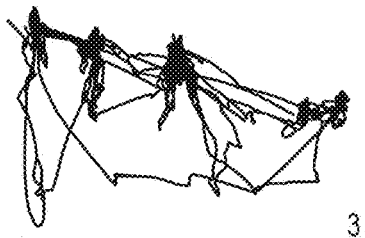

3. Give the ages of the people.

4. Surmise what the family had been doing before the arrival of the unexpected visitor.

5. Remember the clothes worn by the people.

3 min. recordings of the same subject

6. Remember positions of people and objects in the room.

7. Estimate how long the visitor had been away from the family.

FIG. 9G
(PRIOR ART)

(a) IS THE TABLE BETWEEN THE TWO PEOPLE?

(b) HOW MANY COUNTRIES DOES THE EQUATOR PASS THROUGH IN THIS MAP?

(c) IS THE GREEN ROD TOUCHING THE RED BOX?

(d) HOW MANY CUPS ARE THERE ON THE GREEN BOOK?

(e) WHAT IS THE HUMAN POINTING TO?

(f) WHICH IS THE SMALLEST WEDGE IN THIS PIE-CHART?

(g) IS THE BLUE BALL FALLING?

(h) DOES EVERY PLATE HAVE A CUP?

(i) WHICH PERSON IS CLOSER TO THE DOOR?

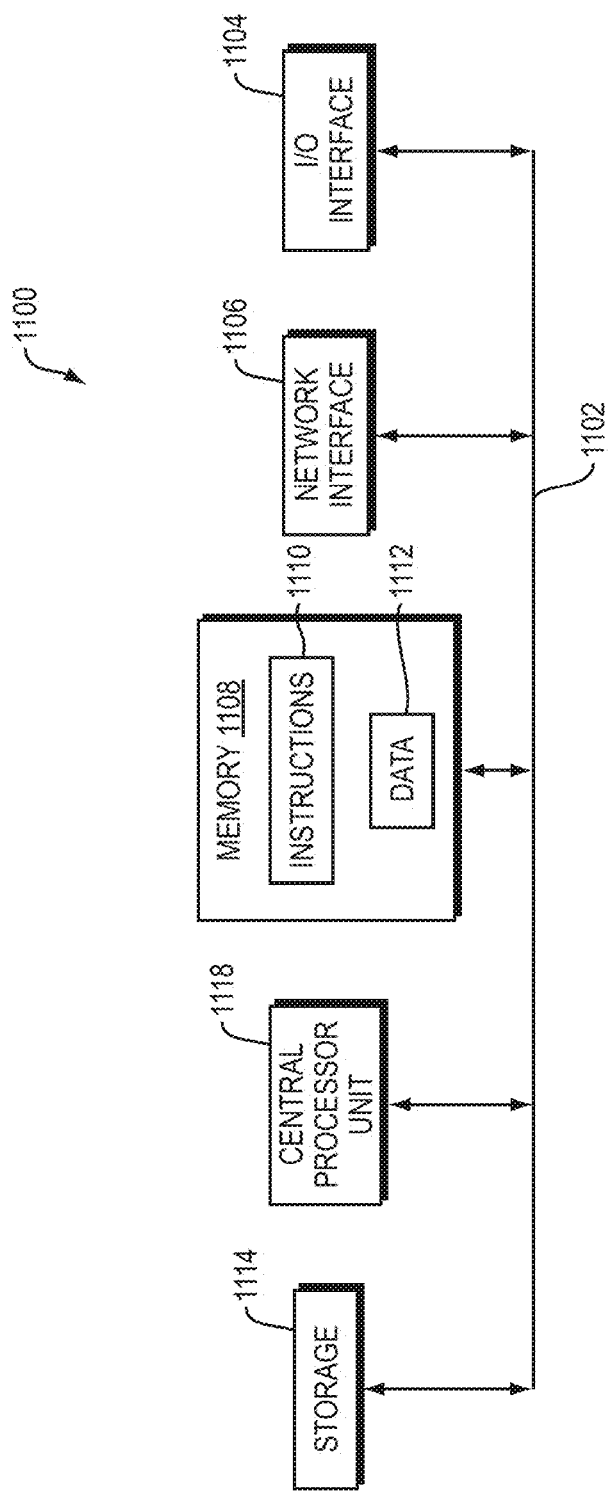

COMPUTER VISION LEARNING SYSTEM

RELATED APPLICATION

This application claims the benefit of U.S. Provisional Application No. 63/016,598, filed on Apr. 28, 2020. The entire teachings of the above application are incorporated herein by reference.

BACKGROUND

In computer science, artificial intelligence (AI), sometimes called machine intelligence, is intelligence demonstrated by machines, in contrast to the natural intelligence that is demonstrated by humans. Young infants exhibit natural intelligence as they learn from their environment, that is, their "world." For example, young infants are constantly adapting to new features in their environment, starting with simple perceptions of the environment and responding to new and unexpected information through adaptation based on their experiences.

In computer science, "schema learning" describes a manner of machine learning in which a machine discovers probabilistic, constructivist, predictive action models, referred to as "schemas," from experience. Such use of the term "schema" with respect to machine learning derives from Dr. Jean Piaget's usage in the 1950s with respect to child development and bears no relation to database schemas. Piaget was a Swiss psychologist known for his work on child development. Piaget's theory of constructivism argues that people produce knowledge and form meaning based upon their experiences.

In computer science, schema learning is a machine process for constructing probabilistic action models of the environment so that the effects of agent actions can be predicted. In AI, an intelligent "agent" refers to an autonomous entity which acts (i.e., it is an agent) by directing its activity toward achieving goals. The intelligent agent acts upon an environment using observation through sensors and actuators (i.e., it is intelligent). Such an intelligent agent responds to states and events in the environment, independent of direct instruction by a user or owner of the intelligent agent. Such an intelligent agent may be employed for many types of different applications.

An example of such an application is an autonomous robot. It is useful for an autonomous robot to be flexible in the face of unplanned conditions, adaptive to unforeseen changes, and robust during unexpected problems. An intelligent agent may be configured to employ schema learning to enable the autonomous robot to adapt to its environment, that is, it's "world," and to retrain itself as such environment changes. An autonomous robot is one example of an application that employs computer vision.

Computer vision is a field of artificial intelligence that trains computers to interpret and understand the visual world. Using digital images from cameras, videos, and deep learning models, machines can identify and classify objects—and then react to what they "see."

SUMMARY

According to an example embodiment, a computer vision learning system is configured to perform complex interpretation tasks (visual tasks) on image/video data.

According to an example embodiment, a computer vision learning system comprises at least one image sensor configured to transform light sensed from an environment of the computer vision learning system into image data representing a scene of the environment. The digital computational learning system is coupled to the at least one image sensor. The digital computational learning system includes a network of actor perceiver predictor (APP) nodes and a library of visual methods (visual routines) is available to the APP nodes for applying to the image data. The digital computational learning system is configured to employ the network in combination with the library to determine a response to a query and output the response determined. The query is associated with the scene.

The computer vision learning system may further comprise at least one communications interface. The query may be a natural language input received via the at least one communications interface. The response may be a natural language output that is output via the at least one communications interface.

Each APP node of the APP nodes is associated with a context, action, and result. The result is expected to be achieved in response to the action being taken as a function of the context having been satisfied.

The action may be at least one visual method (visual routine) of the library of visual methods or at least one sequence of a plurality of visual methods from the library of visual methods.

At least one APP node of the APP nodes may have been trained during a learning mode of the digital computational learning system. The at least one APP node may be configured to encode expected results to be output by the at least one APP node in response to applying at least one visual method from the library of visual methods to training image data under at least one context condition input to the at least one APP node in the learning mode.

At least a portion of the APP nodes may be trained based on training image data representing at least one scene from a constrained environment. The constrained environment may be a real environment or computer simulated environment.

Each APP node of the APP nodes may be associated with an action-controller that includes an instance of a planner. The planner includes allied planners. The action-controller may be configured to employ the allied planners to select at least one visual method of the library of visual methods for applying to the image data.

The network of APP nodes may be configured to select at least one visual method from the library of visual methods and apply the at least one visual method selected to the image data. The response to the query may be determined based on at least one result produced by at least one APP node of the APP nodes in response to applying the at least one visual method selected.

Applying the at least one visual method selected may cause the network to extract functional behavior associated with at least a portion of an object in the scene. The functional behavior extracted may be based on known relations between visual appearance and functional characteristics of objects. The known relations may be encoded in at least a portion of the APP nodes of the network during a learning mode of the digital computational learning system. The at least one result produced may represent the functional behavior extracted.

The network of APP nodes may be configured to extract functional behavior associated with at least a portion of an object in the scene. The functional behavior may be based on an inferred interaction of shape, size, or other property of the at least a portion of the object with a different object present or not present in the scene, and wherein the query is further associated with the different object.

The network may be a knowledge graph including information associated with object behavior, object appearance, object function, or a combination thereof. The query may be associated with a function of an object or person in the scene or an interaction associated with the object or person.

The computer vision learning system may further comprise an audio sensor configured to transform audio from the environment to audio data. The digital computational learning system may be further configured to employ the audio data to determine the response to the query.

The image data may represent an image, sequence of images, continuous video stream, or sequence of video segments.

According to another example embodiment, a computer-implemented method comprises transforming light sensed from an environment into image data representing a scene of the environment. The computer-implemented method further comprises determining a response to a query. The query is associated with the scene. The determining includes employing a network of actor perceiver predictor (APP) nodes and a library of visual methods. The library of visual methods are available to the APP nodes for applying to the image data. The computer-implemented method further comprises outputting the response determined.

Alternative method embodiments parallel those described above in connection with the example system embodiment.

According to another example embodiment, a computer vision learning system comprises at least one image sensor configured to transform light sensed from an environment of the computer vision learning system into image data. The computer vision learning system further comprises a digital computational learning system configured to determine activity-related information from the image data based on a network of actor perceiver predictor (APP) nodes. The activity-related information is associated with an activity in the environment.

The digital computational learning system may be further configured to determine the activity-related information based on identifying at least one APP node of the APP nodes in the network as active based on a context and result of the at least one APP node being satisfied. The context and result are associated with the activity. The context may include a neural network.

The digital computational learning system may be further configured to determine that the context of the at least one APP node has been satisfied based on the image data and, subsequent to a determination that the context of the at least one APP node has been satisfied, determine that the result of the at least one APP node has been satisfied. To determine that the result has been satisfied, the digital computational learning system may be further configured to identify, from the image data, that an action of the at least one APP node has been performed.

The action may be a sub-action of an overall action associated with an overall goal of the activity. The overall action may represent the activity. The sub-action may be associated with a sub-goal of the overall goal. The sub-goal may be associated with the at least one APP node.

The sub-action may be among a plurality of sub-actions of the overall action. The plurality of sub-actions may be associated with at least one ordered sequence. The digital computational learning system may be further configured to identify, based on the image data and network of APP nodes, at least a portion of the at least one ordered sequence. The digital computational learning system may be further configured to determine status of the activity based on the at least a portion of the at least one ordered sequence identified. The status may indicate whether the activity is in progress or has completed. The activity-related information may represent the status.

The network of APP nodes may be a knowledge graph. The digital computational learning system may include at least one processor configured to learn, automatically, the APP nodes of the knowledge graph. Each APP node of the APP nodes may be associated with a respective context, respective action, and respective result. The respective result is expected to be achieved in response to the action being taken as a function of the context having been satisfied.

The computer vision learning system further comprises memory, wherein the network is a knowledge graph stored in the memory, wherein each APP node of the APP nodes is associated with an action-controller including an instance of a planner that includes allied planners. The action-controller may be associated with a goal state and configured to access the knowledge graph in the memory and employ the allied planners to determine a sequence of actions for reaching the goal state by selecting and chaining, dynamically in the memory, at least a portion of the APP nodes of the knowledge graph. The sequence of actions may include respective actions of the at least a portion of APP nodes selected and chained. The sequence of actions may represent the activity or a sub-goal of the activity. The goal state may represent an overall goal associated with the activity or the sub-goal of the overall goal of the activity.

The digital computational learning system may include an episodic memory and the allied planners may be configured to store the sequence of actions in the episodic memory enabling the allied planners to verify whether a given series of actions represent a sub-activity of the activity in the image data are performed in accordance with a chronological order of the sequence of actions stored. The episodic memory may be a time-series data structure indexable by time or via associative lookup using partial vector state matching.

The allied planners may include a graph-based planner and a deep Q-learning (DQL) planner. The graph-based planner may be configured to provide a partial reward to the DQL planner for progressing toward the goal state. The partial reward may be a portion of a total reward for reaching the goal state.

The graph-based planner may be configured to employ a breadth-first search (BFS) method. The DQL planner may be a DQL neural network. The instance of the planner may further include an auxiliary network. The auxiliary network may be configured to decide whether to trust the graph-based planner or the DQL planner.

The digital computational learning system may further comprise a library of visual methods for applying to the image data. The APP nodes may be configured to encode results expected after executing a sequence of the visual methods under different starting context conditions of the environment.

The digital computational learning system may be further configured to automatically select a given visual method from the library and apply the given visual method selected to the image data. The given visual method may be selected, dynamically, by an action-controller of a given APP node of the APP nodes.

The digital computational learning system may further comprise an attention control system configured to place attention markers in the image data. The attention markers may identify a respective location in the image data and a respective visual-image processing method of the library of image-processing methods for the digital computational learning system to apply at the location.

The digital computational learning system may be further configured to automatically select a plurality of visual methods from the library and apply the plurality of visual methods selected, sequentially, to the image data. The plurality of visual methods selected may be employed as actions of at least a portion of the APP nodes. Respective results of the at least a portion of the APP nodes resulting from taking the actions may enable the digital computational learning system to determine the activity-related information.

The digital computational learning system may be further configured to maintain synthetic state items. The synthetic items represent perceived latent state of the environment computed by the APP nodes in the network based on the image data.

The computer vision learning system may further comprise an audio sensor configured to transform audio from the environment to audio data. The digital computational learning system may be further configured to determine the activity-related information based on the audio data.

The image data may represent an image, sequence of images, continuous video stream, or sequence of video segments.

The activity-related information determined may include status of the activity, the status indicating that the activity has started, stopped, or completed.

The digital computational learning system may be further configured to compute a length of time taken to complete the activity. The activity-related information determined may include the length of time computed.

The activity-related information determined may indicate that a new activity has begun, the new activity different from the activity.

The digital computational learning system may be further configured to produce a prediction that a sub-activity of the activity is expected to be performed in the environment. The activity-related information determined may include the prediction produced. The predication produced may be based on a sub-activated value of a given APP node of the APP nodes. The sub-activated value may represent a simulated value of an actual value of the given APP node if the given APP node were to become active based on the image data.

The digital computational learning system may be further configured to access a rule memory. The rule memory may include safety rules, compliance rules, or a combination thereof. The activity-related information may be determined based on (i) matching the activity or sub-components thereof with the safety rules, compliance rules, or the combination thereof, (ii) matching the safety rules, compliance rules, or the combination thereof with a manner in which the activity or sub-components thereof are performed in the image data, or (i) and (ii).

The computer vision learning system may further comprise a plurality of sensors configured to produce multi-sensor data from input from the environment. The plurality of sensors includes the image sensor. The multi-sensor data produced includes the image data. The activity-related information may be further determined based on the multi-sensor data produced.

The digital computational learning system may be further configured to generate an electronic report including the activity-related information determined. The digital computational learning system may be further configured to generate the electronic report in accordance with a schedule.

The schedule may include at least one of: daily reporting, weekly reporting, or monthly reporting.

The computer vision learning system may further comprise a user interface. The digital computational learning system may be further configured to output, via the user interface, natural language representing the activity-related information determined.

According to another example embodiment, a computer-implemented method comprises transforms light sensed from an environment into image data. The computer-implemented method further comprises determining activity-related information from the image data based on a network of actor perceiver predictor (APP) nodes. The activity-related information is associated with an activity in the environment. The determining includes identifying at least one APP node of the APP nodes in the network as active based on a context and result of the at least one APP node being satisfied. The context and result are associated with the activity.

Alternative method embodiments parallel those described above in connection with the example system embodiment.

Further, yet another example embodiment includes a non-transitory computer-readable medium having stored thereon a sequence of instructions which, when loaded and executed by a processor, causes the processor to perform methods disclosed herein.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 5 is a comparison chart that compares existing artificial intelligence (AI) approaches to an example embodiment of a learning agent disclosed herein.

FIG. 9G is a prior art display of human eye-tracking data that shows use of different eye motion sequences when solving different visual tasks.

FIG. 11 is a block diagram of an example internal structure of a computer optionally within an embodiment disclosed herein.

DETAILED DESCRIPTION

Figure 1A:
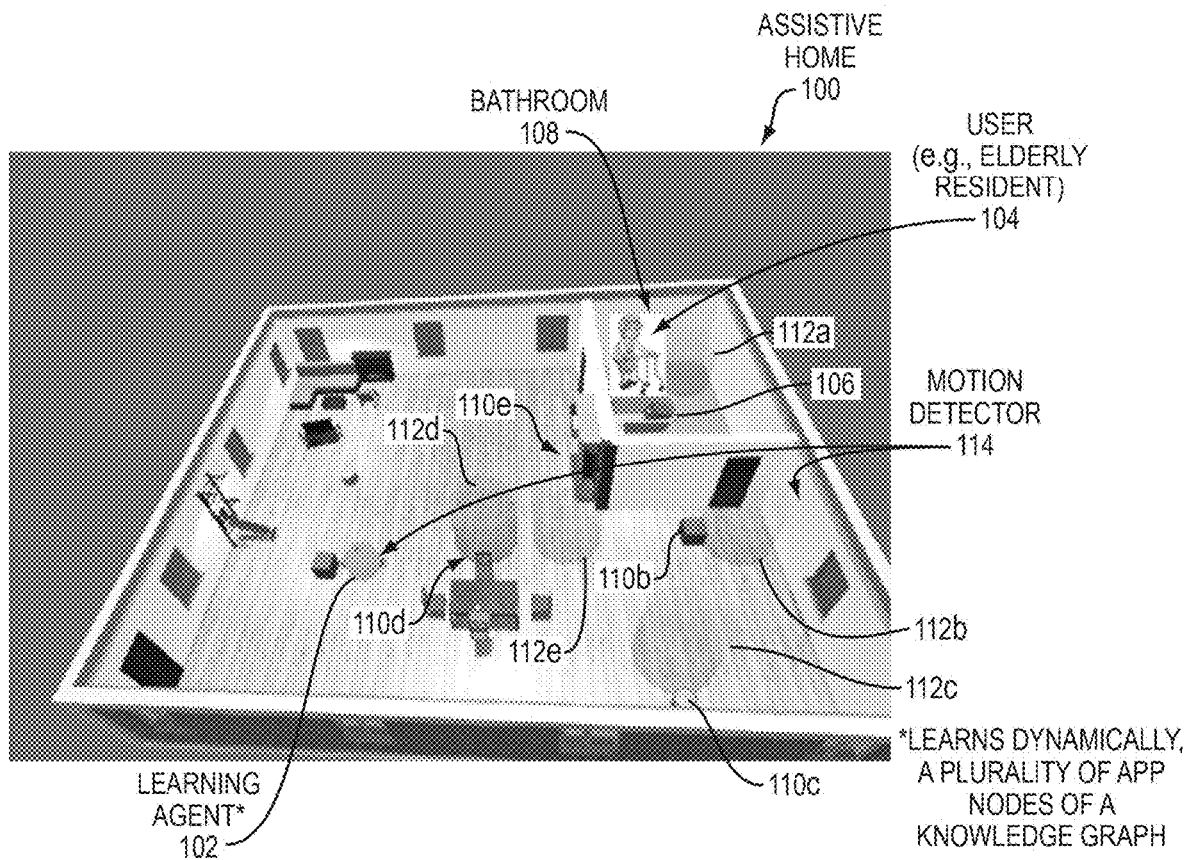
FIG. 1A is a top-level view of an example embodiment of an assistive home within which an example embodiment may be implemented.

A description of example embodiments follows.

It should be understood that the term "processor" as used herein may be any number of individual processing circuits, working in coordination or independently. Processing circuits may be parallel processors such as multicore central processing units (CPUs), distributed networks of processors "in the cloud," multiple graphic processing unit (GPU) cards, or coprocessors, etc. The term "schema," as used herein, is an element that predicts how specific sensor values will change as different actions are executed from within particular sensory contexts. According to example embodiments disclosed herein, a schema may be enhanced in several ways with the use of a multilayer neural network and such an enhanced schema may be referred to herein as an actor perceiver predictor (APP) unit. According to an example embodiment, the APP unit is an extension of a schema and is a unit of causality. According to an example embodiment, the extension includes an action-controller that employs planners that cooperate with one another for action planning purposes. Such cooperating planners are referred to herein as "allied" planners. A planner may be referred to interchangeably herein as a neural network. An APP unit may be referred to interchangeably herein as an APP schema, APP node, or simply, an APP. A digital computational learning system may be referred to interchangeably herein as an artificial intelligence (AI)-based learning system, intelligent agent, learning agent, or simply, an AI.

Example embodiments disclosed herein provide for a new mechanism, referred to herein as "Allied Planning," disclosed further below with regard to FIG. 2A, that enables a computer system to plan a series of actions to accomplish complex tasks in a more robust way than current state of the art artificial intelligence (AI) systems, with far less special-case hand programming and far fewer examples and trial and error training relative to, for example, present AI systems, such as reinforcement learning systems. Example embodiments disclosed herein provide advantages in terms of (1) sample-efficiency (vastly smaller number of training examples needed), and (2) reward-specification (how the task can even be described to the computer at all, such that it knows when it has succeeded).

Resilience and common sense are missing in current AI-based systems/machines. To be more autonomous, it is useful for AI-based systems/machines to learn/understand how the world, such as a physical world, digital world, people, etc., works, in order to acquire some level of common sense, such as, "it's possible to pull an object using a string, but not to push it," etc.

To acquire such common sense, it is useful for AI-based machines to learn a very large amount of background knowledge through observation and action. AI-based machines that can perceive the state of the world may make accurate predictions and planning. It is useful for such machines to update and remember estimates of the state of the world by paying attention to important events and by remembering relevant events. AI-based machines that can reason and plan may predict which sequences will lead to a desired state of the world. Such machine intelligence and common sense is based on perception, predictive model, memory, reasoning, and planning. An example embodiment disclosed herein employs APP nodes and enables more resilient and robust machine learning relative to current AI approaches, such as the existing AI approaches disclosed further below with regard to FIG. 5.

An example embodiment is a self-modifying learning agent that is based on principles of human infant cognitive development. The learning agent discovers state and regularities in its environment, such as the learning agent 102 that is discovering state and regularities in the assistive home 100 of FIG. 1A, disclosed further below, and how to use such discovered state and regularities to reliably produce results. It should be understood that an environment (i.e., world) is not limited to an assistive home or any other environment/world disclosed herein. Further, the environment may be a real-world (i.e., physical) environment or a virtual environment that is computer generated.

According to an example embodiment, the learning agent learns to store and retrieve actions in terms of the results they are meant to achieve. The actions taken by the learning agent are taken for a purpose. The learning agent builds progressively more abstract actions, starting from primitive motor skills. The learning agent transfers the training learned in one situation to another situation and is able to coordinate, reuse, and compose knowledge learned in differing areas to accomplish complex tasks. As such, the learning agent is able to accomplish novel goals that its framework had not been previously trained to reach.

According to an example embodiment, the learning agent iteratively extends its model of a physical world and is able to recall external objects or states which it discovers, and previously had no vocabulary to describe. Even though such external objects or states are no longer directly perceived, the learning agent may represent persistent hidden state of objects or states it has discovered. An example embodiment of the learning agent represents causal relations between context, action, and result to plan its own solutions to problems and to explain, for example, via natural language, why it took specific actions to accomplish goals. An example embodiment of the learning agent is self-modifying, the learning agent may access its own representations and causal reasoning to be able to immediately modify its behavior based on new evidence, knowledge, or guidance received, for example, from a human being. An example embodiment of the learning agent enables the learning agent to be able to learn a new skill with just one or a small number of examples, similar to the so-called "one-shot" or "zero-shot" learning exhibited by humans.

An example embodiment enables a learning agent, such as the learning agent 102 of FIG. 1A, disclosed below, to learn "common sense" concepts when manipulating objects and navigating its environment, that is, its "world." Concepts such as: "you can't put two objects in the same location, unless one is contained within the other," "an object cannot be in two places at once," "an object in a container will move when the container moves, even if you can't see the object," "placing one object on top of another makes a higher structure," "it's possible to pull an object using a string, but not to push it," etc. It should be understood that an example embodiment is not limited to enabling a learning agent to learn such examples of "common sense" disclosed herein. An example embodiment enables a learning agent to discover state and regularities in its environment, such as the assistive home environment of FIG. 1A, disclosed below, and how to use such discovered state and regularities to reliably produce desired results.

Disclosed below are examples of types of applications within which example embodiments disclosed herein would be of use and an improvement on the state of the art. It should be understood, however, that example embodiments disclosed herein are not limited to the types of applications disclosed herein.

FIG. 1A is a top-level view of an example embodiment of an assistive home 100 within which an example embodiment may be implemented. The assistive home 100 may be physical or virtual environment. The assistive home 100 may also be referred to interchangeably herein as a "smart" home. In the assistive home 100, a learning agent 102 has been deployed to learn the assistive home 100 in order to aid a user 104 that may be an elderly resident of the assistive home 100. It should be understood that a user, as referred to herein, may be any human being and is not limited to an elderly person. In the assistive home 100 of FIG. 1A, the learning agent 102 is an autonomous robot. It should be understood, however, that example embodiments disclosed herein are not limited to an autonomous robot or an assistive home application. Further, it should be understood that a goal is not limited to any of the goals disclosed herein and that actions are not limited to any of the actions disclosed herein.

According to an example embodiment, the learning agent 102 has goal awareness, that is, the learning agent 102 has an ability to create meaning, understand context, and generalize. The learning agent 102 has robustness under novelty, that is, it is able to handle new, out-of-training-set type situations. The learning agent 102 provides explainability that is reliable, explicit, and includes explainable representations. The learning agent 102 is based on an allied planning network (APN) architecture, such as disclosed further below with regard to FIG. 2A, within which planning is integrated with learning. The learning agent 102 represents and relates cause and effect, allowing automatic creation of plans. The learning agent 102 may be grounded with regard to natural language understanding (NLU), such as disclosed further below with regard to FIG. 1A. NLU may be directly driven by the breadth of the learning agent's actions and results.

In the example embodiment of FIG. 1A, the learning agent 102 is learning about aspects of the assistive home 100 and begins with having zero knowledge regarding same. The learning agent 102 has goal awareness, for example, the learning agent 102 has a high-level knowledge of user intent, such as not making contact with obstacles in the assistive home 100, keeping warm, or another user intent. The learning agent 102 is a self-modifying learning agent that adapts itself based on interactions with its environment, that is, the assistive home 100 in the example embodiment, and observations thereof.

In the example embodiment, the user 104 is traversing a pathway toward a bathtub 106 in a bathroom 108 of the assistive home 100. The learning agent 102 is configured to find and suggest a new pathway (not shown) to the user 104 if the learning agent determines that an obstacle will be encountered along the pathway that the user 104 is traversing, such as the object 110a of FIG. 1B, disclosed below.

Figure 1B:
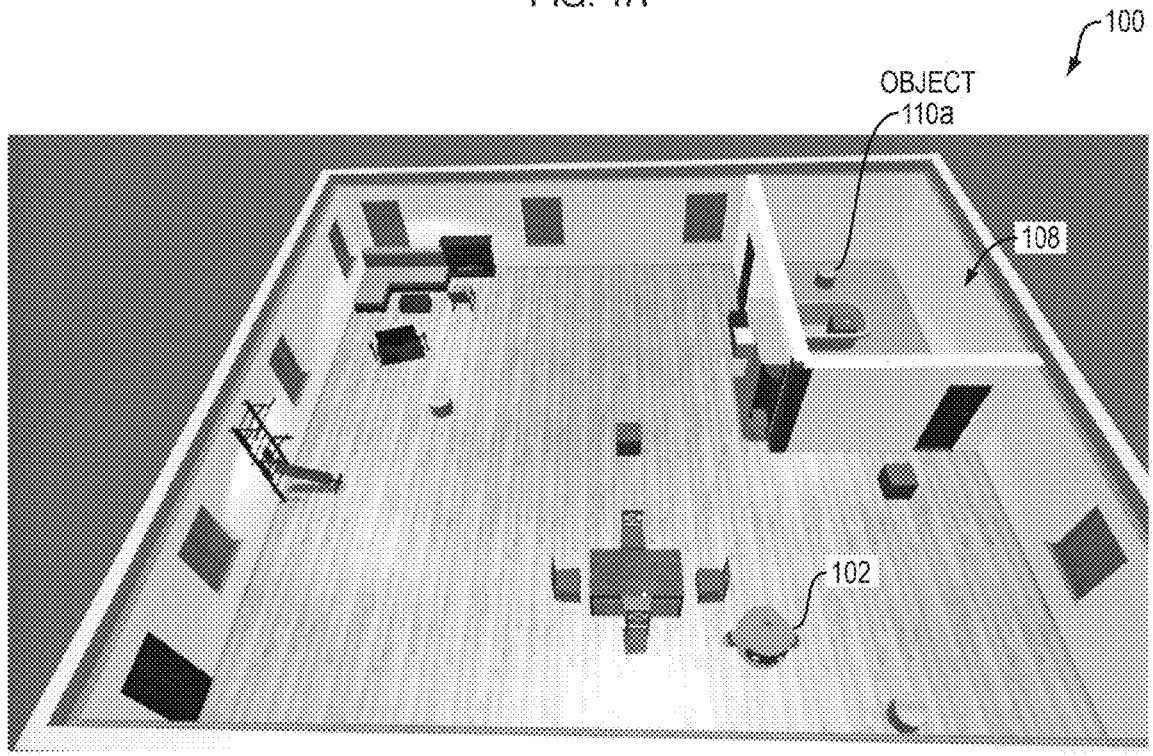
FIG. 1B is another top-level view of the example embodiment of the assistive home of FIG. 1A.

FIG. 1B is another top-level view of the example embodiment of the assistive home 100 of FIG. 1A. In FIG. 1B, the bathroom 108 includes an object 110a that is not visible in the top-level view of FIG. 1A. Referring back to FIG. 1A, the learning agent 102 has generated a synthesized state item 112a that represents the object 110a of FIG. 1B even though the learning agent 102 has not encountered the object 110a, either physically or visually. Such generation of synthesized state items is disclosed, further below. An example embodiment bootstraps common sense through interconnected links of actor perceiver predictor (APP) nodes, disclosed further below with regard to FIG. 2A. An example embodiment learns what it means for an object to be resident at a specific place even when the learning agent is not directly perceiving it by cross linking of disparate sensory input. For example, the learning agent 102 knows the object 110a of FIG. 1B is in the bathroom 108 even though the AI can't see it.

According to an example embodiment, the learning agent 102 can explain to the user 104, for example, via natural language, why a suggestion, such as a suggestion to take the new pathway, was made. For example, the learning agent 102 may generate audible speech that provides the explanation, such as, "to avoid the object" that may be audible from a speaker (not shown) of the autonomous robot, a speaker (not shown) that is deployed in the assistive home 100, headphones worn by the user 104, or other audible device that is communicatively coupled to the learning agent 102.

An example embodiment provides planning capability integrated with learning. For example, the learning agent 102 may learn multiple pathways that enable the user 104 to reach the bathtub 106. The learning agent 102 may be grounded in natural language for communicating a pathway to the user 104 that enables the user 104 to avoid contact with the object 110a. An example embodiment of the learning agent 102 is built from the ground up, that is, from zero knowledge of the assistive home 100, and is goal oriented. The learning agent 102 may employ sensory input, such as input from motion detector(s) 114, camera(s) (not shown), microphone(s) (not shown), actuator(s) (not shown), or any other sensor input or combination thereof, to generate synthesized state items representing objects in the assistive home 100, such as the synthesized state item 112a that represents the object 110a of FIG. 1B. In the example embodiment, the learning agent 102 has generated additional synthesized state items, namely the synthesized state items 112b, 112c, 112d, and 112e, that represent the objects 110b, 110c, 110d, and 110e, respectively.

As disclosed above, the learning agent 102 is goal oriented. An obstacle for achieving a goal may be any type of barrier for achieving the goal. For example, a goal may be to keep the assistive home 100 at a desired temperature. In the assistive home 100, however, a furnace (not shown) may be failing slowly and, as such, presents an obstacle for achieving the goal. While the assistive home 100 may be a smart home, it may not have been programmed to alert the user 104 of the failing furnace or potential danger that may be caused therefrom. The learning agent 102 may be aware that atypical events, such as a failing furnace, may prevent a goal from being achieved, such as the goal to heat the assistive home 100 to the desired temperature. In the assistive home 100, an example embodiment of the learning agent 102 makes plans, carries them out, and notices obstacle or barriers, such as the object 110a of FIG. 1B, or failing furnace, as well as lack of progress toward goal achievement.

In the assistive home 100, the learning agent 102 exhibits robustness under novelty. For example, when the learning agent 102 detects that the object 110a will be encountered by the user 104, the learning agent 102 can find and suggest a new pathway, such as disclosed above. In addition to a goal of keeping the assistive home 100 warm, a goal may be to lower the heat when persons are not present therein. The learning agent 102 may adapt so as to exclude pets (not shown), that are present alone at the assistive home 100, from being detected as people, as such detection may otherwise cause the heat to stay on, causing energy savings to suffer. An example embodiment of the learning agent 102 uses sensor fusion. For example, the learning agent may fuse data from multiple different sensors, such as motion sensor data and multiple images sensed by a camera(s), and employ same to train a neural network to learn more robust object classification, for example, to distinguish a pet from a human being.

According to an example embodiment, the learning agent 102 is reliable, explainable, and teachable. For example, the learning agent 102 may be communicatively coupled to a security camera (not shown) in the assistive home 100. The security camera may mistake car headlights for an intruder in the assistive home 100. According to an example embodiment, the user 104 can teach the learning agent 102 about exceptions using simple natural language, such as "Those were headlights, not people," and the learning agent 102 may adapt, so as not to mistake a future occurrence of car headlights for an intruder.

According to an example embodiment, the learning agent 102 explicitly models actions, cause and effect, and, as such, the learning agent 102 can explain decisions it makes, such as, "I turned off the lights because you left the room." According to an example embodiment, the learning agent 102 learns all the actions, and represents all the many causes and effects in a multi-sensor/actuator-based assistive home 100 sensor-motor system. As such, the learning agent 102 is able to make robust plans with goals, such as "keep the home warm," even when adverse events happen, such as the furnace failing.

As disclosed above, the learning agent 102 may be grounded in natural language. For example, a command, such as, "Turn off lights" spoken in natural language, may be connected directly to the learning agent's experience of controlling actuators (not shown) and sensors (not shown) coupled to lights (not shown) in the assistive home 100. According to an example embodiment, such natural language may be grounded in a knowledge graph, such as the knowledge graph 222 of FIG. 2A, disclosed further below, enabling the learning agent 102 to associate actions, such as controlling a light switch, in response to natural language input to a communications interface (not shown).

Another type of application within which example embodiments disclosed herein would be of use and an improvement on the state of the art is robotic assembly. For example, an application in which a robot hand-eye system is commanded to carry out a task for assembling a toy truck from a kit of LEGO® bricks which are strewn randomly on a table, and such task is expected to be carried out merely by being shown an example of the assembled toy truck. This would involve locating the right bricks, visually or by touch, moving the robot's arms to effectively grasp the bricks, and forcing them together in the correct relative positions so as to snap them together. Such a task is conventionally done by laboriously hand-programming a computer system, that is, the robot, to break down the task into various required subtasks and perform them in an optimal order.

Such hand-programming is, however, very difficult to perform reliably. It is more useful for the robot to figure out how to be given the goal state, and select and perform all the actions and subtasks itself, such as locating, reaching, grasping, aligning, etc., the LEGO bricks. This conventionally requires some type of planning method which is given a set of subroutines and will choose and order the subtasks to most efficiently complete a primary task.

Another approach to task planning is to try to train a deep neural network (DNN) to learn the correct series of actions in order to get a reward when the task is complete, such as the DNN 260 that receives the reward 261, as disclosed further below with regard to FIG. 2B. A DNN is an artificial neural network (ANN) with multiple layers (e.g., hidden layers) between input and output layers. The DNN finds the correct mathematical manipulation to turn the input into the output, whether it be a linear relationship or a non-linear relationship. Training a DNN to learn the correct series of actions in order to get a reward when the task is complete has, however, not been demonstrated to work for problems of complexity, such as assembling the toy truck from randomly strewn LEGO bricks.

Yet another approach to task planning is to employ Deep Q-Learning (DQL), where a multilayer neural network is trained to perform a task through massive training and trial-and-error. This has been successfully demonstrated to learn to play certain video games, but has not had similar success in more complex and open-ended task planning such as the robotic LEGO brick assembly example described above.

According to an example embodiment disclosed herein, a computer system learns the needed subtasks by itself or by training for some of them using just a small number examples. It can then make plans, efficiently, to perform complex tasks, such as assembling a toy truck from randomly strewn LEGO bricks using a robotic hand-eye system, as disclosed above. According to an example embodiment, the computer system employs a core knowledge graph made up of Actor Perceiver Predictor (APP) units, also referred to interchangeably herein as APP nodes or simply, APPs. APPs are schemas, disclosed further below, extended with new machinery.

Each APP node describes a small unit of knowledge that says what would happen if a specific action were taken, under specific circumstances. Such APP nodes are automatically (responsively) learned, organized, and indexed so that they can be dynamically chained together by a planner, such as the action-controller 232 of FIG. 2A, disclosed below, to accomplish complex tasks, such as assembling the toy truck from a mere example thereof or planning new pathways for the user 104 in the presence of obstacles, such as disclosed above with regard to FIGS. 1A and 1B.

As disclosed further below, an APP node is an extension of a schema. An APP node is extended to include new machinery, that is, the action-controller 232 disclosed further below with reference to FIG. 2A. Below is a definition of a schema from Drescher, G. L. "Made-Up Minds: A Constructivist Approach to Artificial Intelligence," MIT Press, 1991, 219 pages (hereinafter, "Drescher"). The entire teachings of Drescher are incorporated herein by reference. According to Drescher, a schema is a tripartite structure comprising a context, action, and result.

Figure 1C:
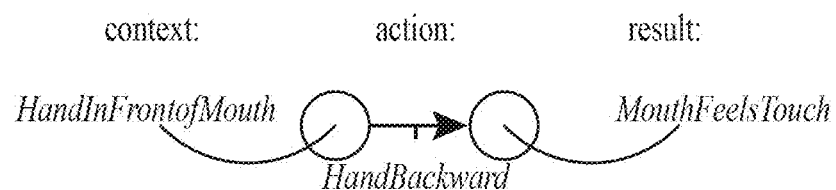
FIG. 1C is a block diagram of an example embodiment of a prior art schema.

FIG. 1C is a block diagram of an example embodiment of a prior art schema. As disclosed in Drescher, a schema asserts that if its action is taken when its context conditions are all satisfied, then the result conditions will be obtained. The assertion is subject to a reliability factor that the schema maintains.

For example, the schema of FIG. 1C asserts that if the hand is just in front of the mouth (context), moving the hand incrementally backward (action) will precipitate a tactile sensation on the mouth (result). Each action designates an event that can affect the state of the world (as might be reflected in the state of some of the mechanism's items). An item is a state element. Each item corresponds to some proposition about the state of the world, and is On (or Off) to assert (or deny) that proposition. An item can also be in an unknown state. A schema asserts that taking its action when its context conditions are satisfied would achieve its result and, in FIG. 1C, the schema says how to move the hand backward to the mouth. The following describes the basic data structure which implements a schema object in memory, the states which a schema object can take on, and a method, called marginal attribution, which may be used to create new schemas as disclosed in Drescher.

Figure 1D:
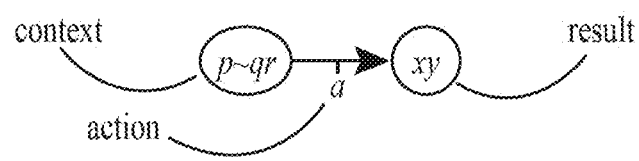
FIG. 1D is a block diagram of an example embodiment of another prior art schema.

FIG. 1D is a block diagram of an example embodiment of another prior art schema. As disclosed above, a schema is a primary unit of knowledge and is a three-part object. A schema encapsulates what would happen if action a were taken when the context state is satisfied. A schema can be implemented as a data structure in a computer program. The schema of FIG. 1D has three context states and two result states. The schema contains three primary "slots," namely the context, action, and result. As disclosed above, a schema asserts that if its action is taken when its context conditions are all satisfied, then its result conditions will be obtained. A schema is said to be applicable if its context state is satisfied, and no overriding conditions are present. A schema is said to be activated when it is applicable and its action is taken. The action points to a structure which represents an action which can be taken to effect the state of the environment, or the internal state of the system. The context is a list of state items whose state must be in the specified values in order for activation. The result is a list of state items which will be satisfied if an applicable schema is activated. A planner (not shown) chains a plurality of schemas to reach a goal, such as the goal of FIG. 1E, disclosed below.

Figure 1E:
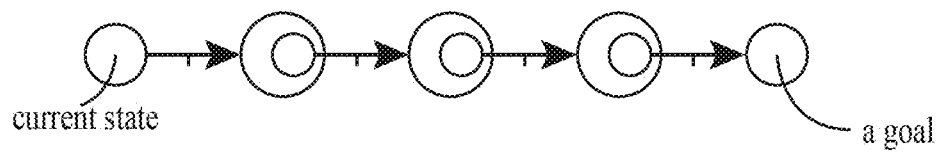
FIG. 1E is a block diagram of an example embodiment of a prior art chain of schemas.

FIG. 1E is a block diagram of an example embodiment of a prior art chain of schemas. A planner (not shown) finds a shortest path to a goal through a network of schemas. Results of previous schemas in the chain must satisfy context of a next schema. A schema, depending on the stage it is created in the schema creation mechanism, can be described as being in one of the following classes:

Bare: the schema has an empty result and empty context. The system will create one bare schema for each defined action. New actions may be created during system operation, as new composite-actions are built by the system. A new bare schema will be created for each new composite-action;

Result-only: The schema has a non-empty result, and an empty context; and

Result-with-context: The schema has a non-empty result and non-empty context.

A known schema learning method is called "marginal attribution" and, as disclosed by Drescher, works using a two-phase process starting with a bare schema. Through observation and experiment via activation of the schema, marginal attribution discovers, first, which item state changes are correlated, even unreliably, with the schema's activation. This is known as "relevant result discovery." The second phase, known as "reliable context discovery," discovers which pre-activation context item states are most correlated with high probability of successful activation of the schema.

A schema's context and result lists are not mutable, once they have been created, they cannot be modified. To carry out the relevance and reliability learning steps, a learning system spins off (i.e., creates) child schemas whose result and context sets are incrementally added to, such as disclosed below with regard to FIG. 1F.

Figure 1F:
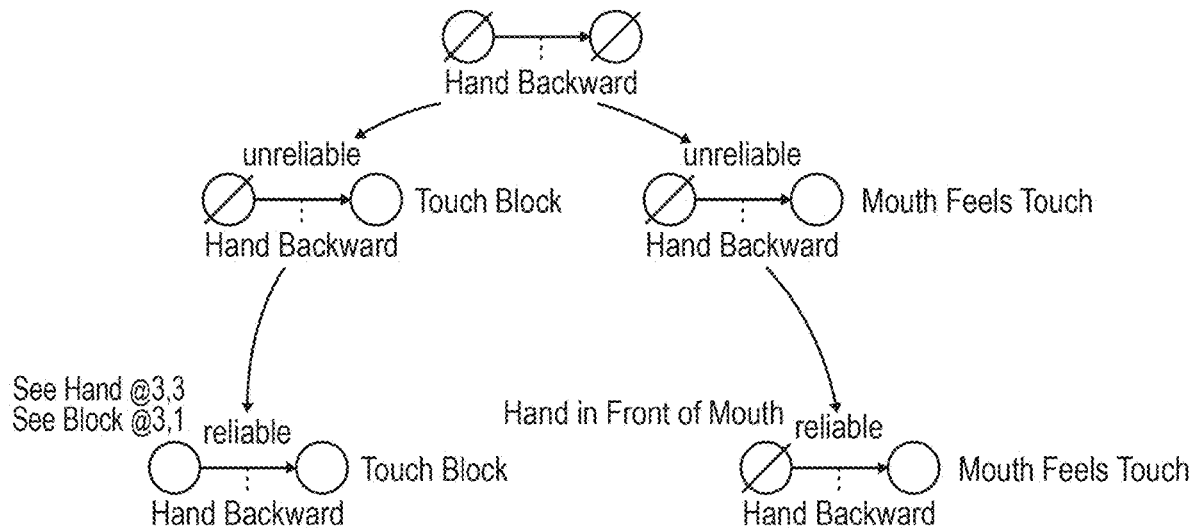
FIG. 1F is a block diagram of an example embodiment of a sequence of creation of prior art schemas.

FIG. 1F is a block diagram of an example embodiment of a sequence of creation of prior art schemas. In the sequence, a single bare schema for the "Hand Backward" action is created. The "relevance discovery" phase discovers two correlated (though unreliable) results of moving the hand backward; touching the mouth, or touching a toy block. The "reliability discovery" phase then discovers different context conditions for the two unreliable schemas which make them more reliable.

For example, having the hand be in position in front of the mouth causes the "hand backward" action to always result in the mouth feeling the hand touch it. Similarly, seeing the hand in front of the toy block ensures the "hand backward" action reliably results in the hand touching the toy block. Each successively more refined schema is said to be a child 'spin off' from its parent. Thus, copies of the parent's result and context sets are incrementally augmented and placed in the child schemas, while the parent's result and context remain unmodified. The bare schema forms the root of a tree of all schemas for a given action, where each descendant becomes more specific and reliable, with respect to its set of predicted results and required context.

Schemas may be created via the marginal attribution method that employs the relevance (result discovery) phase and reliability (context discovery) phase disclosed above. The marginal attribution method uses statistical tests to decide when to create new result and context spinoff schemas. The marginal attribution method determines how and when new child schemas are spun off and which items are added to the result and context of the child schema. As described by Drescher, in addition to its three main parts, each schema has two large ancillary structures, namely, an extended context and an extended result, as disclosed below.

Figure 1G:
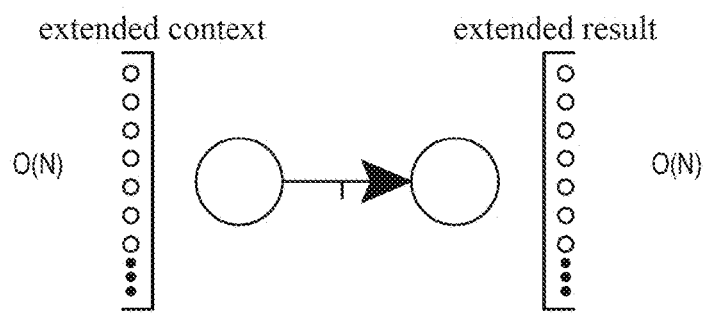
FIG. 1G is a block diagram of an example embodiment of a prior art schema and its extended context and extended result.

FIG. 1G is a block diagram of an example embodiment of a prior art schema and its extended context and extended result. Marginal attribution discovers cause and effect of actions. Such large auxiliary structures on each schema, such as the extended context and result, may be used to capture observed effects of a schema's action with respect to all other schemas. Each has a slot for every item in the schema mechanism—not just the items appearing in that schema. Each extended result also has a slot for certain context-like sets of items.

Each such slot maintains some data about correlations between the schema and that item, and also, based on that data, specifies whether that item's being On (or being Off) overrides the schema. If so, the schema is inapplicable whenever the overriding item is On (or Off, as specified), even if the schema's context is satisfied. A schema's auxiliary data (including the content of the extended-context and extended-result slots) are subject to revision, but a schema's context, action, and result uniquely identify that schema, and do not change.

Although schemas maintain some statistical information, such as the reliability factor and correlations, schemas are designed to provide symbolic, qualitative representations of the world. The schema mechanism endeavors to build schemas that are of high reliability; there is no attempt to make accurate or sophisticated models of the probabilities of less certain events.

In particular, each schema's quantitative reliability measure serves mainly to exclude the schema if it falls far short of the ideal. Extended-context and extended-result correlations have a different primary purpose, that is, to guide the construction of reliable schemas. The extended context also has several secondary uses: to discover or specify overriding conditions, sustained context conditions, and conditions for turning Off a synthetic item. A secondary use of extended results is to support the discovery of chains of schemas.

As described by Drescher, marginal attribution initially identifies relevant but unreliable effects of a schema's activation, then searches for context conditions with respect to which those effects obtain more reliably. A series of intermediate, unreliable schemas serves as a scaffold for the construction of an eventual, reliable schema (when the process succeeds). Each schema keeps track of its own reliability, so the intermediate constructs are not mistaken for reliable assertions.

Initially, for each primitive action, the schema mechanism has a bare schema: a schema with empty context and result. Similarly, when a new composite action is defined, the mechanism constructs a bare schema that uses that action. A bare schema makes no assertion in its own right, but serves as a point of departure for the discovery of the effects of its action.

Figure 1H:
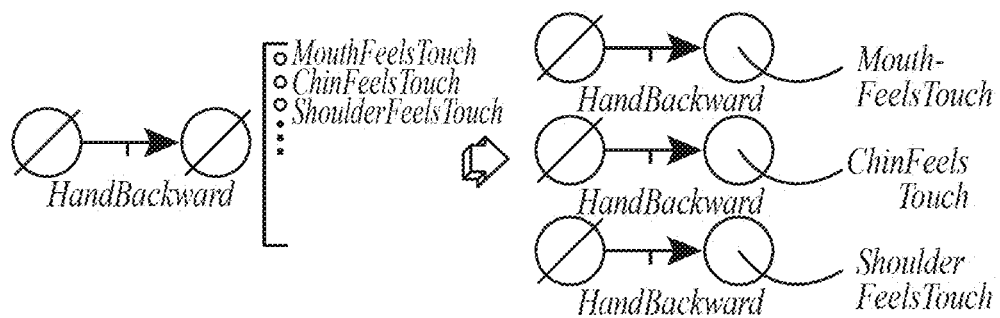
FIG. 1H is a block diagram of an example embodiment of a prior art bare schema that is discovering some results of its action and spinning off other schemas.

FIG. 1H is a block diagram of an example embodiment of a prior art bare schema that is discovering some results of its action and spinning off other schemas. In the block diagram, schemas discover and spin off more specific child schemas. A bare schema's extended result discovers effects of the schema's action. In the marginal attribution method, the discovery proceeds by way of two statistics maintained by each extended result slot. One statistic, the positive-transition correlation, is the ratio of the probability of the slot's item turning On when the schema's action has just been taken to the probability of its turning On when the schema's action is not being taken. The other statistic, the negative-transition correlation, is a similar ratio, but with respect to turning Off instead of On.

As described by Drescher, these statistics are tabulated over a number of trials in which the action is taken, and a number of trials in which it is not; the more trials there have been, and the more discrepancy there is between the two probabilities, the sooner the machinery will detect the difference. The sampling is weighted toward the most recent trials.

Since the machinery seeks transitions to the result state, a trial for which the result was already satisfied before the action was taken does not count as a positive-transition trial; and one for which the result was already unsatisfied does not count as a negative-transition trial. Arguably, the mechanism should also look for a result that is kept constant by an action, when that item would otherwise have changed state. Drescher's implementation does not do this—looking for transitions is more important, and memory and time are limited—but, according to an example embodiment, it could be extended to maintain such statistics as well.

If an extended-result slot for a given schema shows that an item is significantly more likely to turn On (or Off) when the schema's action is taken, that item is deemed relevant to the action. A relevant item is a candidate for positive inclusion (if it turns On) or negative inclusion (if Off) in a schema that is said to spin off from the given schema. A spinoff schema copies the given schema's context, action, and result, but with the designated item included in the copy's result (or context).

For example, in FIG. 1H, the extended result of the schema HandBackward discovers the relevance of items MouthFeelsTouch, ChinFeelsTouch, and ShoulderFeelsTouch. Correspondingly, the schemas HandBackward, MouthFeelsTouch, HandBackward, ChinFeelsTouch, and HandBackward, ShoulderFeelsTouch spin off from the bare schema HandBackward.

A relevant result need not follow an action reliably. Its occurrence following the action may be arbitrarily unlikely, provided that its occurrence is even less likely in the action's absence. The relevance criterion uses the schema to specify a controlled experiment, comparing what happens with activation to what happens without the control. Subtle but significant statistical differences then serve to identify a relevant but arbitrarily unreliable result, solving the context-result chicken-and-egg problem.

The machinery's sensitivity to relevant results is amplified by an embellishment of marginal attribution: when a given schema is idle (i.e., it has not just completed an activation), the updating of its extended result data is suppressed for any state transition which is explained—meaning that the transition is predicted as the result of a reliable schema whose activation has just completed. Consequently, a given schema whose activation is a less frequent cause of some result needn't compete with other, more frequent causes, once those causes have been identified; in order for the result to be deemed relevant to the given schema, that schema need only bring about the result more often than the result's other unexplained occurrences.

As described by Drescher, once a relevant result has been so designated and a corresponding schema spun off, the induction machinery of the spinoff schema looks for context conditions with respect to which the result follows more reliably than it occurs in general; the spinoff schema's extended-context slots maintain statistics that identify such conditions.

In particular, each extended-context slot records the ratio of the probability that the schema will succeed (i.e., that its result will obtain) if the schema is activated when the slot's item is On, to the probability of success if that item is Off when the schema is activated. As with extended-result statistics, these are weighted toward more recent trials; and the more trials there have been, and the greater the difference between the two probabilities, the sooner the machinery can detect the difference.

As described by Drescher, if the first (or second) of the extended-context probabilities is significantly higher than the other, the item is deemed a relevant condition for the schema's success, and is a candidate for positive inclusion (if the schema is more reliable with it On) or negative inclusion (more reliable when Off) in the context of a spinoff schema.

Figure 1I:
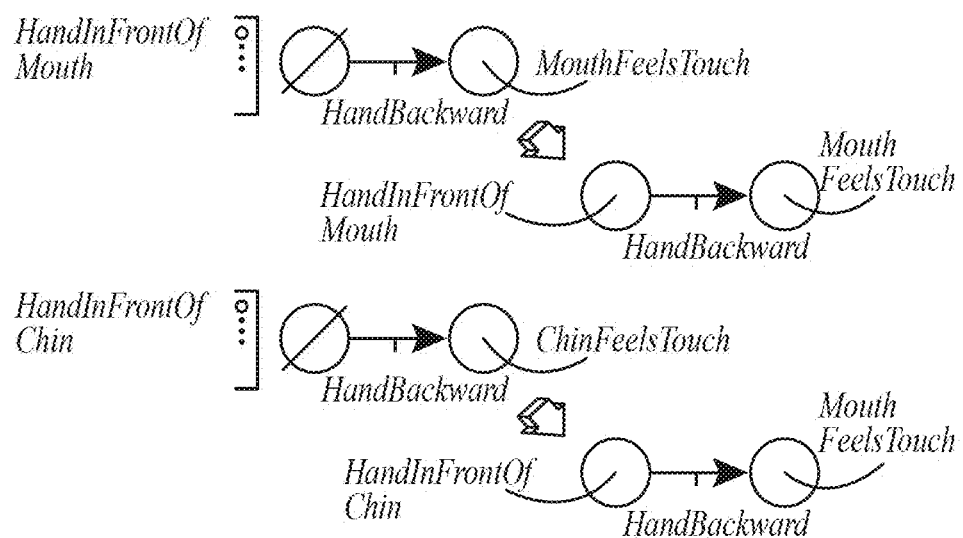
FIG. 1I is a block diagram of an example embodiment of prior art context schemas.

FIG. 1I is a block diagram of an example embodiment of prior art context schemas. In FIG. 1I, the extended context of HandBackward-MouthFeelsTouch discovers that HandInFrontOfMouth boosts the schema's reliability, spinning off HandInFrontOfMouth-HandBackward-MouthFeelsTouch. Similarly, the discovery of the relevance of HandInFrontOfChin to HandBackward-Chin-FeelsTouch spins off the schema HandInFrontOfChin-HandBackward-Chin-FeelsTouch.

A context spinoff schema, like a result spinoff, need not be reliable. For an item to be a relevant condition for a given schema, the schema need only be significantly more reliable for one state of the item than for the other, but even the greater of these reliability levels can be arbitrarily small.

Once a schema has been created, it is used by the planning mechanism to perform several functions such as planning a sequence of actions to reach a goal, or exploring the hypothetical consequences of taking different actions (for purposes of planning or doing new learning). For these purposes a schema can be in one of the following states: IDLE, ACTIVE, SUCCEEDED, FAILED, ABORTED. A schema which is activated moves to the ACTIVE state, where it remains until it either succeeds (achieves its result), fails (action completes but result is not satisfied), or is aborted due to other conditions.

Figure 1J:
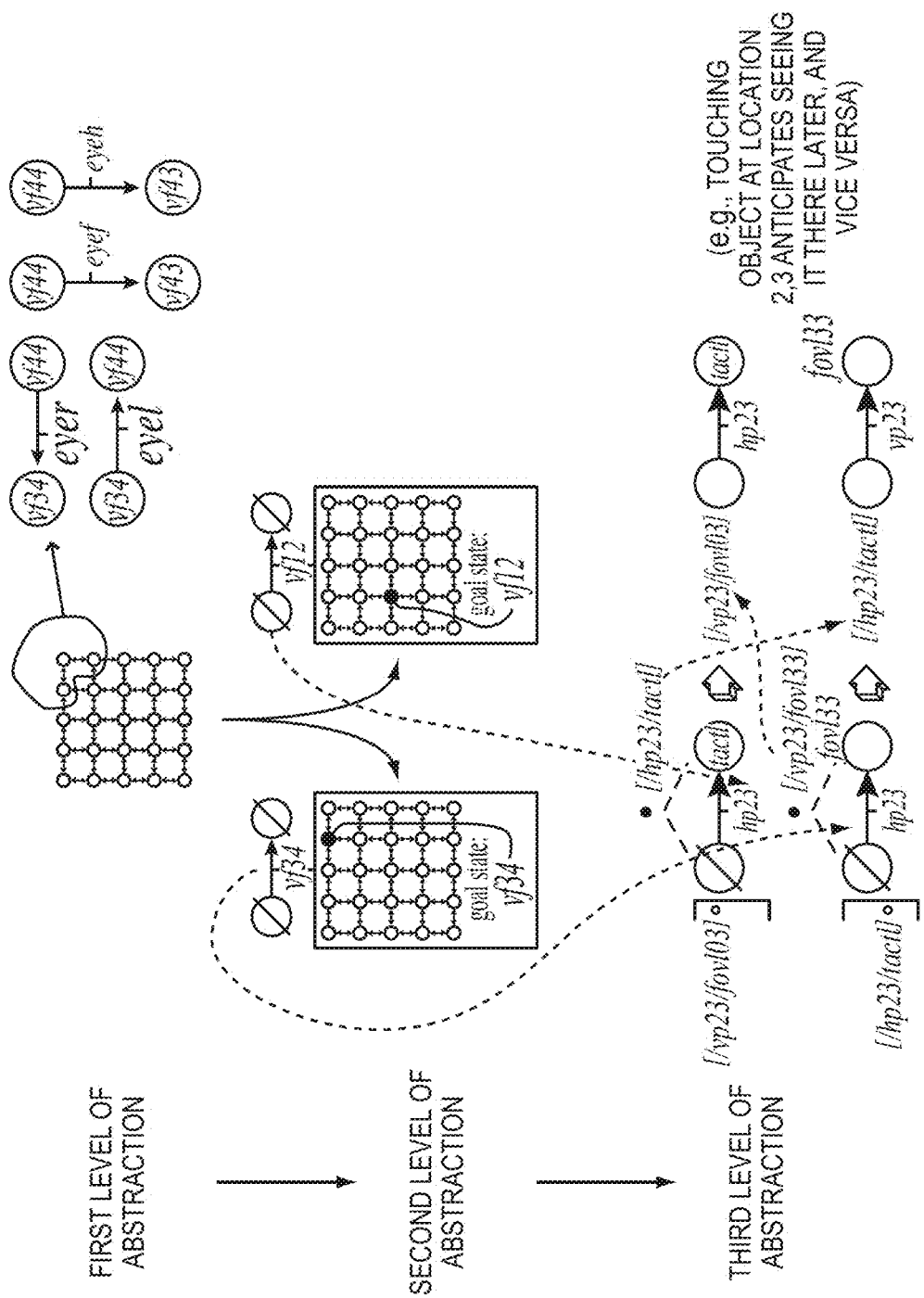
FIG. 1J is a block diagram of prior art schemas that have been learned after three levels of building abstractions.

FIG. 1J is a block diagram of prior art schemas that have been learned after three levels of building abstractions. the system starts to reliably understand object permanence in terms of anticipated results of tactile and visual probe actions which occurred in the recent past. For example, in the first level of abstraction, the system learns a spatial adjacency map of hand and eye motion schemas that leads to composite actions to move a hand and eye to a desired location in the second level which leads to learning the results of getting the eye or hand to a location, thereby leading to understanding object persistence in the third level. For example, as shown in the third level, touching an object at location 2,3 anticipates seeing it there later, and vice versa.

An example embodiment disclosed herein provides an enhancement to the marginal attribution method, disclosed above, for the case of schemas or APP nodes which contain synthetic items in their result set. An example embodiment, disclosed below, enables a learning system to correctly compute the success or failure of schemas or APP nodes which have synthetic items in their result sets. The reliability of a schema or APP node is defined as follows: a schema or APP node may succeed or fail (to obtain its result state) when activated. A schema or APP node has an average reliability which is the ratio of successful activations to the total number of successful and unsuccessful activations. A schema or APP node is said to be reliable when its reliability is above a threshold value, such as above 95%. It should be understood, however, that the threshold value is not limited to 95%.

A synthetic-item is a state item whose value is dynamically computed each clock step based on the success or failure of an associated host-schema or host-APP-node, disclosed below with regard to FIG. 1K, as well as some other verification conditions.

Figure 1K:
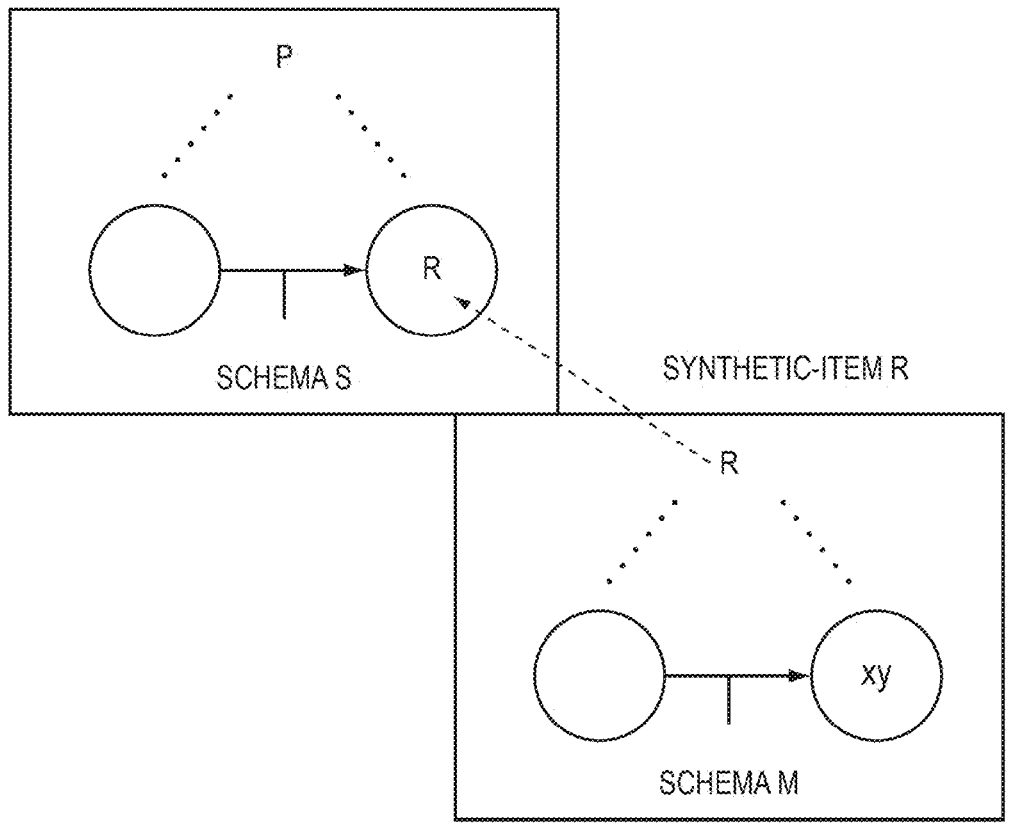
FIG. 1K is block diagram of an example embodiment of a schema that is host to a synthetic-item.

FIG. 1K is block diagram of an example embodiment of a schema M that is host to synthetic item R. When schema M succeeds, synthetic item R is set to the ON state. When schema M fails, R is set to OFF. However, unlike primitive sensory items which take on just the Boolean values of ON or OFF, a synthetic item can take on a third state, that is, UNKNOWN.

In an inner loop of the basic marginal attribution method, disclosed above, at each clock step, all activated schemas whose action has just completed compute whether they have succeeded or failed. Such calculation, in turn, makes it possible to compute the value of a schema's hosted synthetic item, if there is one. In a naive implementation, however, there is a race condition. Specifically, for a schema S which contains synthetic item R in its result, such as disclosed in FIG. 1K, it is useful to ensure that the value of R is up to date before using its value to decide the success or failure of S. An example embodiment performs an 'on-demand' update of synthetic item values that occur in the results of unreliable schemas or unreliable APP nodes, as disclosed below.

According to the example embodiment, an unreliable schema S, or unreliable APP node, includes a synthetic item R in its result and, in an event the synthetic item R's value has not yet been updated on the current clock step, as indicated by a timestamp, then the learning system recursively computes synthetic item R's value prior to using it to compute the success of S. This recursive computation may update the success flag on many other schemas or APP nodes.

Such recursive computation may result in a dependency loop, where during the recursive update of a schema S's success, the computation may eventually end up back at S again. According to an example embodiment, the learning system may be configured to break any loops by refusing to update the success status of a schema or APP node more than once per clock step.

If such a loop is encountered in the course of this recursive evaluation, and the success or failure of schema S or an APP node cannot be determined, schema S or the APP node may be flagged as being in an indeterminate state, having neither succeeded nor failed and, hence, may be excluded from updates by the marginal attribution learning method for this clock step. If it hosts a synthetic item, that synthetic item is set to the UNKNOWN state.

A learning system may learn persistent state via synthetic items. Very little of the important state of a world is visible at any instant. According to an example embodiment, a learning system may watch for behavior that reveals as-yet unrepresented bits of state in the world. A learning system may allocate new synthetic state items to track same.

Figure 1L:
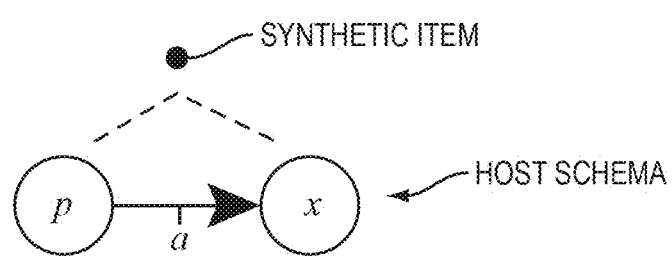
FIG. 1L is a block diagram of an example embodiment of a prior art synthetic item.

FIG. 1L is a block diagram of an example embodiment of a prior art synthetic item. The representation of a real object, such as a "yellow block," will emerge as a tightly coupled cloud of synthetic items and composite-action schemas. An example embodiment correctly updates synthetic item values at each clock step.

Synthetic items are similar to primitive sensory input items, however, whereas primitive sensory input values are provided from external sources at each time step, the state of synthetic items is not supplied externally, and needs to be computed internally by the schema mechanism at each time step. Rules used for this update may be referred to interchangeably herein as the "verification conditions" for a synthetic item.

On each new time step, the values of all synthetic items need to be updated, based on their previous state, and on the success or failure of any schema s which have just been activated (successfully or unsuccessfully). In the examples below, if a schema S is host to a synthetic item, the synthetic item is denoted using square braces around the notation for the schema. It should be understood that the examples below further apply to APP nodes.

The Primary Verification Condition: Host Trial

The primary way that synthetic item values are set is using the "host trial" test: If a synthetic item's host schema has just finished activation, then it's synthetic item is set to ON if it succeeded. If, however, it failed, the synthetic item is set to OFF. For example, if S is a schema with an empty context, action a and result r, the schema is written using the notation /a/r, and if it hosts a synthetic item, the synthetic item is denoted using square braces as shown below:

[/a/r] the synthetic item hosted by schema /a/r

Figure 1M:
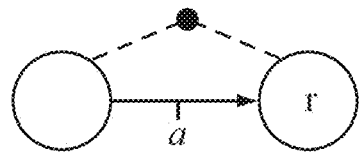
FIG. 1M is a block diagram of an example embodiment of a synthetic item.

FIG. 1M is a block diagram of a simple case of an example embodiment of a synthetic item [lair] (represented by the black dot ● in the block diagram), which is hosted by schema S. The block diagram of FIG. 1M shows a host schema S with primitive action a, whose result contains primitive item r. When action a completes, the success or failure of S can be computed directly; if the Boolean result expression r is found to be satisfied, then S succeeded, otherwise it failed. If S succeeded, synthetic item[/a/r] is set to ON, otherwise it is set to OFF.

An example embodiment computes a schema's Success/Failure when it has synthetic items in its result. If a schema S is activated, a determination is made as to whether the schema succeeded or failed. Such a determination may be made by evaluating if its result expression is satisfied. This requires knowing the final value of any item in the result set. What happens in the case that an item in the result set is a synthetic item?

Figure 1N:
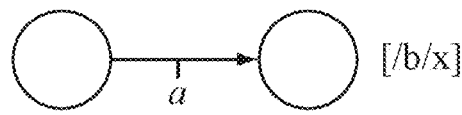
FIG. 1N is block diagram of an example embodiment of schema with a synthetic item in its result.

FIG. 1N is block diagram of an example embodiment of schema S with a synthetic item [/b/x] in its result. As the schema S is evaluated, in order to decide whether it succeeded or failed, it is useful to know the value of the synthetic item [/b/x], but that value may not have been updated yet on this time step.

According to an example embodiment, a timestamp is used to determine if a synthetic item has been updated yet on a given time step. If a schema's result includes a synthetic item whose value has not yet been updated for the given time step, an example embodiment computes that item's value, recursively, by evaluating the success or failure of its host schema (i.e., /b/x in this case). Such recursion may end up evaluating an arbitrary number of schemas before returning. Once the result items values have been updated, the system can then proceed to finally evaluate the success or failure of the schema S.

A similar issue also arises if a schema S has an action a which is a composite-action, and the goal-state of a includes a synthetic item. An example embodiment computes schema success or failure when a schema's composite action's goal-state is a synthetic item, such as disclosed below with regard to FIG. 1O.

Figure 1O:
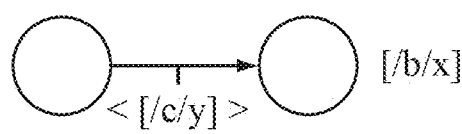
FIG. 1O is a block diagram of an example embodiment of a composite action with a synthetic item as its goal state

FIG. 1O is a block diagram of an example embodiment of a composite action with a synthetic item as its goal state, that is, [/c/y/] in this case.

In order to determine if action a actually completed on a given time step, it is useful to know if its goal state is satisfied. To determine same, an example embodiment may compute, recursively, the value of the synthetic item in question, that is, ([c/y/] in this example, which enables a determination for whether its value satisfies the goal-state required by the composite action a. A recursive descent method on the schema graph is, thus, used to compute synthetic items values when they are encountered in results of schemas or goal states of composite actions.

An example embodiment provides an alternate method to compute synthetic item values. The alternate method may use graph relaxation, as disclosed below. The simplest implementation of the recursive descent method, disclosed above, would be a serial process and, as such, would not take full advantage of parallel hardware, if available. According to an example embodiment, there are two ways the method to evaluate item values could be speeded up by using parallel hardware, as disclosed below.

First, on a system with N parallel processors, the set of all schemas could be divided into N lists, and each processor would do the serial recursive descent evaluation of item values on its list of schemas. Schemas and synthetic items would be marked with a timestamp as they are updated, so that the multiple threads of computation would not re-compute the same node twice in a given time step. According to an example embodiment, if one thread of execution encounters a timestamp which has been updated to the current clock value, it returns immediately without trying to further evaluate that item or schema.

Second, a graph-relaxation method could be used, where again the set of all schemas may be divided among N processors. Relaxation in a graph is an iterative process whereby a function is run in parallel over each node, which only looks at values of immediately adjacent nodes in the graph, such as the knowledge graph 222 of FIG. 2A, disclosed further below. As the relaxation step is repeated, updated information flows throughout the graph across multiple nodes. In this case, each schema or APP node would repeatedly update its success value (and hence the value of its synthetic item, if it hosts one) using the current item values which it sees as inputs. This relaxation step would be repeated until the values of all items and schema or APP node success flags converge (stop changing), or until some maximum number of relaxation steps has been reached.

According to an example embodiment, verification conditions may be applied in a priority order when updating synthetic item values. According to an example embodiment, there may be four verification condition rules that the system uses to determine the value of a synthetic item. There is a priority ordering to the "strength" of verification conditions, where a stronger rule will override any value computed by a weaker rule.

The four verification conditions for updating a synthetic item's value are shown in the table below, in order of their strength, with the weakest rule listed first and the strongest last.

reliable APP node that has just succeeded, the system is configured to set the item's value to the predicted result state.

In a third phase, "DESCENDANT," for each host schema S or host APP node, if a descendant is applicable and reliable, the system is configured to turn on the synthetic item hosted by S or the APP node.

In a fourth phase, "HOST_TRIAL," if a schema or APP node just succeeded or failed, and hosts a synthetic item, the system is configured to set the synthetic item to ON or OFF respectively.

In the second, third, and fourth phase, disclosed above, it may be necessary to compute, recursively, the value of some synthetic items, in order to know if a schema or APP node succeeded or failed, as disclosed above in updating synthetic item values by host trial, that is, using the "host trial" test.

According to example embodiments disclosed herein, an APP node differs from a schema as the APP node is enhance relative to the schema. The APP node may be a schema that has been enhanced in in one or more of several ways with the use of a multilayer neural network, such as disclosed below with regard to FIG. 2A. Such an enhanced schema is referred to as an APP node. APP nodes may further benefit from the disclosure above, for example, that provides enhancements to the marginal attribution method and updating of synthetic items. APP nodes add common sense reasoning capability over present AI approaches that may, for example, be based on schemas and do not employ such enhancements disclosed herein.

Figure 2A:
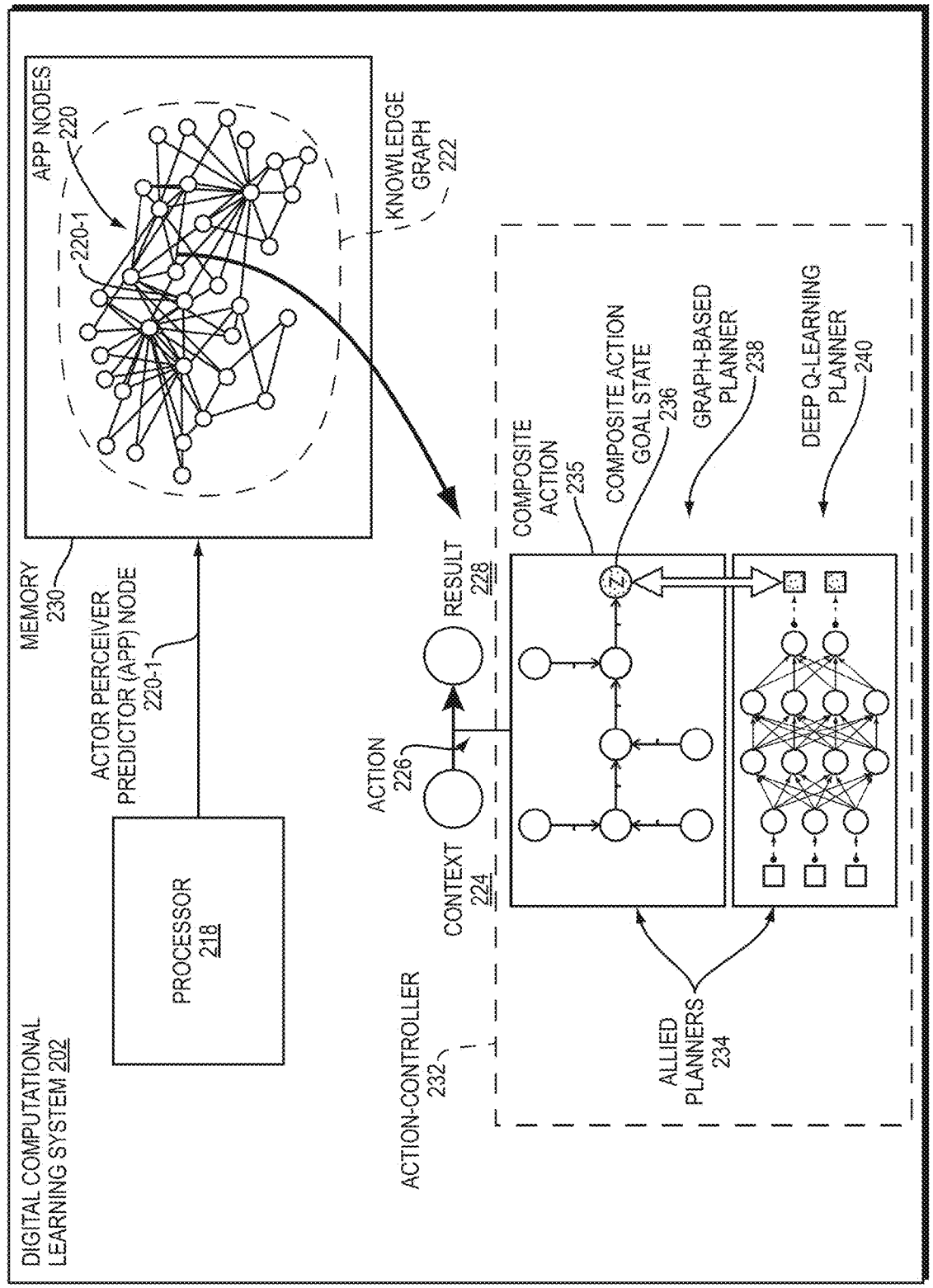
FIG. 2A is a block diagram of an example embodiment of a digital computational learning system for planning actions to accomplish tasks.

FIG. 2A is a block diagram of an example embodiment of a digital computational learning system 202 for planning actions to accomplish tasks. The digital computational learning system 202 may be employed as the learning agent 102, disclosed above with reference to FIG. 1A and FIG. 1B. The digital computational learning system 202 comprises a processor 218 configured to learn, automatically, a plurality of actor perceiver predictor (APP) nodes 220 of the knowledge graph 222 (also referred to interchangeably herein as a

TABLE 1

| | |
|---|---|
| TIMEOUT | If item has been ON or OFF longer than its characteristic duration, set it to UNKNOWN |
| PREDICTION | If a synthetic item appears in the result of a reliable schema or APP node, and that schema or APP node just succeeded, set item to value predicted in the schema or APP node's result. If the schema or APP node was activated but failed, the synthetic item is not modified. |
| DESCENDANT | If the host schema or host APP node of a synthetic item has a child schema or child APP node which is reliable and applicable, turn ON the synthetic item, since it is known that the schema or APP node would succeed if activated right now. |
| HOST_TRIAL | If the synthetic item's host schema or host APP node was activated and succeeded, set item value to ON, if it failed set item to OFF |

According to an example embodiment, in order to obey the verification conditions in Table 1 disclosed above, at each time step, synthetic item values are updated in four ordered phases. In a first phase, namely "TIMEOUT," a timeout is implemented. The system is configured to check if the timeout value for each synthetic item has been exceeded; an item which has been ON or OFF for longer than its characteristic time duration is set to the UNKNOWN state. The characteristic time duration for a synthetic item is computed empirically by the system by observing on average how long its host schema or host APP node tends to remain reliable.

In a second phase, "PREDICTION," for those synthetic items which appear in the result of reliable schema or "core" knowledge graph). The digital computational learning system 202 comprises a memory 230 and the processor 218 is configured to store the knowledge graph 222 in the memory 230. Each APP node of the plurality of APP nodes 222 is an extension of a schema, disclosed below. Each APP node is an extension of the schema, disclosed below, as each APP node is extended to include new machinery, that is, the action-controller 232 that includes an instance of a planner that includes allied planners as disclosed further below.

Similar to a schema, each APP node of the plurality of APP nodes 220, such as the APP node 220-1, is associated with a context 224, action 226, and result 228. The result 228 is expected to be achieved in response to the action 226 being taken as a function of the context 224 having been satisfied. As disclosed herein, an APP node is an enhancement of a schema.

Actions, such as the action 226, are central to the APP nodes of the plurality of APP nodes 220. Each APP node is a basic unit for representing functional models that 1) perceive context, 2) act, and 3) note a result. In the knowledge graph 222, the plurality of APP nodes 220 form a hybrid symbolic-neural-network architecture, that is, the knowledge graph 222, to create increasingly more abstract levels of re-useable knowledge. The digital computational learning system 202 can learn from zero knowledge and smoothly increase knowledge abstraction during learning as it learns and adds APP nodes to the plurality of APP nodes 220 in the knowledge graph 222.

Each APP node is an extension of a schema as it is associated with an action-controller 232 that includes the allied planners 234. The action 226 is an abstraction that includes a composite action 235. The composite action 235 represents APP nodes that are chosen, dynamically, to reach the goal state 236, for example, a planned sequence of APP nodes activations to reach a goal, that is, the goal state 236. The action-controller 232 implements the planning machinery, that is, the allied planners 234, to reach the composite action's goal state, that is, the goal state 236.

The action-controller 232 is associated with a goal state 236, that is z. A job of the action-controller 232 is to supply the next action to take, in order to make progress towards the goal state 236. The action-controller 232 is configured to access the knowledge graph 222 and employ the allied planners 234 to determine a sequence of actions (not shown) for reaching the goal state 236 by selecting and chaining, dynamically in the memory 230, at least a portion of APP nodes learned of the plurality of APP nodes 220 that are learned. The sequence of actions includes respective actions of the at least a portion of APP nodes learned, selected, and chained.

Similar to a schema, each APP node of the plurality of APP nodes 220 is a unit of knowledge, both declarative and procedural. Declaratively, each APP node makes a factual assertion, that is, an assertion about what would happen under certain circumstances. Procedurally, the APP node can say (e.g., define) how to pursue a goal represented by the goal state 236. The goal may be in the APP node's own result 228, or the APP node may facilitate the activation of some other APP node whose result includes the goal. An APP node is also a unit of experimentation, comparing what happens when an action is taken to what happens without it, and new APP nodes arise from such experiments, such as the experiments disclosed above with regard to schemas. The knowledge graph 222 is the system's common repository of all APP nodes. Each APP node has a respective action-controller 232 that can reference the knowledge graph 222 to dynamically plan a least-cost sequence of actions to its goal state using graph search methods.

The APP node's action-controller 232 may employ the allied planners 234 to compute the least cost sequence of actions to reach the goal state 234 over the system's graph of learned APP nodes, that is, the knowledge graph 222, to find the best path from a currently accessible state to the goal, that is, the goal state 234. The action-controller 232, also referred to interchangeably herein as a planner, employs the allied planners 234 and may be referred to herein as having an allied planning network (APN) architecture. The allied planners 234 may be a hybrid of different neural networks and may be referred to interchangeably herein as Allied Planning Networks (APNs) because such networks advise each other, as disclosed below.

According to an example embodiment, the allied planners 234 of an APP node include a graph-based planner 238 and a deep Q-learning (DQL) planner 240. The DQL planner 240 may be referred to interchangeably herein as a DQL network. The DQL planner 240 may be an open source DQL network, such as a TensorFlow® DQL network. It should be understood, however, that the DQL planner 240 is not limited to a TensorFlow DQL network or another open source DQL network.

The graph-based planner 238 may be a breadth-first search (BFS) planner that can provide partial rewards to the DQL planner 240, as progress toward the goal is observed. For example, the composite-action 235 has a goal state 236, that is, a goal, which provides a reward for the DQL learning network. According to an example embodiment, the BFS planner can provide partial rewards to a DQL network as progress toward a goal is observed. The APP node's graph-based planner 238 can provide partial rewards to the DQL planner 240 as it knows not just when the result is obtained, but also has estimates of the distance (in action and state space) to the goal state 234. Providing partial rewards speeds up training of the DQL planner 240. When the graph-based planner 238 is unable to make progress towards the goal, or can see no path at all, the DQL network can suggest actions, such as to try using a standard epsilon-greedy gradient descent search method to try to make progress.

As disclosed above, the DQL planner 240 is an "allied planner" network that can be run in parallel with the graph-based planner 238 in each APP node's action-controller, such as the action-controller 232, the purpose being to suggest the optimal action to take to reach the action-controller's goal state 236 given an input state vector, such as the input state vector 217 (i.e., s) that is input to the deep neural network (DNN) of FIG. 2B, disclosed below.

Figure 2B:
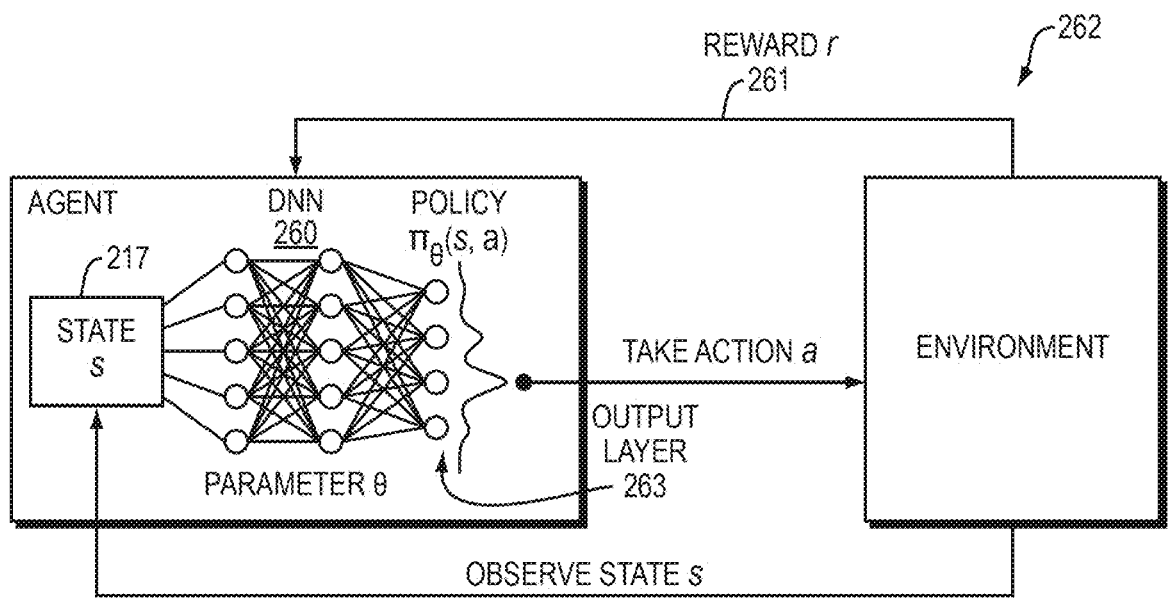
FIG. 2B is a block diagram of an example embodiment of a prior art learning system that includes a deep neural network (DNN).

FIG. 2B is a block diagram of an example embodiment of a prior art learning system 262 that includes a deep neural network (DNN) 260. The DNN 260 may be used as a DQL network and employed as the DQL planner 240 of FIG. 2A. The DNN 260 may be used as a DQL network, such as described by Mnih, V. et al., "Playing Atari with Deep Reinforcement Learning," Dec. 19, 2013, the entire teachings of which are incorporated herein by reference, with inputs and outputs described below with reference to FIG. 2B.

In the learning system 262, the input to the DNN network 260, that is, the state 217 (i.e., s), may be the same vector of input item Boolean values (both primitive and synthetic items) as used by the rest of the learning system 262. The output layer 263 of the network 260 is a set of nodes corresponding to possible actions to take. The output node with the highest value would be chosen as the best suggested action to cause the corresponding allied action-controller (not shown) of the APP node (not shown) to reach its goal state.

The reward function 261 is supplied by the APP node's action-controller, with a maximum reward supplied if the last action taken caused the action-controller's goal state to be reached, and a partial reward optionally supplied if the action-controller can estimate the proximity to the goal state. According to an example embodiment, to save memory and central processing unit (CPU) time, the learning system 262 may be configured to only choose a subset of possible input items as input to the DQL network 260, and a subset of possible actions for the output layer, using a heuristic to prune the possible items and actions of interest.

According to an example embodiment, another use of a neural network, such as the DNN 260 of FIG. 2B, is to provide an extra advisory function to the APP node's context mechanism as disclosed with reference to FIG. 2C and FIG. 2D, below.

Figure 2C:
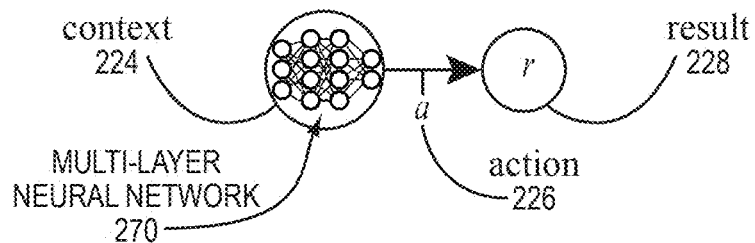
FIG. 2C is a block diagram of an example embodiment of a context of an actor perceiver predictor (APP) node wherein the context employs a multi-layer neural network.

FIG. 2C is a block diagram of an example embodiment of a context 224 of an APP node that employs a multi-layer neural network 270. As disclosed with regard to FIG. 2A, above, each APP node of the plurality of APP nodes 220, such as the APP node 220-1, is associated with the context 224, action 226, and result 228. In the example embodiment, the context 325 employs the multi-layer neural network 270 for high accuracy perception, internally. Once a result has been identified, the context 224 can be augmented with other pattern recognition, such as reinforcement learning. A non-explicit context is, however, less useful for planning, as it is hard to forward chain to it. The multi-layer neural network 270 that is employed in the context 224 may be referred to interchangeably herein as a context neural network (NN). The context NN is disclosed below with reference to FIG. 2D.

Figure 2D:
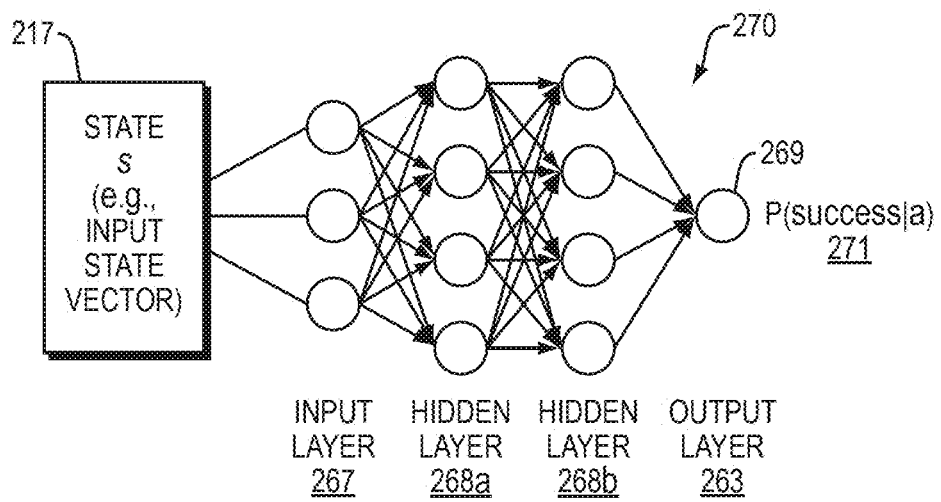
FIG. 2D is a block diagram of an example embodiment of an advisory multi-layer neural network employed in a context of an APP node.

FIG. 2D is a block diagram of an example embodiment of the advisory multilayer neural network 270 employed in the context 224 of an APP node. The advisory multilayer neural network 270, that is, the context NN, predicts APP node success or failure. The advisory multilayer neural network 270 includes an input layer 267, multiple hidden layers, namely a first hidden layer 268a and second hidden layer 268b, and the output layer 263. It should be understood that the advisory multilayer neural network 270 is not limited to including two hidden layers. The advisory multilayer neural network 270 serves a similar function to a context of a schema.

Specifically, the advisory multilayer neural network 270 predicts, given the state 217, that is, the current input state vector s, the probability of successfully obtaining the result 228 if the schema were to be activated. The context NN takes as input the same input state vector as is used by the marginal attribution learning machinery, disclosed further below, and has a single output node 269 indicating the probability 271 of success of the schema.

In contrast to a schema, however, the context NN 270 of the context 224 of an APP node has the advantage that it learns not just a simple Boolean conjunction of items, but a potentially more complex function. The neural network representation has a disadvantage compared to the schema's context item set because it does not explicitly specify a compact list of the items and their required states which should be set in order to guarantee successful activation. Hence, it cannot be used as effectively by a planner for backward or forward chaining to reach a goal state. It can, however, potentially identify APP nodes that are applicable for a given world state vector, such as the current world state vector 445 of FIG. 4B, disclosed further below, more accurately relative to the normal marginal-attribution context discovery mechanism, disclosed above. This provides an alternate way to identify which APP nodes are currently applicable given a world state input vector, and that is useful to any planner to expand its pool of applicable schemas or APP nodes from which to start activating to reach its goal.

According to an example embodiment, the context neural-network 270 is a DNN that is trained to learn to predict the probability 271 that the APP node will succeed, given a current world state, such as the current world state vector 445 of FIG. 4B, disclosed further below. The advantage of the example embodiment is that there may be cases where a DNN can more accurately learn to predict whether a schema or APP node will succeed relative to using the simple Boolean conjunctive expression described in Drescher's basic schema mechanism.

A possible disadvantage of the context NN is that it may not be possible for a planner to easily chain backwards from a schema or APP node's context, as noted above, because the neural-network representation does not explicitly identify which (small) set of inputs are most important to set to specific values in order to ensure success of the schema or APP node. Nonetheless, the context NN is still useful to be able to accurately predict if a schema or APP node is likely to succeed given a world state input, even if the system cannot figure out which inputs to modify to increase the probability 271 of success.

For example, if a planner has identified several possible different schemas or APP nodes to activate for a given step in its plan, the context NN can help decide which schema or APP node is most likely to succeed given the current world state, as opposed to relying on the schema or APP node's general long-term reliability averaged over many different world states. The identification of which schemas or APP nodes are applicable, via such context deep neural-network machinery, can also be used to do forward chaining to a goal state by a planner, such as the action-controller 232 of FIG. 2A.

Referring back to FIG. 2A, as the number of (abstract) actions that the digital computational learning system 202 has learned grows, a conventional DQL planner may require exponentially more time to explore the state space. An example embodiment provides a solution to this issue by causing the graph-based planner 238 to filter the suggested actions down to a tractable number for the DQL planner 240 to absorb, using its knowledge of actions most likely to work (i.e., succeed). As such, the graph-based planner 238 is further configured to filter, based on a knowledge database of successful actions, a set of possible actions available to the DQL neural network to train on According to an example embodiment, the DQL planner 240 can also optimize working plans suggested by the graph-based planner 238 to make them more efficient. The outcome is flexible planning and execution of simple tasks and subtasks, even in the presence of obstacles which may, as yet, be un-representable by the developing reasoning system. According to an example embodiment, a machine learning module (not shown) may be added that is configured to learn from experience the context conditions within which each planner works best.

As disclosed above, the allied planners 234 are coupled in the APN architecture and form a mutually-advisory heterogeneous planner system. If one planner of the allied planners 234 gets "stuck," that is, is unable to progress toward the goal, that is, the goal state 234, another planner of the allied planners 234 can be swapped in, that is, selected, in order to continue activating APP nodes and chaining such active APP nodes in order to plan a sequence of actions for obtaining a result. Such planning may be performed within a software architecture, such as the software architecture 300 of FIG. 3A, disclosed below.

Figure 3A:
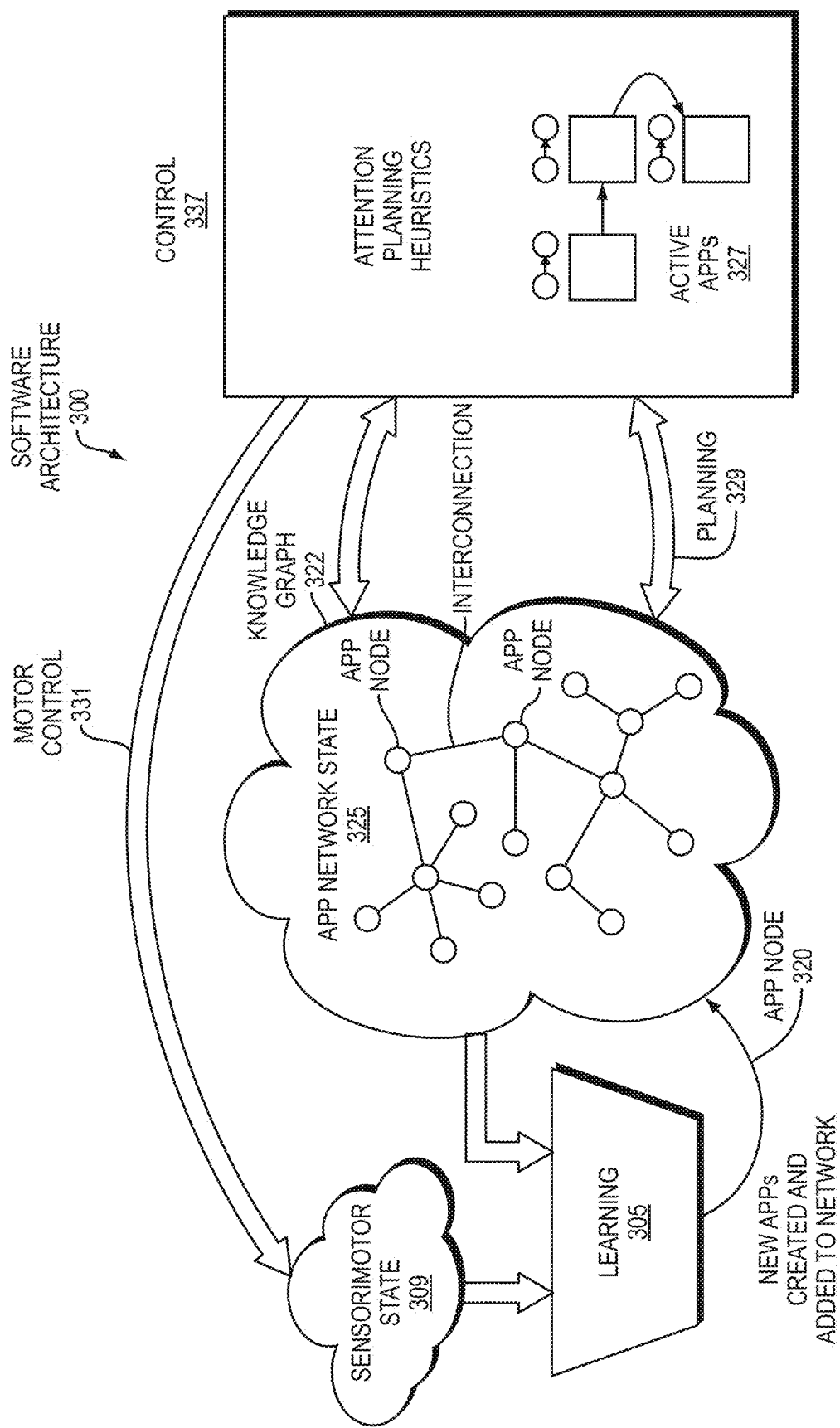
FIG. 3A is a block diagram of an example embodiment of a software architecture for the digital computational learning system of FIG. 2A.

FIG. 3A is a block diagram of an example embodiment of a software architecture 300 for the digital computational learning system 202 of FIG. 2A. In the software architecture 300, the digital computational learning system 202 is learning 305 based on sensorimotor state 309, and creating new APP nodes, such as the APP node 320, and adding the newly created APP nodes to the network, that is, the knowledge graph 322. The knowledge graph 322 has an associated APP network state 325 that defines the plurality interconnections between the plurality of APP nodes of the knowledge graph 322.

In the software architecture 300, APPs of the knowledge graph 322 are activated by action-controllers and such APPs may be referred to as active APPs 327, or active APP nodes. The active APPs 327 are activated as part of the planning 329 that is performed by action-controllers, such as the action-controller 232 of FIG. 2A, disclosed further below. Such active APPs 327 may be chained to define control 337 that may be implemented by the processor 218 of FIG. 2A. For example, with reference to FIG. 3A, the control 337 may include a plan for motor control 331 that may be applied to at least one motor of a sensorimotor system (not shown) to obtain a result, such as the result 228 of FIG. 2A, thereby altering the sensorimotor state 309 that affects the learning 305 of the APP nodes of the knowledge graph 322. As disclosed above with regard to FIG. 2A, the APP node's action-controller 232 may employ the allied planners 234 to compute the least cost sequence of actions to reach the goal state 234. The allied planners 234 may advise each within an APN architecture, such as the APN architecture 400 of FIG. 4A, disclosed further below.

Figure 3B:
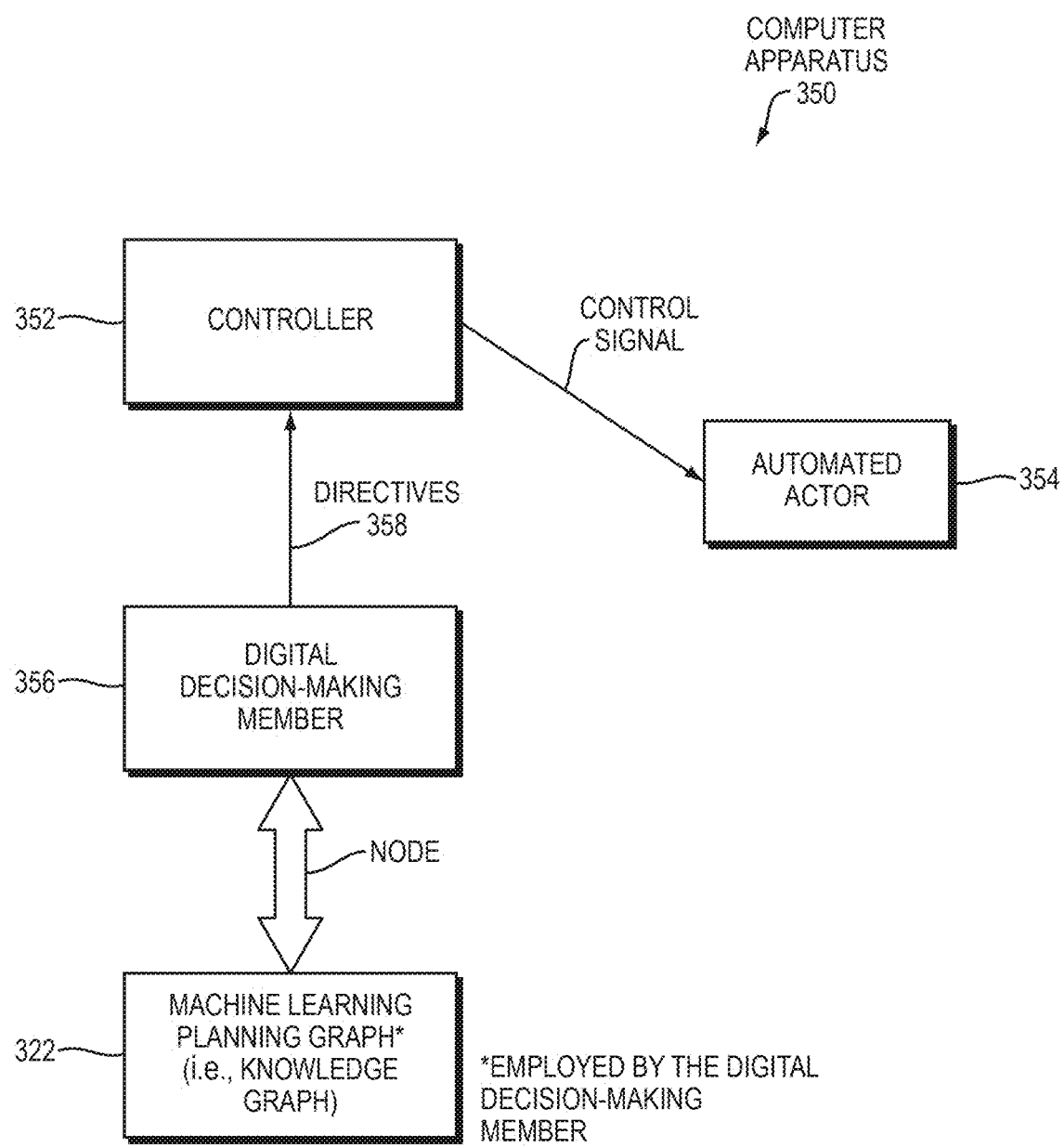
FIG. 3B is a block diagram of an example embodiment of a computer apparatus that may employ the example embodiment of the software architecture of FIG. 3A.

FIG. 3B is a block diagram of an example embodiment of a computer apparatus 350 that may employ the example embodiment of the software architecture 300 of FIG. 3A, disclosed above. According to the example embodiment, the computer apparatus 350 comprises a controller 350 controlling movement of an automated actor 354 and a digital decision-making member 356 coupled to provide directives 358 to the controller 352. The digital decision-making member 356 utilizes a machine learning planning graph, such as the knowledge graph 322 of FIG. 3A, that is formed of a plurality of nodes, such as the plurality of APP nodes 220 of FIG. 2A, disclosed above. Different sequences of two or more of the nodes in the graph 322 produce different directives. Each node has a tuple representing a context, an action, and corresponding result, such as the context 224, action 226, and result 228 of FIG. 2A, disclosed above. Different nodes have different tuples.

The automated actor 354 may be one of a robot in a real-world environment, such as the learning agent 102 in the assistive home 100 of FIG. 1A, disclosed above, and an agent in a virtual environment, such as a learning agent within a computer simulation of the assistive home 100 or another virtual environment.

Each node employs a neural network, such as the DNN 260 of FIG. 2B, disclosed above, and may have inputs and outputs, such as disclosed above with regard to FIG. 2B. Such a neural network may be (1) a multi-layer neural network configured for Deep Q Learning, (2) a neural network used to predict when the context is satisfied, such as the auxiliary neural network 444 of FIG. 4B, disclosed further below, which is also a multilayer neural network, however, not configured to suggest an action as is done for Q learning but rather to predict if the APP node, when activated, would succeed, or a combination of (1) and (2), such as a combination of the DQL neural network 441 of FIG. 4A, disclosed below, and the auxiliary neural network 444 of FIG. 4B, disclosed further below.

Figure 4A:
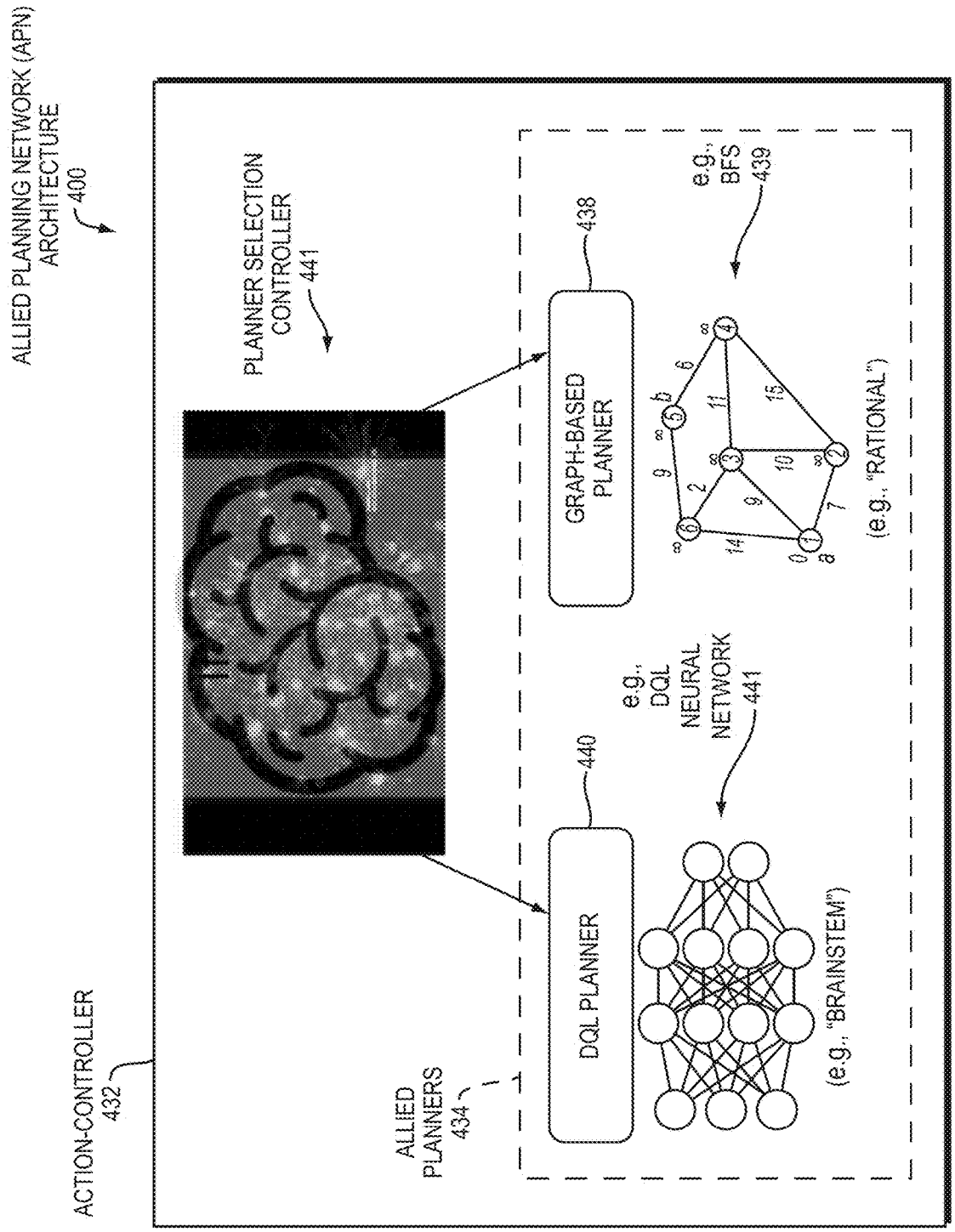
FIG. 4A is a block diagram of an example embodiment of the allied planning network (APN) architecture within which an actor perceiver predictor (APP) graph-based planner and deep Q-learning (DQL) planner advise each other.

FIG. 4A is a block diagram of an example embodiment of an APN architecture 400 within which an APP graph-based planner 438 and DQL planner 440 advise each other. In the APN architecture 400, an action-controller 432 includes the allied planners 434, namely, the APP graph-based planner 438 and DQL planner 440, and a planner selection controller 441 that is configured to select a given planner among the allied planners 434. The action-controller 432 may be employed as the action-controller 232 of FIG. 2A, disclosed above.

In the example embodiment of FIG. 4A, the allied planners 434 of the action-controller 432 include a graph-based planner 438 and a DQL planner 440. The DQL planner 440 may be referred to as the "brainstem" of the instance of a high-level planner included in the action-controller 432 and the graph-based planner 438 may be referred to as the "rational" planner of the instance of the high-planner included in the action-controller 432. According to an example embodiment, the graph-based planner 438 may employ a breadth-first search (BFS) method 439 over the system's knowledge graph of learned APP nodes, such as the knowledge graph 222 of FIG. 2A, disclosed above, to find the best path from a currently accessible state to the goal, such as the goal state 236 of FIG. 2A.

According to an example embodiment, the DQL planner 440 is a DQL neural network. If one of the allied planners 434 is unable to progress toward a goal state, such as the goal state 236 of FIG. 2A, the planner selection controller 441 can cause the action-controller 432 to de-select the planner that is presently selected and select another planner of the allied planners 434, thereby "swapping" out the presently active planner that is being used to progress toward the goal state. An example embodiment a) smoothly increases knowledge abstraction during learning and b) integrates learned knowledge graphs with planning. If one planner gets stuck, another is swapped in. Together, a) and b) enable common sense reasoning in the learning agent's world, such as the assistive home 100 of the learning agent 102, or another world of another learning agent. Control over such planner swapping may be implemented by the planner selection controller 441, disclosed in more detail further below with regard to FIG. 4B.

An example embodiment that combines graph-based planning and DQL, such as in the APN architecture 400, provides performance improvements over a DQL planner alone, such as the DNN 260 of FIG. 2B. A computer learning system that is based on the APN architecture, such as the digital computational learning system 202 of FIG. 2A, disclosed above, combines graph-based planning and DQL and can, for example, learn a simple grid navigation task polynomially faster than a state-of-the-art neural network Deep-Q Learning planner.

For example, for a 2-dimensional grid with dimension n (n grid squares on a side, hence has $n^2$ grid locations), with sparsely distributed obstacles, a DQL network system alone requires on the proportional to $n^{2.5}$ time (n to the power of 2.5) steps to learn how to navigate from any arbitrary start position to any destination. An example embodiment of computer learning system that is based on the Allied Planning architecture learns this task more quickly, with a worst-case runtime proportional only to $n^2$ steps.

Further, greater speedup is available if the n×n grid is divided into slightly overlapping quadrants, and training epochs are structured such that the system is restricted to explore one quadrant at a time. If the training is structured in this way, the example embodiment of computer learning system that is based on the Allied Planning architecture will then learn the task in time proportional to $(n/4)^2$ whereas the DQL system will still be on the order of $n^{2.5}$.

For example, with a grid of dimension n=12 (144 grid squares), the computer learning system that is based on the APN architecture 400 can be trained in time proportional to $3^2=9$ epochs (because n/4=12/4=3), whereas the DQL system will require training time proportional to $n^{2.5}=12^{2.5}=\sim500$ epochs, making the computer learning system that is based on the APN architecture 400 approximately 50 times faster for this size grid. In the APN architecture 400, a planner selection controller 441 is configured to select a given planner among the allied planners 434, such as disclosed below with regard to an example embodiment of an action-controller architecture 450. The planner selection controller 441 may be referred to interchangeably herein as an auxiliary planner. The auxiliary planner, in combination with the graph-based planner 438 and DQL planner 440, may be referred to interchangeably herein as an instance of a planner or high-level planner that is included in the action controller 450.

Figure 4B:
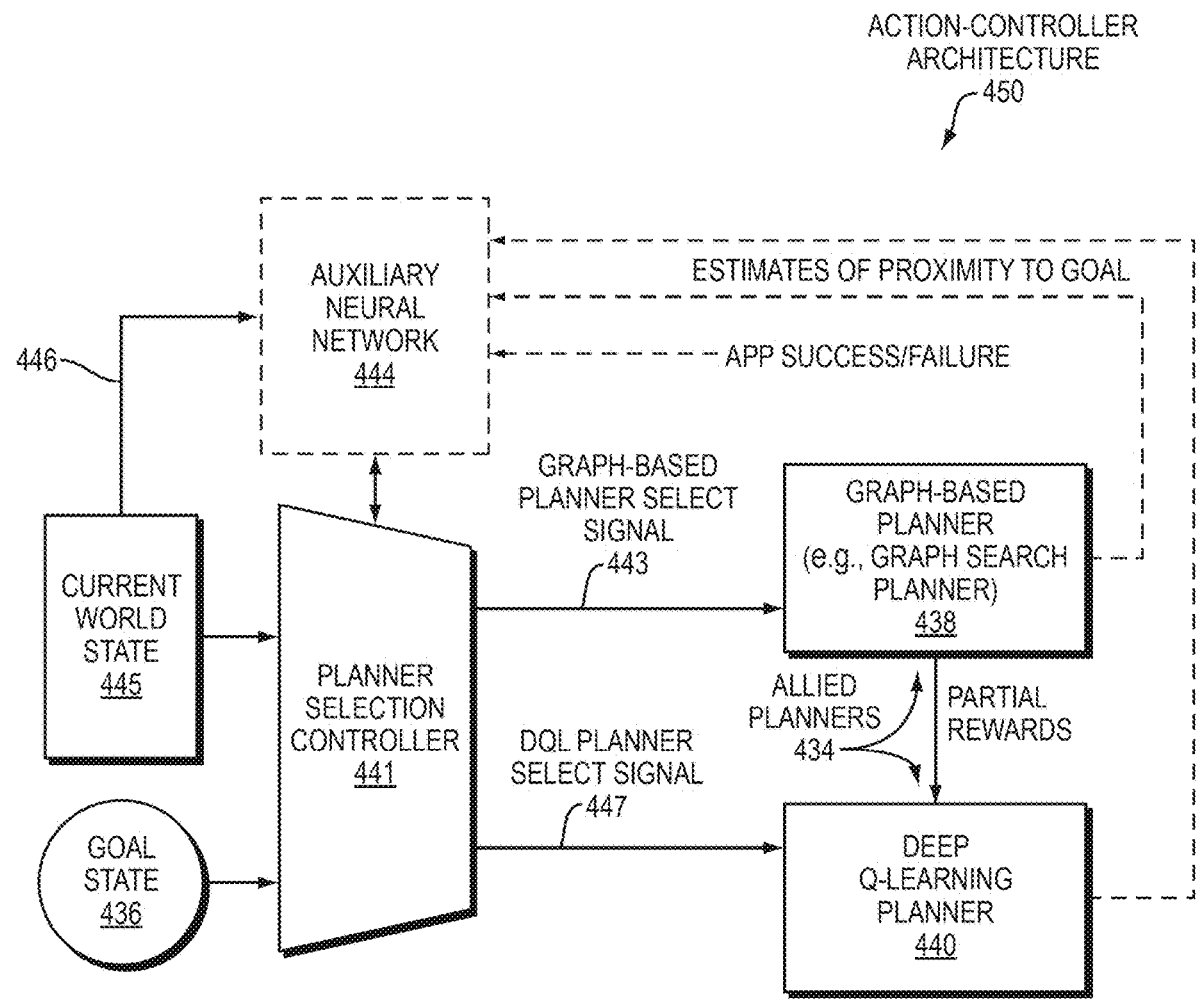
FIG. 4B is a block diagram of an example embodiment of an action-controller architecture.

FIG. 4B is a block diagram of an example embodiment of the action-controller architecture 450 that may be employed by the action-controller 432 of FIG. 4A or the action-controller 232 of FIG. 2A, disclosed above. The action-controller architecture 450 includes machinery that may be used to dynamically decide at any point in time which planner to use, that is, whether to use the graph-based planner 438 or the DQL planner 440, as disclosed below.

When the action-controller 432 is asked to supply the next APP node to activate, the system 202 chooses, dynamically, whether to use an APP node suggested by the graph-based planner 438 or by the DQL planner 440. It may be the case that the two planners disagree on an APP node to use next. According to an example embodiment, the following heuristic may be employed to decide which planner's suggested APP node to use.

The action-controller 432 may select the graph-based planner 438 first and, if it provides a reliable APP node to use, then such APP node may be activated. If, however, the graph-based planner 438 is unable to find a reliable APP node or the suggested APP node, when activated, is observed to make no progress toward the goal state 236, then the action-controller 432 may be configured to use the action-controller's DQL planner 440 to supply a suggested next APP node to activate. Such an example embodiment learns which planner of the allied planners 434 to trust in order to suggest the next APP node to activate when executing a plan.

An example embodiment provides an improvement on the planner-selection heuristic disclosed above. According to the example embodiment, the action-controller 432 includes an auxiliary neural network 444 that may be referred to interchangeably herein as an auxiliary planner 444 and configured to decide whether to trust the graph-based planner 438 or the DQL planner 440. The graph-based planner 438, DQL planner 440, and auxiliary planner 444 may, in combination, be referred to interchangeably herein as a planner or planner module, or an instance thereof. The auxiliary neural network 444 may also be referred to interchangeably herein as a preference-network (P-network) as it is responsible for learning which planner's result to prefer in a current world-state 445. The P-network is trained to advise the planner selection controller 441 which planner of the allied planners 434 to use given a world state vector. The planner selection controller 441 may control which planner is used by activating a graph-based planner select signal 443 to select the graph-based planner 438 and by activating a DQL planner select signal 447 to select the DQL planner 440. The P-network may be used as a classifier that determines which planner to use to reach the goal-state, such as the goal state 236 of FIG. 2A, most quickly, given a set of state inputs, such as the state inputs 217 disclosed above with reference to FIG. 2B.

The auxiliary neural network 444 acts as a Deep-Q learning network itself, and is trained to decide which planner of the allied planners 434 to recommend in order to reach the action-controller's goal-state 436 most quickly. According to an example embodiment, the auxiliary neural network 444 (i.e., P-network) is trained by giving it the following inputs after a given APP node has been selected and activated: (i) which planner was used, (ii) the current world state item vector 446, (iii) vector of the activation values of all APP nodes, (iv) an estimate of the current proximity to the goal state 436, and (v) a separate estimate of proximity to the goal, using a current estimated future reward value (i.e., the maximum value of all outputs) that may be computed by the DQL planner 440.

The current world state item vector 446 may include all input values of the current world state 445, synthetic and primitive, wherein synthetic input values are machine learned and primitive input values are input (e.g., image data received from a camera, etc.) to the learning system. The activation value for an APP node may be a scalar value dynamically computed by the system, such as described by Drescher with regard to a schema. The activation value for each APP node may be the current desirability of activating the APP node based on the current world state 445 (i.e., a given world state).

The estimate of the current proximity to the goal state 436 may be in terms of distance to traverse from a starting state (not shown) when the action-controller 432 was activated in the knowledge graph 222 to the goal-state 436 in the knowledge graph, normalized to a value between 0.0 and 1.0. According to an example embodiment, 0.0 indicates that the learning system is in the starting state when the action-controller 432 was activated, and 1.0 indicates that the goal-state 436 has been reached.

According to an example embodiment, the objective function (i.e., training reward) for the auxiliary neural network 444 may be computed after the last chosen APP node completes, and may be computed as a combination of: an observed change in proximity to the goal state 436, as measured by the distance in the knowledge graph 222; and an estimate of change in proximity to the goal state 436, as measured by the Deep-Q network. This may be computed by taking the difference between the Deep-Q network's predicted future reward prior to activating the APP node and the actual (maximum) expected future reward value after the APP node's action was taken.

In the APN architecture 400 of FIG. 4A, the action-controller 432 combines graph-based planning and deep-Q learning by employing the graph-based planner 438 and DQL planner 440 which, referring back to FIG. 2A, allows each APP node of the plurality of APP nodes 220 to attain its specified goal, providing polynomially faster and more competent refinement of goal-driven skills than either approach used separately.

According to an example embodiment, the action-controller 432 may include another neural network (not shown) that may be referred to interchangeably herein as a composite action cost estimator. The composite action cost estimator may be a deep learning neural network that is configured to learn to estimate a cost of an action in terms of time taken, energy expended, and good or bad side-effects, given a particular context state vector.

The composite action cost estimator may be a neural network that can be trained to estimate the cost of activating an APP node, that is, a cost for performing that APP node's action when its context is satisfied. This neural network looks at the entire world state vector, that is, the current world state item vector 446, including synthetic item states. According to an example embodiment, the composite action cost estimator may be the same neural network disclosed above that predicts success or failure of APP node activation. For example, a first output of the neural network may output probability of success and a second output node of the neural network may return the expected cost of taking the action rather than its probability of success.

For example, if an APP node S has a composite action A, whose goal is to move a hand (not shown) to position 5.5 (not shown) on a grid (not show), the cost would be higher if there is an obstacle in the way, as the hand would have to move around the obstacle to avoid it, or pick up the obstacle and move it out of the way. It would also be more expensive to complete this action, the further away the hand was from the goal when starting.

While the graph-based planner may be able to calculate this cost by exploring the APP node graph, that is, the knowledge graph, it might be less expensive, computationally, to consult the composite action cost estimator (also referred to interchangeably herein as a cost-estimator neural network). This would also work in the case where the APP node network, that is, the knowledge graph, did not yet have a powerful enough representation or enough knowledge to understand why the action sometimes costs a lot more than other times, in terms of time, energy and other metrics of cost. The system can learn through experience what the cost of taking an action will be, given an initial world state vector, by empirically recording the actual cost each time the action completes successfully, and training the neural network with this value.

As such, in the APN architecture 400, there are at least three possible uses of neural networks to assist the action-controller 432. A first use may be referred to as an "adjunct applicability predictor for schema context" or "adjunct applicability predictor for APP node context." In addition to an APP node's context items list, which may be generated by marginal attribution, adjunct applicability predictor for APP node context neural network assist is a neural network which is trained on the entire extended context vector, which predicts success or failure via an output node. As such, the action-controller 432 may determine when an APP node is applicable, even if a principal cause has not been determined via the regular marginal attribution mechanism. As such, planners can use this APP node in a plan, even if they can't chain backward from it.

A second neural network assist is a composite action cost estimator disclosed above. The composite action cost estimator is a second neural network that can trained to estimate the cost of activating an APP node that has a composite action. Such a neural network may be the same neural network as the one above, with a second output node that returns cost rather than probability of success.

A third neural network assist may be referred to as a DQL-Planner for action controller in which the action controller 432 trains the neural network Deep Q learner, that is, the DQL planner 440, as it runs, and can turn over control to the DQL planner 440 if the graph-based planner 438 is not making progress or has no path to the goal at all from an applicable APP node.

The APN architecture 400 enables the digital computational learning system 202 of FIG. 2A to solve a central problem in unsupervised reinforcement learning, namely, "who is giving the reward for what?" As each APP node is created, it is created with respect to a novel cause-effect result the digital computational learning system 202 has observed or discovered how to reproduce. As each APP node is created, with respect to each novel cause-effect result the digital computational learning system 202 has observed or discovered how to reproduce, the training reward is defined as successfully executing a successful plan to obtain the predicted result 228. An example embodiment that is based on such an APN architecture 400 adds common sense reasoning capability over present AI approaches, such as the Neural Net, Bayesian, and rules based methods of the chart 500 of FIG. 5.

FIG. 5 is a comparison chart 500 that compares existing AI approaches to an example embodiment of a learning agent disclosed herein. As disclosed in the comparison chart 500, the example embodiment, namely the APN-based approach 502, provides more features of the features 501 relative to the existing AI approaches, namely, a neural networks 503 approach, Bayesian 505 approach, or rules-based 507 AI approach. Useful features of the learning agent's resilient and responsive intelligence include: efficient, learning based on few examples, common sense reasoning, embodied NLU, explainability, etc. The APN-based approach may be employed by a learning agent, such as the learning agent 102 that is learning the assistive home 100 of FIG. 1A, disclosed above. The assistive home 100 may be virtual environment, an example embodiment may learn the virtual environment, such as disclosed below with regard to FIG. 6A.

Figure 6A:
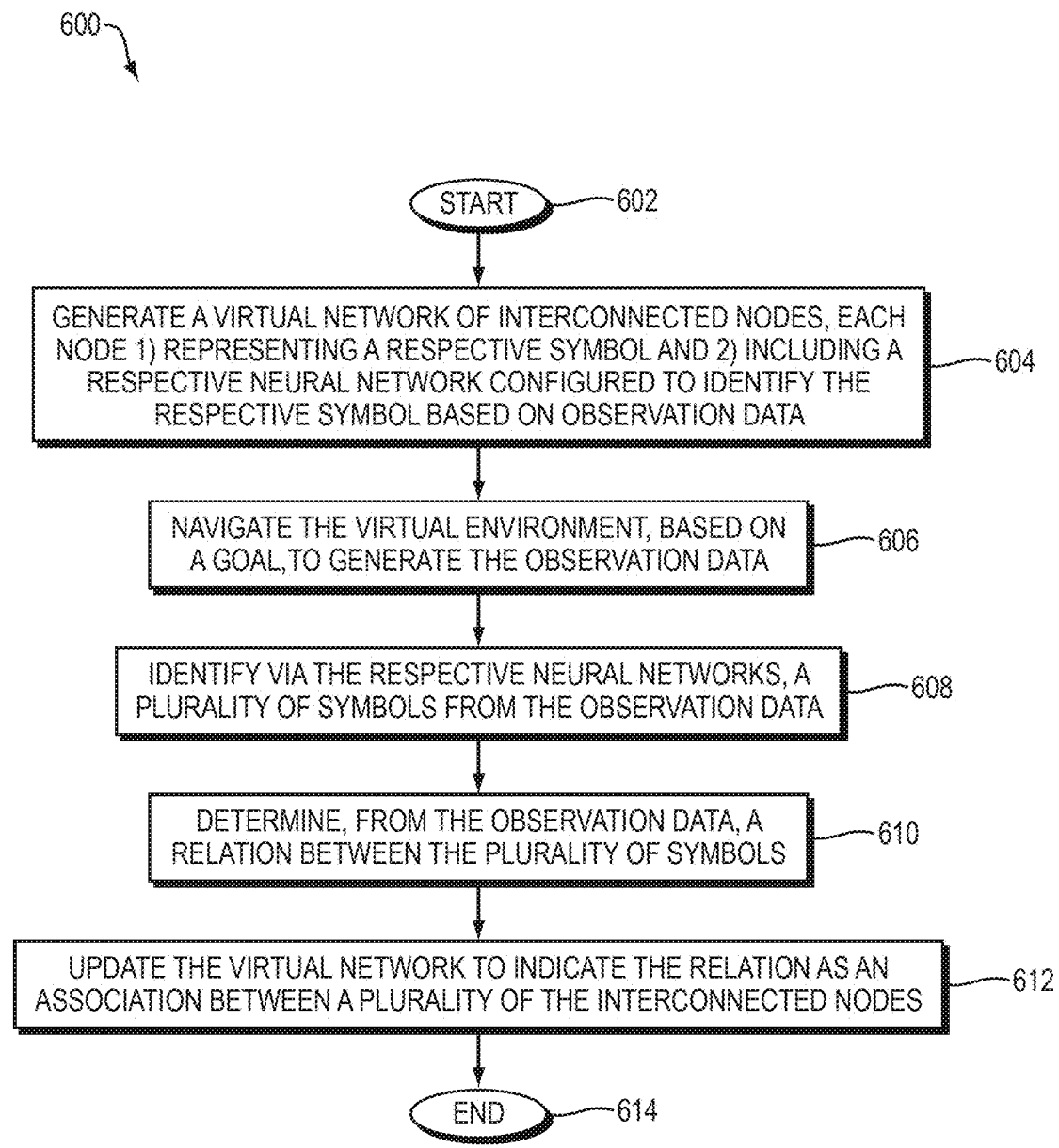
FIG. 6A is a flow diagram of an example embodiment of a computer-implemented method of learning a virtual environment.

FIG. 6A is a flow diagram 600 of an example embodiment of a computer-implemented method of learning a virtual environment. The method begins (602) and generates a virtual network of interconnected nodes, each node 1) representing a respective symbol and 2) including a respective neural network configured to identify the respective symbol based on observation data (604). The method navigates the virtual environment, based on a goal, to generate the observation data (606). The method identifies, via the respective neural networks, a plurality of symbols from the observation data (608). The method determines, from the observation data, a relation between the plurality of symbols (610). The method updates the virtual network to indicate the relation as an association between a plurality of the interconnected nodes (612) and the method thereafter ends (614) in the example embodiment.

According to an example embodiment, the relation indicates a property that is common to each of the plurality of interconnected nodes.

According to an example embodiment, the method may modify navigation through the environment based on a feedback signal, the feedback signal indicating whether the navigation is progressing towards the goal. The goal may indicate a change to be made to an element of the virtual environment. The method may identify a symbol corresponding to the element and determine a location of the element in the virtual environment based on at least one association between the symbol and other symbols as indicated by the virtual network of interconnected nodes. The method of the flow diagram 600 of FIG. 6A may further navigate the virtual environment to locate the element, modify the element in accordance with the goal, and update the symbol based on the modification to the element. According to an example embodiment, the computer-implemented method of FIG. 6A may be employed together with a language Concept Discrimination System (CDS), such as the language CDS 788 in the NLU architecture 700 of FIGS. 7A and 7B, disclosed further below.

Figure 6B:
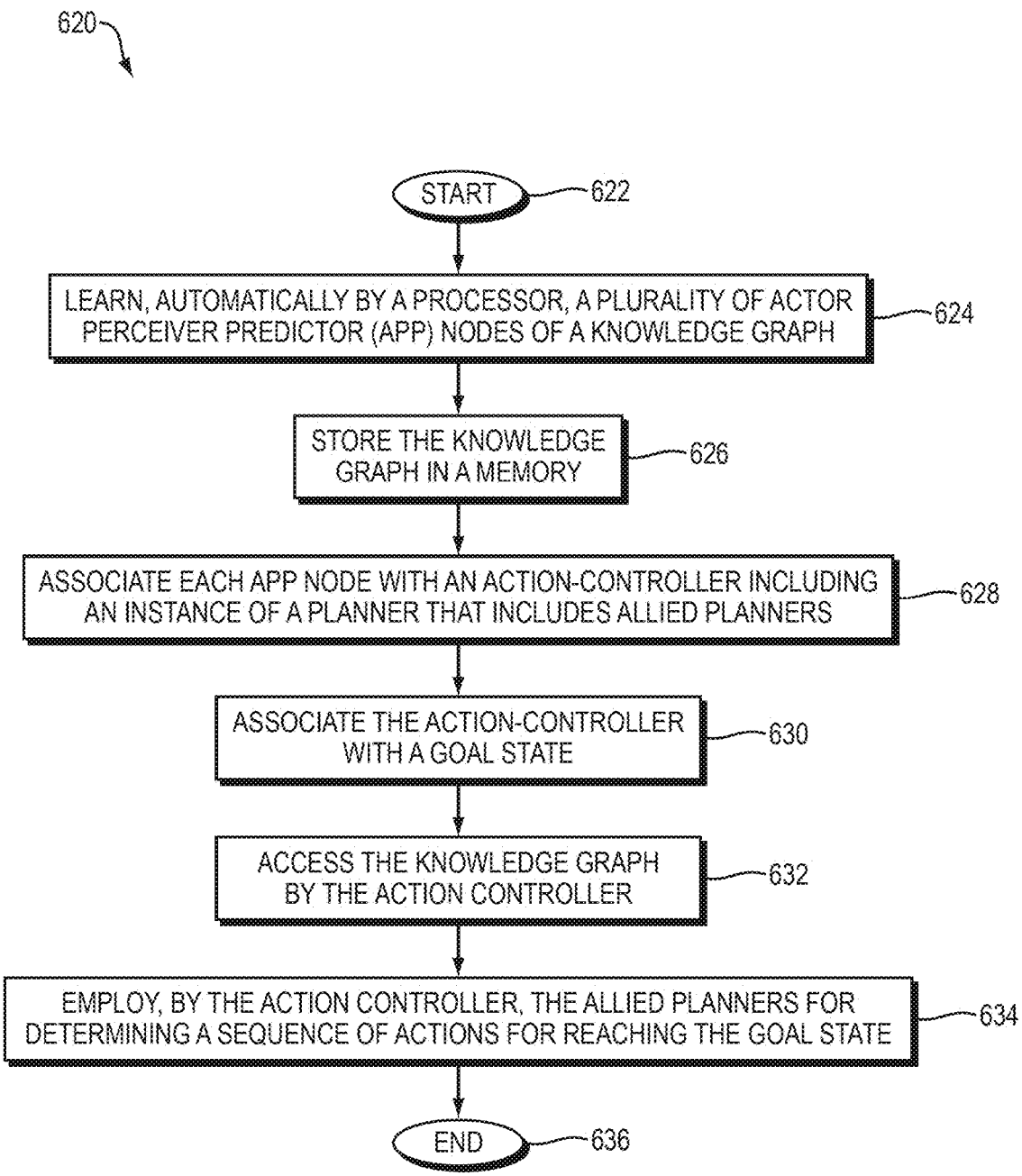
FIG. 6B is a flow diagram of an example embodiment of a computer-implemented method for planning actions to accomplish tasks.

FIG. 6B is a flow diagram 620 of an example embodiment of a computer-implemented method for planning actions to accomplish tasks. The computer-implemented method begins (622) and learns (624), automatically by a processor, a plurality of actor perceiver predictor (APP) nodes of a knowledge graph, each APP node of the plurality of APP nodes associated with a context, action, and result, the result expected to be achieved in response to the action being taken as a function of the context having been satisfied. The computer-implemented method stores (626) the knowledge graph in a memory. The computer-implemented method associates (628) each APP node with an action-controller including an instance of a planner that includes allied planners. The computer-implemented method associates (630) the action-controller with a goal state. The computer-implemented method accesses (632) the knowledge graph by the action controller. The computer-implemented method employs (634), by the action controller, the allied planners for determining a sequence of actions for reaching the goal state, the determining including selecting and chaining, dynamically in the memory, at least a portion of APP nodes learned of the plurality of APP nodes learned, the sequence of actions including respective actions of the at least a portion of APP nodes learned, selected, and chained. The method thereafter ends (636) in the example embodiment.

The allied planners may include a graph-based planner and a deep Q-learning (DQL) planner and the computer-implemented method may further comprise providing, from the graph-based planner to the DQL planner, a partial reward for progressing toward the goal state, wherein the partial reward is a portion of a total reward for reaching the goal state. The DQL planner may be a DQL neural network. The instance of the planner may further include an auxiliary network. The computer-implemented method may further comprise employing, by the graph-based planner, a breadth-first search (BFS) method and deciding, by the auxiliary network, whether to trust the graph-based planner or the DQL planner. The computer-implemented method may further comprise including a neural network in the context. The sequence of actions determined may be a least-cost sequence of actions in order to most efficiently reach the goal state. The processor may be a plurality of processors and the memory may be a plurality of memories.

The computer-implemented method may further comprise, by the processor, organizing and indexing the plurality of APP nodes. The computer-implemented method may further comprise receiving, by the processor, sensory input via a communications interface and learning, automatically by the processor, at least one APP node of the plurality of APP nodes, based on the sensory input received. The sensory input may include natural language input.

The computer-implemented method may further comprise grounding the natural language input relative to at least one object in an environment. The environment may be a simulated or real-world environment.

The computer-implemented method may further comprise receiving natural language input via a communications interface. The natural language input may define a task and the goal state may represent completion of a sub-task for accomplishing the task.

The computer-implemented method may further comprise producing, by the processor, an explanation for why the sequence of actions was determined. The producing may include converting information stored in the memory to natural language.

The computer-implemented method may further comprise receiving a query via the communications interface and communicating the explanation via the communications interface in response to the query received.

The computer-implemented method may further comprise associating each APP node, of the at least a portion of APP nodes learned, selected, and chained, that precedes a next APP node in a chain of APP nodes, with a corresponding respective result that satisfies a respective context of the next APP in the chain.

Figure 6C:
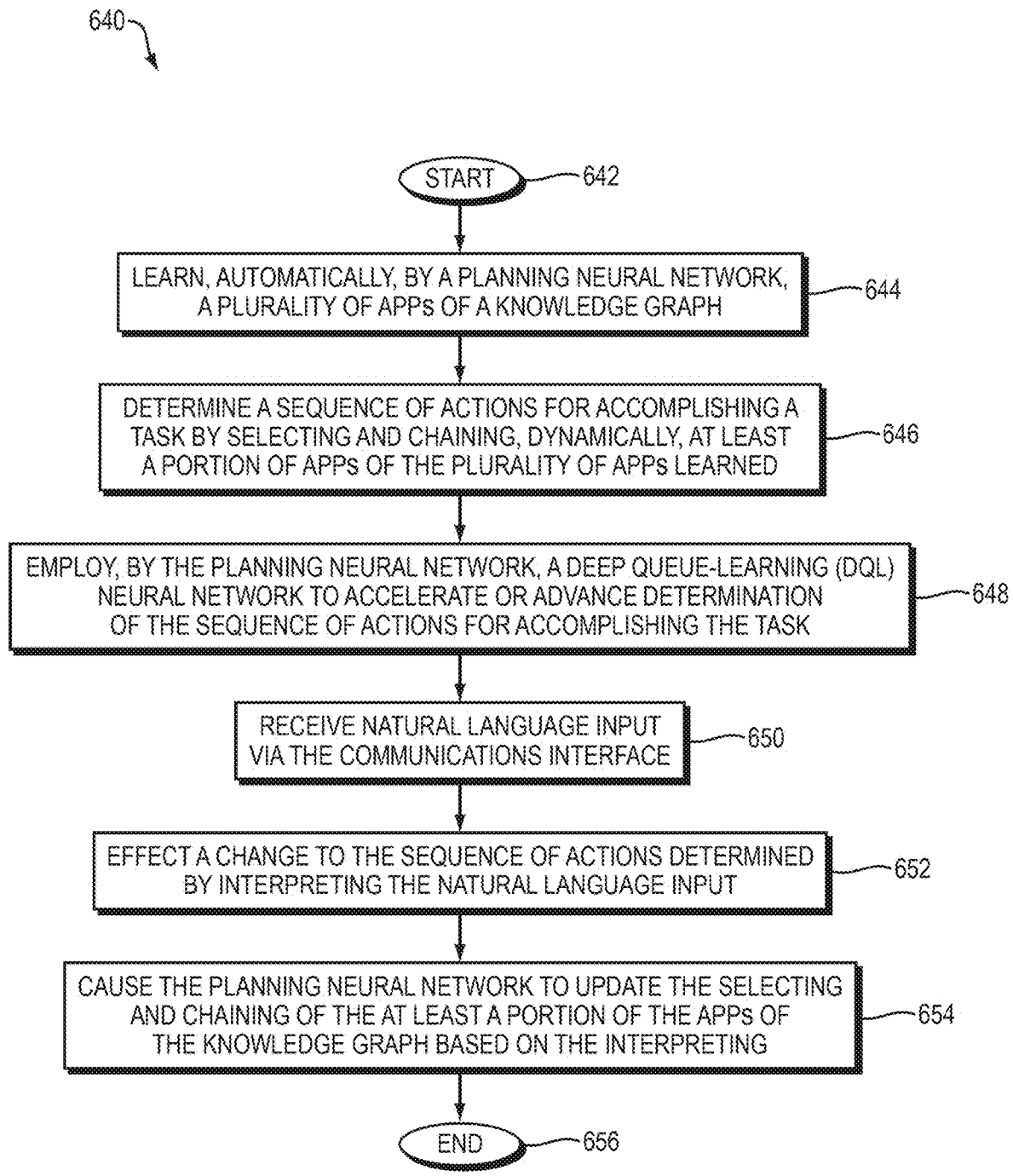
FIG. 6C is a flow diagram of another example embodiment of a computer-implemented method for planning actions to accomplish tasks.

FIG. 6C is a flow diagram (640) of another example embodiment of a computer-implemented method for planning actions to accomplish tasks. The computer-implemented method begins (642) and learns (644), automatically, by a planning neural network, a plurality of APPs of a knowledge graph. The computer-implemented method determines (646) a sequence of actions for accomplishing a task by selecting and chaining, dynamically, at least a portion of APPs of the plurality of APPs learned. The computer-implemented method employs (648), by the planning neural network, a deep queue-learning (DQL) neural network to accelerate or advance determination of the sequence of actions for accomplishing the task. The computer-implemented method receives (650) natural language input via the communications interface and effects (652) a change to the sequence of actions determined by interpreting the natural language input. The computer-implemented method causes (654) the planning neural network to update the selecting and chaining of the at least a portion of APPs of the knowledge graph based on the interpreting. The computer-implemented method thereafter ends (656) in the example embodiment.

The computer-implemented method may further comprise providing, by the planning neural network, at least one partial reward to the DQL neural network. The task may include at least one subtask and the at least one partial reward may represent completion of the at least one subtask. The completion of the at least one subtask may be based on successful execution of at least one action of the sequence of actions determined.

The computer-implemented method may further comprise suggesting, by the DQL neural network, actions to accelerate or advance the planning neural network's determination of the sequence of actions for accomplishing the task. The computer-implemented method may further comprise filtering, by the graph-based planner, based on a knowledge database of successful actions, a set of possible actions available to the DQL neural network to train on.

Figure 6D:
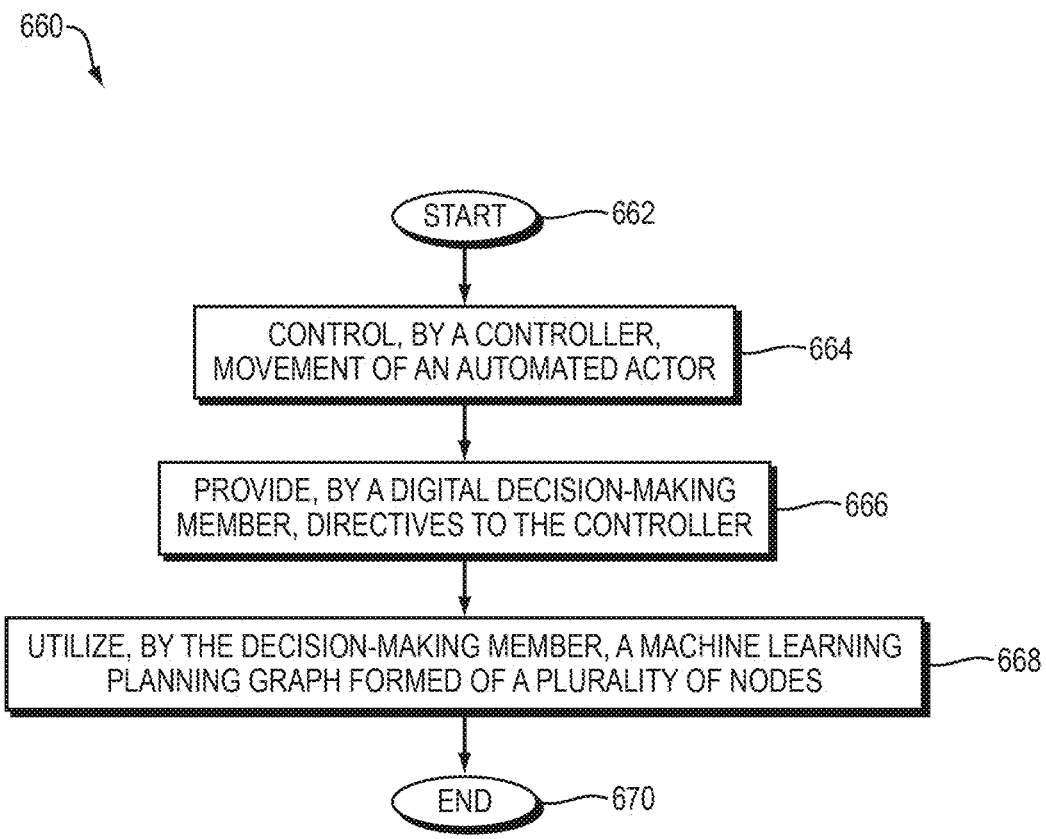
FIG. 6D is a flow diagram of an example embodiment of a computer-implemented method.

FIG. 6D is a flow diagram 660 of an example embodiment of a computer-implemented method. The computer-implemented method begins (662) and controls (664), by a controller, movement of an automated actor. The computer-implemented method provides (666), by a digital decision-making member, directives to the controller. The computer-implemented method utilizes (668), by the decision-making member, a machine learning planning graph formed of a plurality of nodes. Different sequences of two or more of the nodes in the graph produce different directives. Each node has a tuple representing a context, an action, and corresponding result. Different nodes have different tuples. The computer-implemented method thereafter ends (670) in the example embodiment.

The automated actor is one of a robot in a real-world environment, and an agent in a virtual environment. The computer-implemented method may further comprise employing, by each node, a neural network. Such a neural network may be (1) a multi-layer neural network configured for Deep Q Learning, (2) a neural network used to predict when the context is satisfied, or a combination of (1) and (2).

Figure 7A:
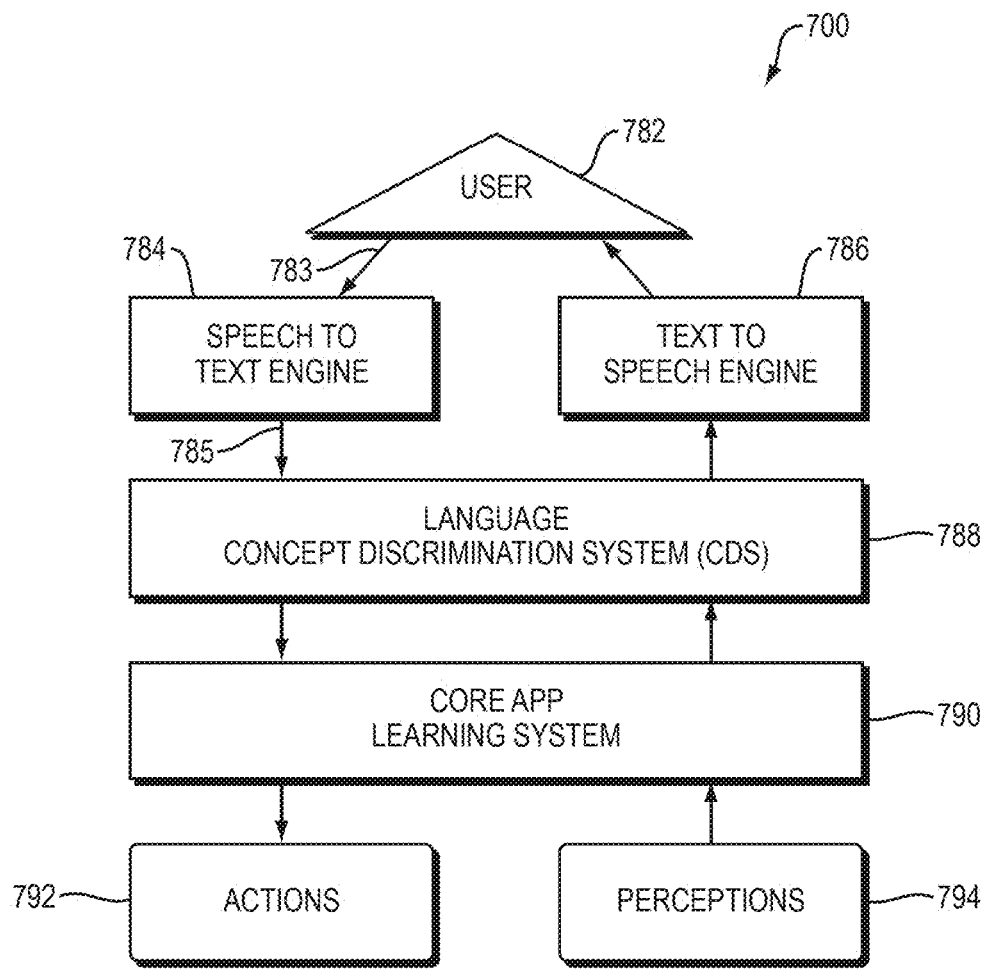
FIGS. 7A and 7B are block diagrams of an example embodiment of a natural language understanding (NLU) architecture.
Figure 7B:
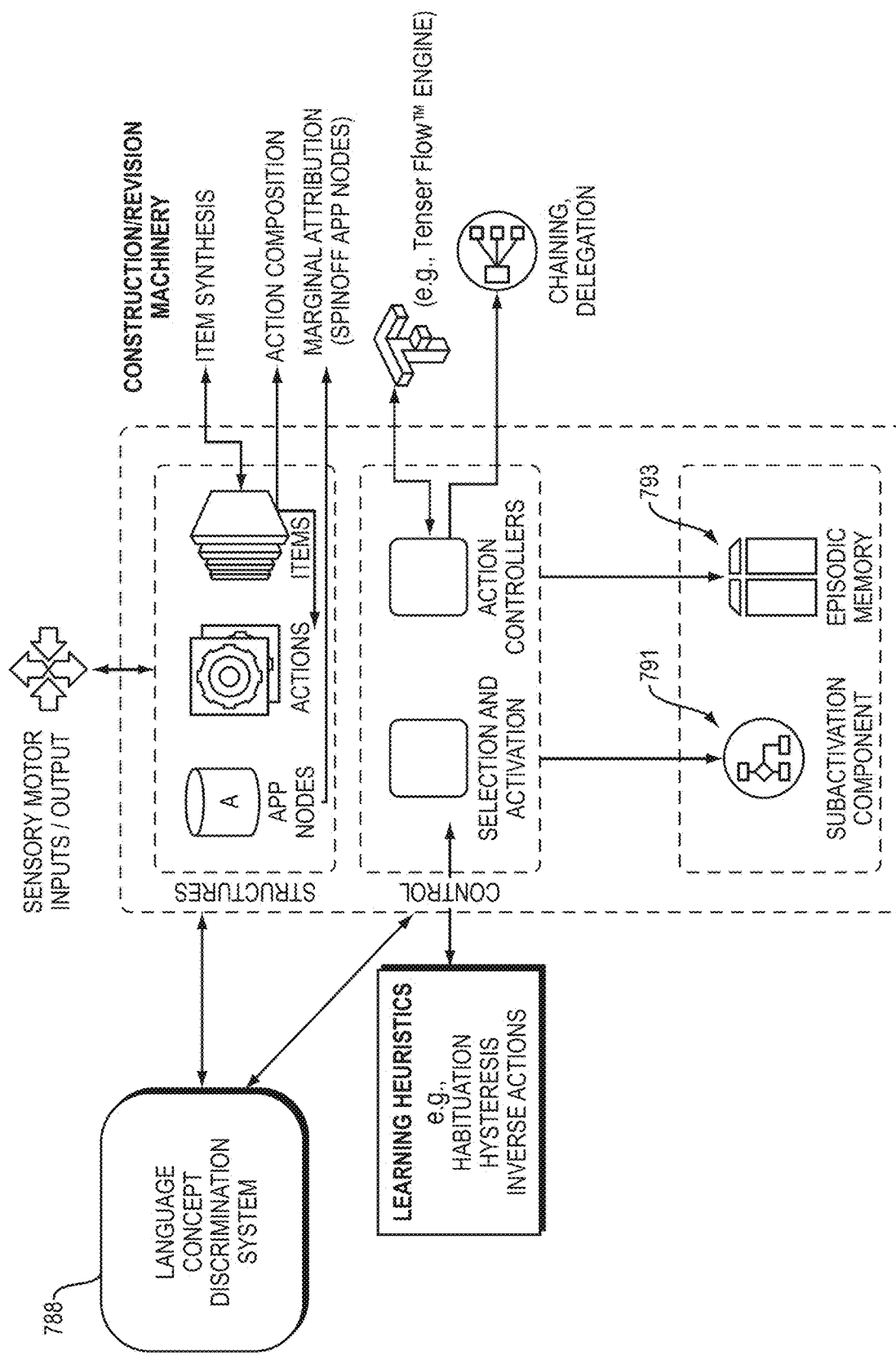

FIGS. 7A and 7B are block diagrams of an example embodiment of an NLU architecture 700. In the NLU architecture 700, a language CDS 788 takes input from a speech-to-text engine 784. The language CDS 788 learns the semantics of words used by a user 782 by discriminating the words based on the state of the core APP learning system 790, that is, the agent. The state of the core APP learning system 790 contains the information needed to answer key questions, such as: What is the agent doing? Why is the agent doing that? The language CDS 788 detects the reason for the user 782 communicating with the agent. For example, to issue requests for action or self-explanation, or offering suggestions or criticism of the agent's actions 792 or perceptions 794.

The CDS 788 includes a language module (not shown) that learns to associate incoming tokens, such as words received from the speech-to text engine 784, with activation levels of APP nodes or schemas and state items, such as primitive or synthetic state items disclosed above, of the core APP learning system 790, not just immediate sensory state. The core APP learning system 790 may be the digital computational learning system 102 of FIG. 1A, computer apparatus of FIG. 3B, or another learning agent disclosed herein. A same word can map to many possible schemas, APP nodes, or items depending on context (activation levels of other schemas, APP nodes, and items). A schema, APP node, or item can map to many possible words, depending on context.

According to an example embodiment, the language CDS 788 learns to discriminate between concepts based on the schema-state or APP-state at the time of hearing concept-words (including state immediately before and after the concept-word is uttered). The CDS 788 may employ a learning method that enables the set of concept words to become dynamic, allowing new concepts to be introduced at any time, such as described in Baayen, R., et al., "Comprehension without segmentation: a proof of concept with naive discriminative learning," Language, Cognition and Neuroscience, (2015), 31(1), 106-128. The implementation may use a fully connected mesh (all schemas or APP nodes connected with links to all concepts with real-valued connection weights), and error-driven adjustments.

According to an example embodiment, the learning agent may be referred to as a first agent and a second agent (not shown) may referred to interchangeably herein as a "Teacher" or teaching agent. The teaching agent may have access to the learning agent's full sensory-motor input. The teaching agent may use a set of heuristics to craft utterances that are sent to the language CDS 788 at every training step. These utterances may vary based on the state of the world, that is, an environment within which the learning agent is deployed, for example, "You are touching a pink ball", "You are moving forward", "You are blocked", or "You are in the top left part of the room." It should be understood that such utterances are not limited to the utterances disclosed herein.

The teaching agent, that is, the Teacher, enables the language CDS 788 to bootstrap the discrimination of concepts. Once the language CDS 788 has had significant exposure to the Teacher's input, the learning agent, that is, the core APP learning system 790, can operate without the teaching agent, or can begin to communicate with other agents, such as a human.

According to an example embodiment, the APP nodes, such as the APP nodes of FIG. 7B, compete for activation and can use cross suppression. An activation value factors in (positive or negative) value of results and may also factor in (positive or negative) side effects of an action plan. The leaning agent may employ top level "play" that is a combination of exploration and exploitation of existing APP nodes. Hysteresis and habituation, such as disclosed in FIG. 7B, may create focused attention to task. Such top level "play" allows the learning system to attend to higher priority events and then return to previous tasks. Top Level "play" allows the learning system to perform hierarchical planning. For example, subtasks can be attended to and then progress can be made toward the higher-level goal. According to an example embodiment, an inverse-action heuristic promotes 'fiddling' with things to learn possible new stateful behavior, thereby promoting discovery of object persistence.

According to an example embodiment, a learning system (learning agent) of the present disclosure, such as the digital computational learning system 102 of FIG. 2B for non-limiting example, may include a subactivation component and episodic memory. Such elements are disclosed below with regard to the core APP learning system 790 of FIG. 7A which may include the subactivation component 791 and episodic memory 793 of FIG. 7B as disclosed in further detail below.

Subactivation is a mechanism by which the learning system/agent can temporarily set item state values and schema activation values in order to "imagine" what might happen. This mechanism provides the learning system with the ability to explore alternative plans of action, with potentially many series of hypothetical steps, and use the schema network (e.g., APP network or knowledge graph), such as the knowledge graph 222 of FIG. 2A disclosed above, to predict what the outcome will be. This the allows the learning system to compare alternative plans of action in order to pick (e.g., choose, select) the most optimal one. Since schemas are designed to predict the results of actions with high reliability, the learning system can use them to simulate the new state of the world if an action were taken. Thus, subactivation provides a simulation capability where the learning system uses existing knowledge to reliably compute the next state of the learning system were an action to be taken, such as disclosed below with regard to FIG. 7C.

Figure 7C:
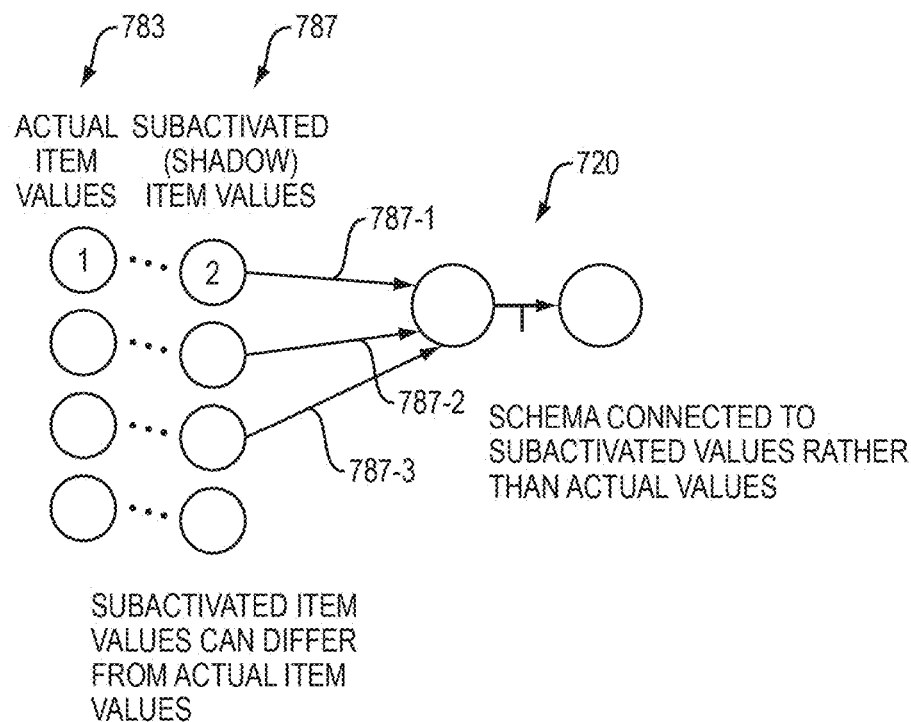
FIG. 7C is a block diagram of an example embodiment of a schema connected to subactivated values rather than actual values.

FIG. 7C is a block diagram of an example embodiment of a schema 720 connected to subactivated (shadow) item values, namely the first subactivated item value 787-1, second subactivated item value 787-2, and third subactivated item value 787-3 of the subactivated item values 787, rather than actual item values from of the actual item values 783. With reference to FIG. 7B and FIG. 7C, the subactivation mechanism (i.e., the subactivation component 791) also permits new learning to take place without having to physically perform actions, because the quality of knowledge in the schema network (e.g., APP network or knowledge graph) is high enough to accurately predict outcomes of actions many steps into the future. Thus, "mental experiments" can be performed by the learning system to learn new schemas (e.g., new APP nodes).

For example, given a goal of packing a container with odd sized objects, the learning system could imagine the outcomes of many different sequences of placing them in different orders, simulating the outcome from prior knowledge of how objects stack upon one another in three dimensions. From these mental experiments the learning system might learn a new more general schema (e.g., APP node) which asserts that packing works best when choosing to place largest objects first, and then fit small ones around them.

Subactivation employs a "shadow" memory to hold the trial "imaginary states," such that the actual current states (such as the actual item values 783) of the world (environment) are not overwritten. This can be implemented in a variety of ways; the simplest way to implement this is to make an entire copy of the schema network (APP network) graph (knowledge graph) which can then be employed to run simulated experimental settings of state values and trial sequences of action. Such shadow networks (not shown) can be overwritten once they have been used, to reclaim memory.

It is useful to ensure that the subactivation (subactivated/shadow) values, such as the subactivated item values 787, do not get blindly written back to the "true world state" items (such as the actual item values 783), or else the learning system will confuse imaginary hypothetical states with the current actual world state. It is only some subset of final item states and schema activation and success values, or newly created schemas (APP nodes), that are of interest to preserve or examine when using subactivation, that is, when employing the subactivation component 791. According to an example embodiment, the learning system may employ episodic memory, such as the episodic memory 793 of FIG. 7C disclosed further with regard to FIG. 7D.

Figure 7D:
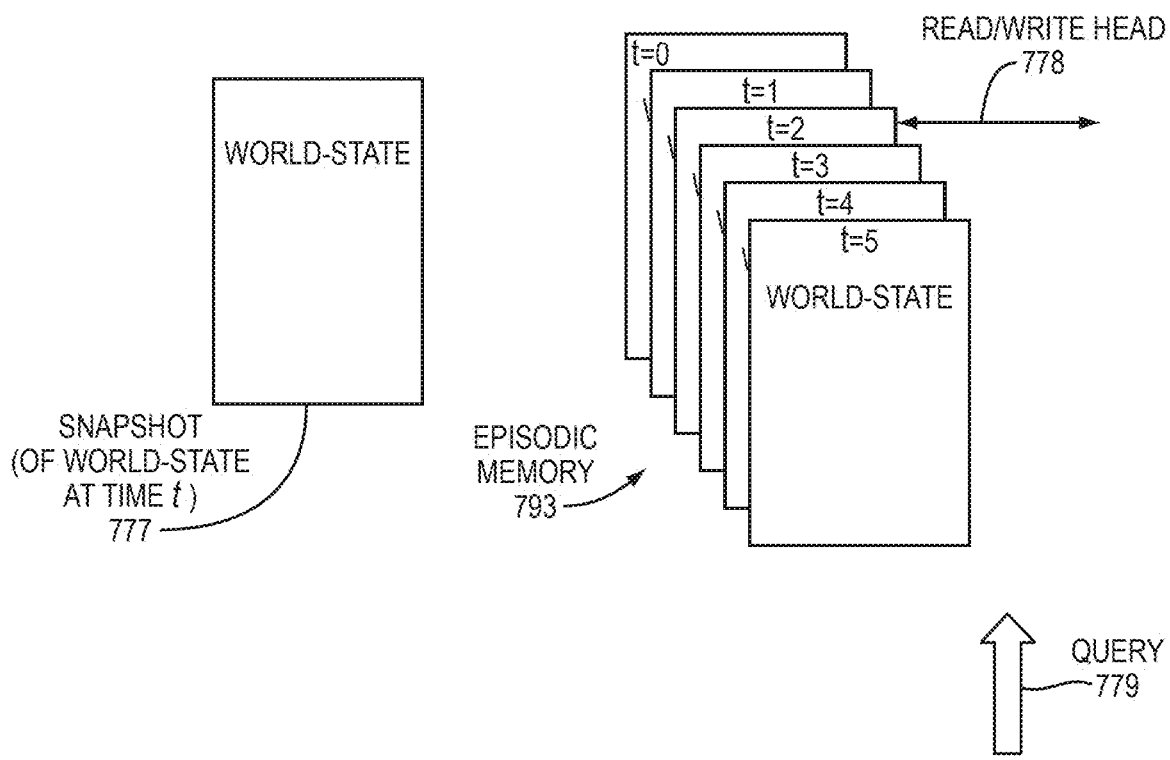
FIG. 7D is a block diagram of an example embodiment of an episodic memory.

FIG. 7D is a block diagram of an example embodiment of the episodic memory 793 of FIG. 7C. According to an example embodiment, the learning system may employ the episodic memory 793. Such memory is a time-series datastructure which contains snapshots of the entire or partial world (environment) state (item values and schema/APP activation values). For example, the episodic memory 793 may include the snapshot 777 which is a snapshot of the world-state at time t. For non-limiting example, the episodic memory 793 of FIG. 7D is shown as including a plurality of such snapshots (e.g., world state vectors) at times t=0 . . . t=5. It should be understood that the episodic memory 793 is not limited to including snapshots at times t=0 . . . t=5. Such memory, that is, the episodic memory 793 can be likened to a tape recorder, where the world state can be played in chronological order, in order to scan for sequences of states which occurred in the past. The episodic memory 793 may be indexable by time or by associative lookup using partial vector state matching. This functionality is similar to the differentiable neural computer (DNC) model proposed by Google Deep Mind. However, the use of it to store and retrieve input data for a schema (APP node) mechanism is novel.

There can be multiple "read heads" and "write heads," such as the read/write head 778 operating on the episodic memory 793, such that several different indexes into the episodic memory 793 can be operating at the same time, much like a modern key-value database storage system. The schema mechanism (APP node) can query 779 the episodic memory 793 by passing a time index, or by passing a state vector. Responsive to the query 779 (e.g., input key representing a partial world state vector), the episodic memory 793 may output the read/write head 778 that may be, for non-limiting example, a pointer to a time index of a best matching world state vector stored in the episodic memory 793.

The episodic memory 793 does not require that the state vector (e.g., snapshots at t=0 etc.) match the query 779 exactly and, according to an example embodiment, may be configured to perform a "closest match" using, for non-limiting example, a dot product or other distance metric between the supplied query (key) 779 and the state vectors (world states) in the episodic memory 779. For example, the query 779 may represent something (e.g., natural language input) which corresponds roughly to "green car moving fast on Main street," for non-limiting example, that may be encoded by the learning system using existing synthetic items and schemas (APP nodes) which roughly correspond to those concepts. The episodic memory 793 may, automatically (responsive to same (the query 779), return a list (not shown) of best matches for that partial world state vector (the query 779), so that the schema mechanism (APP network, knowledge graph) could "remember" the complete world states that were in effect when those events happened. Thus, the learning system could then check if, say, a person wearing a black hat were also on Main street at the same time. The episodic memory 793 is optional and need not be employed, such as disclosed below with regard to FIG. 7E.

Figure 7E:
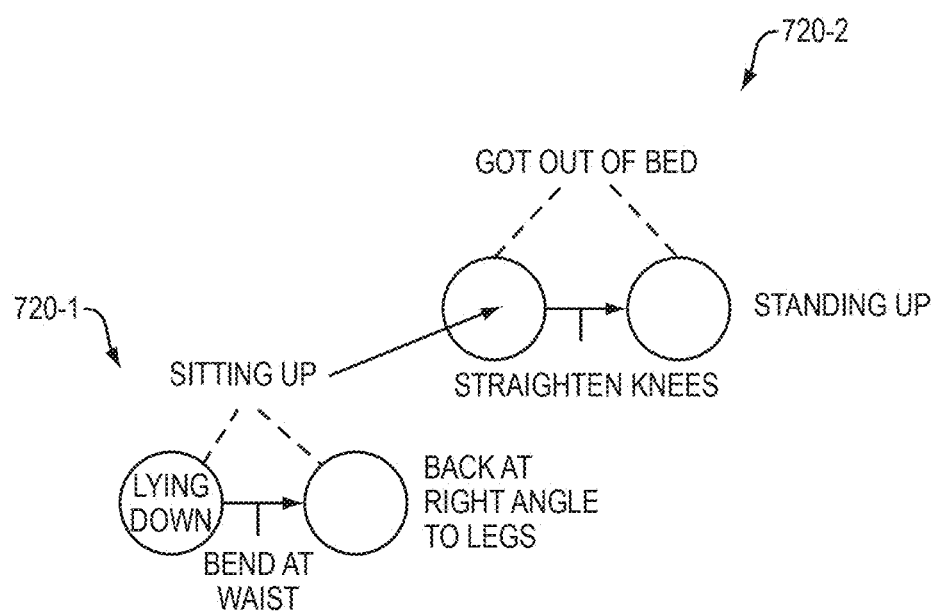
FIG. 7E is a block diagram of an example embodiment of a chain of schemas.

FIG. 7E is a block diagram of an example embodiment of a chain of schemas (APP nodes) including a first APP node 720-1 and a second APP node 720-2. In the example embodiment, the first APP node 720-1 and second APP node 720-2 form a schema sequence for "getting out of bed," with two chained schemas (APP nodes) for non-limiting example. This kind of "prefix chain" learning and recognition can be implemented using just the synthetic item machinery and implicit activation machinery disclosed above. In the example embodiment of FIG. 7E, episodic memory is not employed, this just uses chains of schemas, and synthetic state items, which enforce an ordering due to the context->result dependency chains.

According to another example embodiment, a computer vision learning system may be configured to perform complex interpretation tasks on image and video data, such as disclosed below with regard to FIG. 8.

Figure 8:
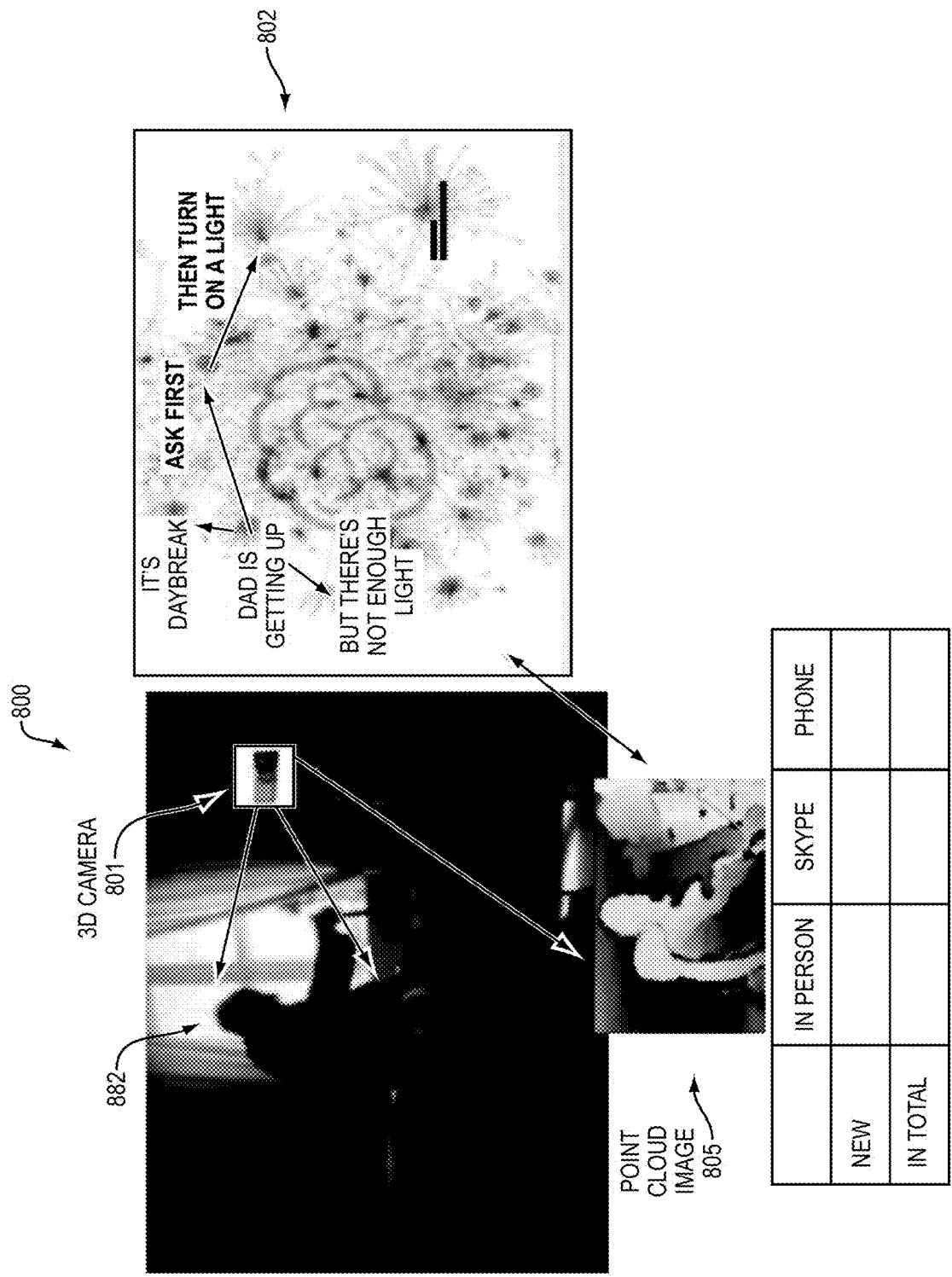
FIG. 8 is a block diagram of an example embodiment of a computer vision learning system.

FIG. 8 is a block diagram of an example embodiment of a computer vision learning system operating in an environment 800. In the example embodiment, the computer vision learning system is a three-dimensional (3D) camera 801. It should be understood, however, that example embodiments of a computer vision learning system disclosed herein are not limited to a 3D camera. According to an example embodiment, the 3D camera 801 includes a hybrid symbolic neural network engine 802 that integrates sensing with planning and actions through autonomous knowledge net construction. sensors in machine vision fall into one of two categories: Charge-Coupled Device (CCD) and Complementary Metal oxide Semiconductor (CMOS) imagers.

In the example embodiment, the hybrid symbolic neural network engine 802 is coupled to a lighting control (not shown) that controls lighting of the environment 800. The hybrid symbolic neural network engine 802 is an artificial intelligence that is able to make enough sense of a point cloud image 805 captured by the 3D camera 800 to plan and take action. For example, the hybrid symbolic neural network engine 802 may extract meaning from the point cloud image 805, such as, "It's daybreak," a user 882, for example, "Dad," is "getting up," "but there's not enough light," and as such, make a plan, such as "asking" whether to "turn on a light?," and based on the response from the user, the hybrid symbolic neural network engine 802 may take action, such as turning on or adjusting a light in the environment 800 via the lighting control. As, such, an example embodiment of a computer vision learning system extracts meaning from images, such as the images of FIG. 9A, disclosed below.

Figure 9A:
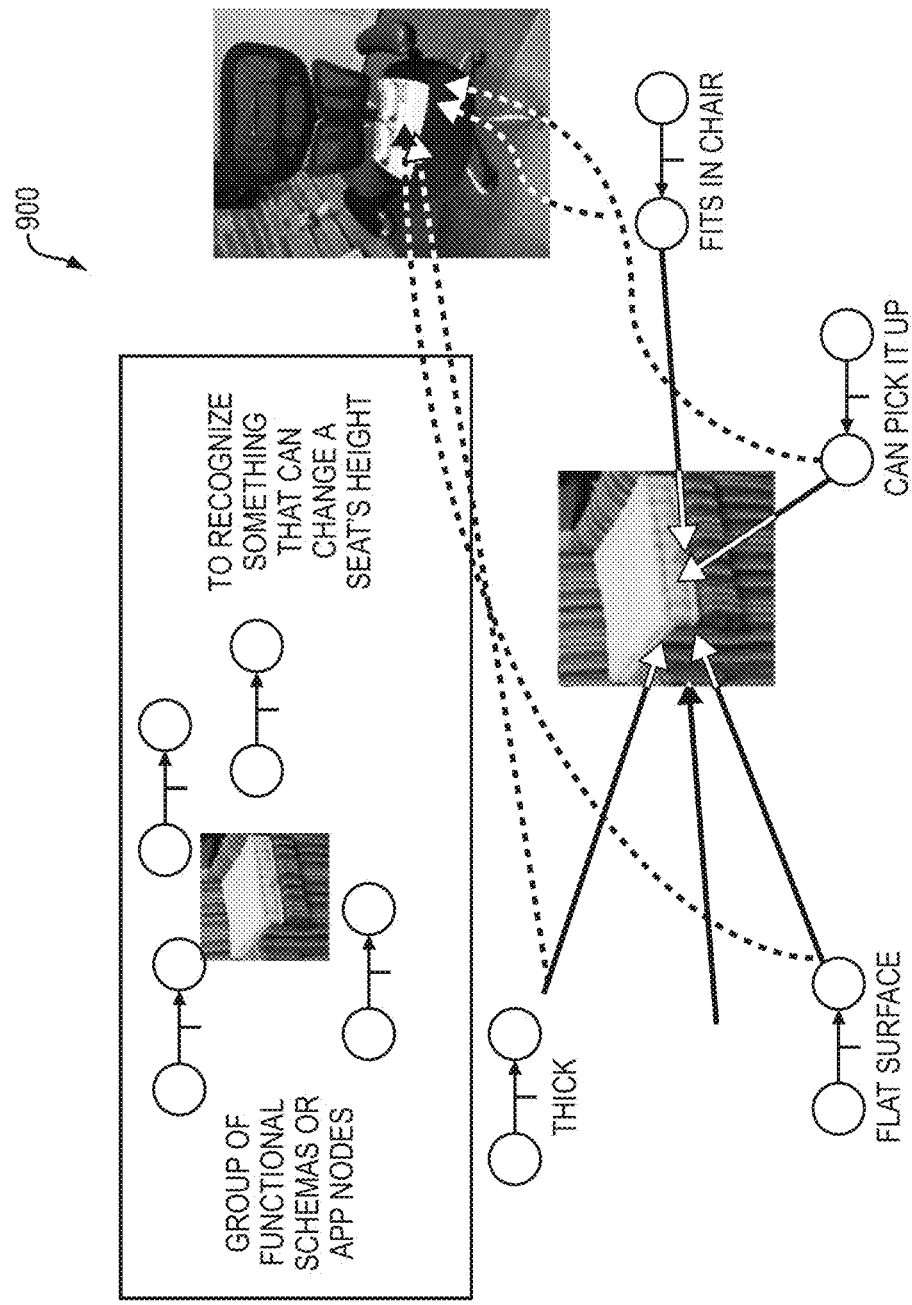
FIG. 9A is collection of images from which an example embodiment of a computer vision learning system may extract meaning.

FIG. 9A is collection 900 of images from which an example embodiment of a computer vision learning system, such as the digital computational learning system 102 of FIG. 2A that may be coupled with a vision system (not shown), may extract meaning. According to an example embodiment of the computer vision learning system, also referred to interchangeably herein as an AI system, an object is recognized not just as group of pixels but also as satisfying a group of functional schemas or APP nodes. In the collection 900 of images of FIG. 9A, a phone book and pillow share the same function when the goal is to raise the height of the seat. The same set of schemas or APP nodes recognize that both the pillow and phone book can be used by the AI system to raise the height of a seat.

According to an example embodiment, a schema or APP node learning method is combined with a visual routine processing system to build and coordinate visual routines (e.g., methods) with directed attentional state to perform recognition and inference tasks using input from an image, sequence of images, continuous video stream, or sequence of video segments.

The example embodiment builds a "cause and effect" representation of scenes captured by a vision system and applies visual routines as the "action" to probe for geometric and topological relations in a scene, and their outputs as the "effect," which can uncover latent structure in the scene to answer questions about the scene which current systems cannot. An example embodiment uses the cause and effect representation to provide explainability of how its inferences were generated, including explanations in natural language.

According to an example embodiment, the learning system can operate in a supervised and/or self-supervised mode to learn which visual routines are selective for relations or structures of interest for a given task. The system can learn to associate other sensorimotor inputs from the environment with visual information, e.g., the learning system can be configured to interface with a robot hand-eye system (simulated or actual physical hardware) for training in a task domain and to perform tasks that require vision.

The system may operate in two modes, namely, a learning (training) mode and an inference mode. In the learning mode the system learns cause/effect of applying visual routines, that is, image processing software modules, and correlates the cause/effect learned with external actions and labels.

According to an example embodiment, the system uses and extends a library of visual routines. The learning system may include an attention control system which applies routines (methods) to salient areas. The learning system may be configured to notice patterns in output of routines and store such patterns noticed in APP nodes or schemas of a cause/effect graph.

In the inference mode, the system may use knowledge learned in the learning mode to answer questions, draw conclusions, and generate explanations of what is happening in a scene (relation of objects to one another, latent state). The attention control system may be configured to apply routines and expectations are found in a knowledge graph, such as any of the knowledge graphs disclosed above, and to compare same with results seen when applying them.

According to an example embodiment, visual routines may be employed to explain a learning system's reasoning, via natural language, such as "the ball was to the left of the chair, because when I was looking at the chair and looked left, I saw the ball."

According to an example embodiment, the inference and learning modes may be run concurrently.

An example embodiment may combine a schema learning engine, such as disclosed by Drescher, or an APP learning engine, such as disclosed above, with a visual routine library to create a system which can be trained to perform image-understanding tasks on still-image and video input, which other computer vision systems cannot be trained to do. The system learns to construct, select, and execute dynamically chosen sequences of visual routines from a library of such routines to accomplish a multitude of possible tasks.

The idea of visual routines was first introduced by Ullman, Shimon, "Visual Routines," Cognition 18:97-159 (1984) (hereinafter, "Ullman") to describe the perception of spatial relationships, such as the apparently effortless perceptual process of judging whether a point is inside a closed curve, such as the closed curves of FIG. 9B, disclosed below.

Figure 9B:
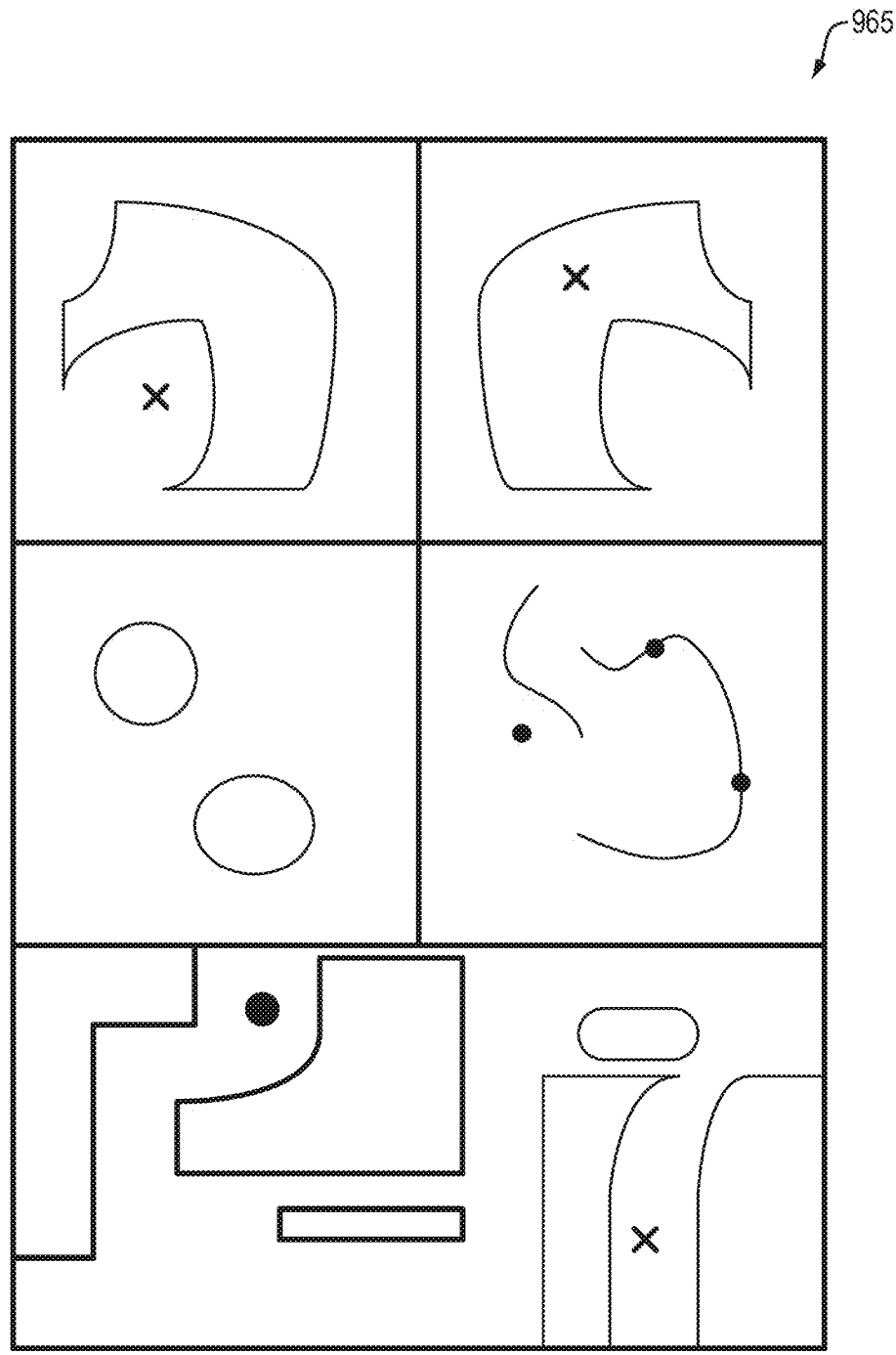
FIG. 9B is a block diagram of several prior art visual cognition tasks involving the analysis of shape properties.

FIG. 9B is a block diagram 950 of several prior art visual cognition tasks involving the analysis of shape properties, such as closed curves, and spatial relations. In FIG. 9B, (a) is an inside/outside relation: it is easy to determine whether the "X" lies inside or outside the closed figures. In (b) there are elongation judgements. In (c), the task is to determine whether two black dots lie on a common contour. In (d) the task is to determine whether the black disk can be moved to the location of the "X" without colliding with nearby shapes. A useful property of a visual routine is that it instantiates a procedure as opposed to requiring a specialized detector of some kind.

For example, with regard to the closed curves of FIG. 9B, seeing if two points are on the same contour can be done using a sequential composition of visual routines, such as leaving an attention marker on one dot, and tracing the contour until a different dot is found. While methods which use specific sequences of visual routines can be hand-crafted to solve particular visuospatial tasks, there has been little progress in building a system which can learn, automatically, which visual routines to apply for a new task, generate new visual routines, or which can learn to optimize the application of existing visual routine sequences.

Visuospatial tasks span a vast range of possible domains, from basic motor tasks like driving a robot hand to grasp to find and grasp an object, to abstract tasks, like finding whether one appointment occurs later than another in a calendar. According to an example embodiment, the system learns which visual routines to apply to an image to reveal latent structural information which is relevant to solving a given task. Properly selected visual routines can reveal object relations to one another to infer what events are happening in the scene, what underlying conditions may be causing events to happen, and the probability that particular events may happen in the future.

According to an example embodiment, the system includes a natural language interface. Through the use of the natural language interface, a trained system can answer multiple queries about a scene, and generate explanations, using natural language, of its chain of reasoning as to how it generated its answers.

Visual routines are image processing software modules which take as input i) image pixel data or processed image data from a prior processing phase and ii) a set of control input parameters, and perform a computation on the data input. The output of the visual routine can be a combination of image data and/or an output value vector of numeric or discrete values. Ullman described two classes of processing for visual routines, namely a base (primary) bottom-up spatially uniform (image parallel) set of computations, followed by the secondary extraction of abstract spatial information by visual routines. At the heart of the approach was a focus-of-attention mechanism which would identify and mark for later use salient locations in the image. These locations would serve the secondary routines as a local frame of reference from which the visual routines would then be initiated.

An example of a visual routine is a module which takes a binary image as input and returns an integer value of the count of the number of connected components found in the image. Such a routine might also return an image mask which labels the pixels in each connected component with a different color. An example of a sequence of visual routines is disclosed below with regarding to FIG. 9C.

Figure 9C:
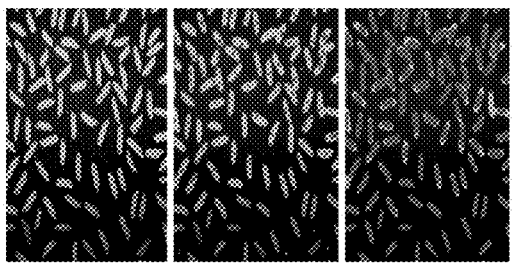
FIG. 9C is a prior art composed sequence of visual routines.
Figure 9C:
Figure 9C:
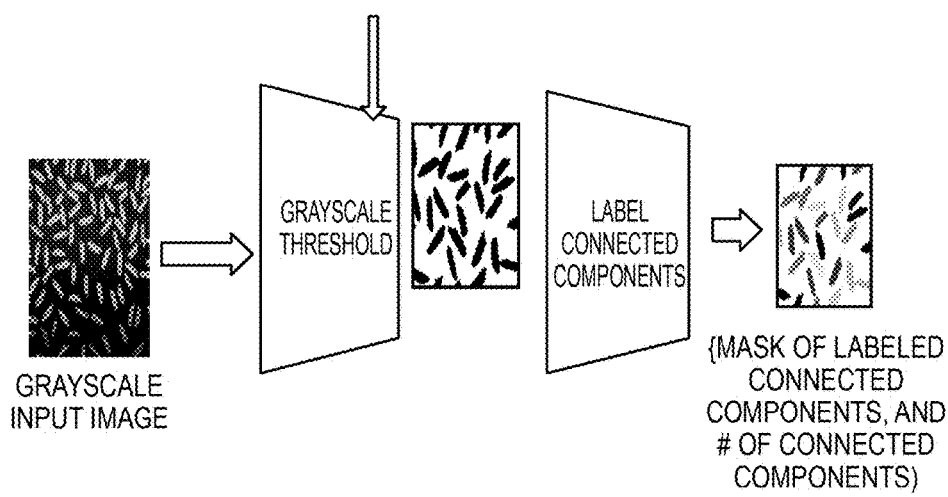

FIG. 9C is a prior art composed sequence of visual routines. The composed sequence of visual routines returns a count of the number of connected components in an image. The composed sequence concatenates two routines, namely a base image thresholding filter whose output is then fed into a secondary connected-component counting visual routine. The final output is not just another image but a discrete value encoding the number of connected components found.

According to an example embodiment, the system operates in two modes, training mode and inference mode. In the training mode, the system learns about how to solve a task or subtasks in a domain from sample training data, via a learning system which is trained by observing the results of application of different trial sequences of visual image processing routines. In the inference mode, the system is shown new input image data and asked to perform a specified task, using its prior training in that task domain.

Training can be done using both labeled and unlabeled data, using images and videos of scenes containing real objects as input, or using synthetic images produced by a simulation training environment. Training can proceed in a supervised manner (with externally labeled examples) or in an unsupervised manner (in which the system creates its own categories characterizing regularities in the data), or a combination of thereof.

The system learns to select which visual routines, such as the visual routines disclosed in Ullman or other visual routing, to use and in proper order, to reveal underlying structural relationships and properties of objects in the image which allow it to accomplish desired tasks. A learning system can be implemented using a schema mechanism, such as disclosed in Dresher, or using a learning system that employs a Deep Q learning network, such as disclosed above, to encode which visual routines to use in different contexts to correctly complete a task. A learning system can also be implemented using a Deep Q Learning neural network in combination with a schema mechanism.

According to an example embodiment, during the training process, the learning system catalogs regularities observed in the sensory input, actions taken, and the output values of activated visual routines. These regularities are stored by the learning system, as expectations of what should happen when the visual routine is activated in a given context. These expectations are encoded by the schema or APP system as schemas or APPs which form nodes in a graph.

The schemas or APP nodes form a vocabulary or scaffolding for higher-level cognition; in a schema or APP node mechanism higher level schemas or APP nodes can be built using composition of lower level schemas or APP nodes.

The following is an example of construction of a visual routine as disclosed by Rao, Satyajit, "Visual Routines and Attention," PhD thesis, MIT, Cambridge, MA (1998): "Suppose someone is trying to get a child to look at some object in the environment. In some situations, pointing at it works because the object is very salient to begin with, and the child's attention shifts from your hand (or gaze direction) to the object purely due to bottom-up biases (i.e., without using the direction of the hand as a cue). However, there will be other situations where the object is not very salient, and having learned the relation between hand orientation and object position from prior situations makes all the difference in being able to locate the object. In fact these are the situations where the pointing gesture really has function. Putting it another way, learning the correlation when the signal is "strong" helps you in situations when there is noise and the signal is weak, because now you have a model."

According to an example embodiment, the system can be trained on example data in a semi-passive mode where it is shown labeled image examples for a task, or in an active mode where it is fed data from a sensor system and allowed to initiate test actions in a task domain environment through a robotic or simulated motor system interface. In a simulator training environment, the system can be connected to a simulated motor system which allows it to initiate actions which affect the simulated objects in a scene, such as picking up a toy block and moving it. This helps the system learn to more quickly learn causal relations between actions performed on objects and the visual manifestations of the results of those actions on the image of the scene, such as salient motion flow of segments of the image. This, in turn, helps the system infer from an image what events may have happened or the probability that events will happen in the future.

Figure 9D:
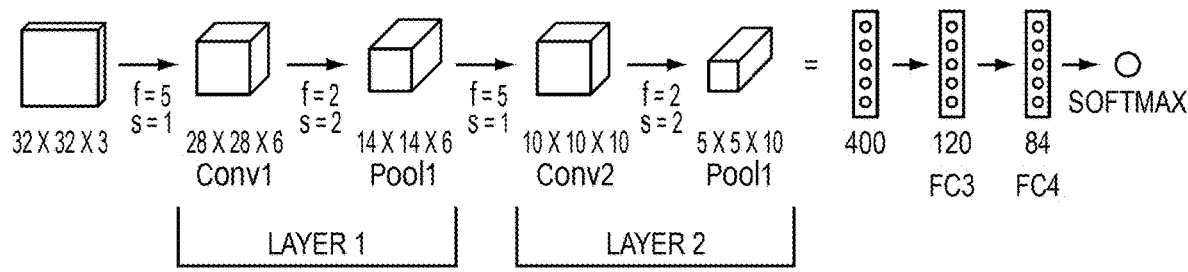
FIG. 9D is a prior art convolutional neural network image processing pipeline.

FIG. 9D is a prior art convolutional neural network image processing pipeline. In FIG. 9D, image data flows through a typical convolutional neural network architecture. The image processing pipeline includes a set of fixed processing layers through which image data is passed. Each layer performs a predefined computation on the input image data, some of which produce new transformed images, and a final set of output nodes generates the result value(s) for the function for which the system has been trained. The order in which the computations at each layer are performed is fixed, and only the node weights and other parameter values (such as convolutional layer kernel values) will vary from one learned model to another. While there has been success in many areas of pattern recognition tasks using neural networks, there are many other types of computer vision tasks for which convolutional neural networks cannot be trained effectively. Some examples of these kinds of difficult tasks are disclosed further below.

Figure 9E:
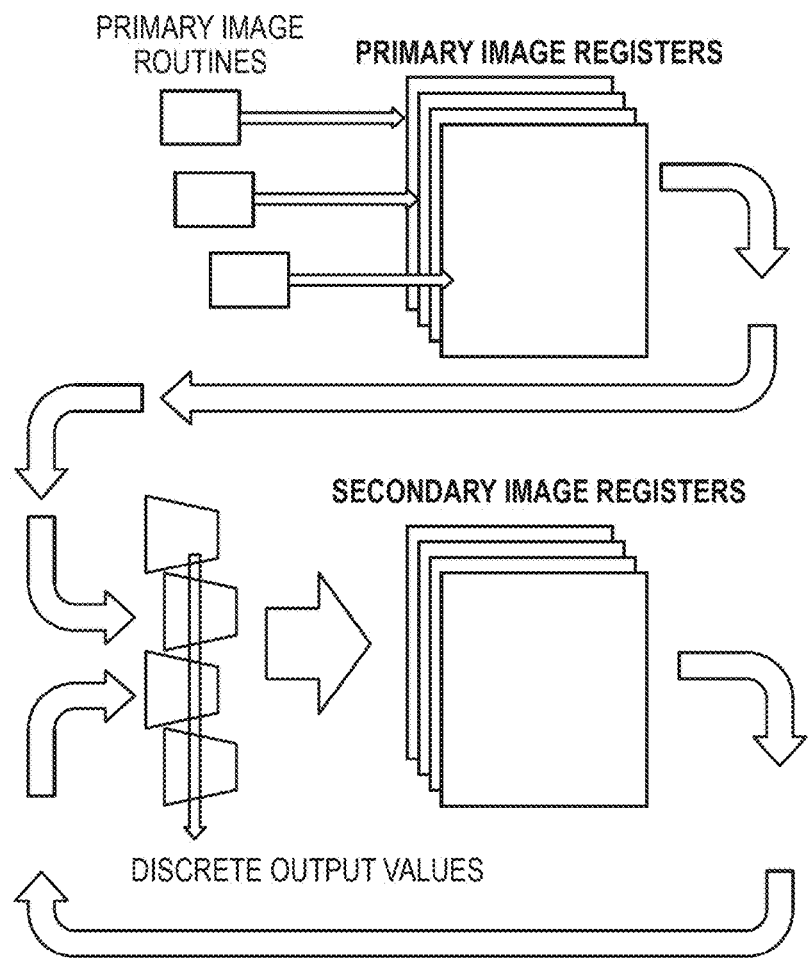
FIG. 9E is a block diagram of an example embodiment of data flow in an image-register architecture.

FIG. 9E is a block diagram of data flow in an image-register architecture. The architecture for image processing is centered around a set of image-registers which contain image data. These registers supply image data input to visual routines, and also serve to hold the output of those routines whose result is in the form of image data. Image registers are provided at several different image resolutions, and an image may be transformed from one resolution to another through downsampling, up-sampling, or more complex transform functions. A set of image registers, called primary image registers, are unconditionally updated in parallel from using a fixed set of image transform operations, the primary image routines. In the case of a real-time source of images, such as a video stream, the primary input registers are updated as fast as possible.

Each primary input register has a permanently associated image processing function associated with it, although some of the parameters may be varied under the learning system's control. Examples include a contour boundary detection routine, blob, detector, or a set of oriented edge detectors. In computer vision technology, blob detection methods are aimed at detecting regions in a digital image that differ in properties, such as brightness or color, compared to surrounding regions. Each primary input register is written to from an assigned primary image routine. Secondary image routines can receive input from any sets of registers (primary or secondary), and write results back to secondary registers. Secondary image routines have discrete output value vectors which are fed back to the learning system.

The secondary image registers are used to store output from optionally invoked routines, called secondary image routines, under the control of the learning and inference systems. The image register architecture allows visual routines to be dynamically chained to produce visual datapaths; the output of any visual routine can be read as input by any other routines. Sequences of image processing steps are composed this way into new composite routines.

Figure 9F:
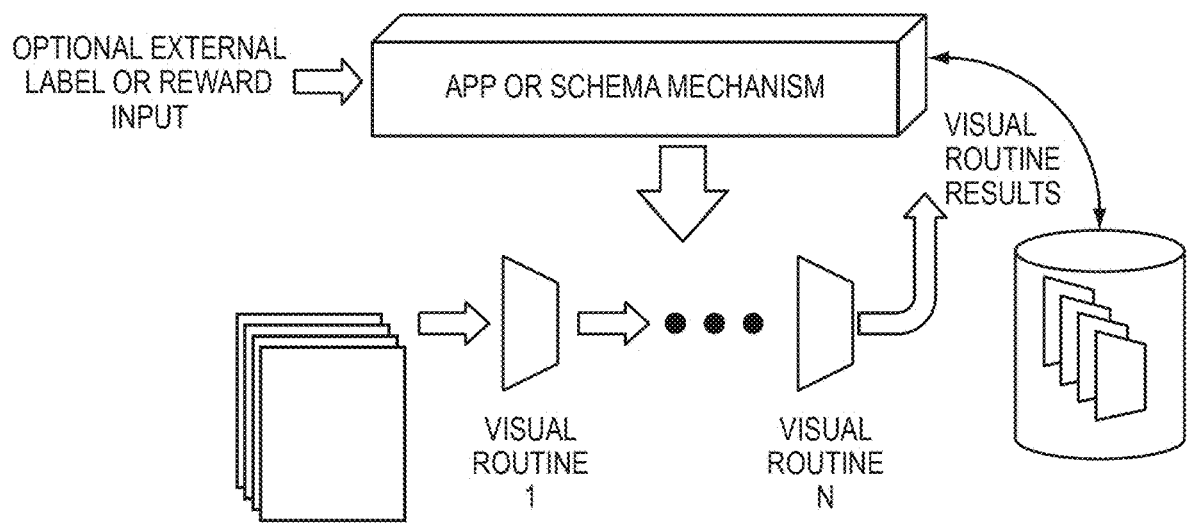
FIG. 9F is a block diagram of an example embodiment of a learning system configured to learn the result of executing visual routine sequences.

FIG. 9F is a block diagram of an example embodiment of a learning system configured to learn the result of executing visual routine sequences. In the example embodiment, the system is learning the effects of a chosen trial sequence of visual routines. The learning system selects and observes the output from visual routines. On a given time step, the learning system selects one or more visual routine sequences to run on the data stored in the image registers, along with any optional control parameters needed by the visual routines.

After each visual routine completes, the learning system looks for patterns in the routine's result values that correlate with activation of the visual routine. These regularities are stored in the learning system; in the case of a schema or APP node mechanism, a new schema or APP node is allocated which contains a reference to the visual routine action, and the results it produced. Further operation of the learning system learns under what preconditions the visual routine sequence is most likely to produce the designated results. The schema or APP node thus serves as a probe of the image which reveals some visuospatial relation, defined with respect to the result visual routine sequence. The schema or APP node can now be used as both a detector of visuospatial relations of parts of the image, and as a predictive unit of an active visual routine perception architecture.

In contrast to the small fixed set of operations and fixed layers of image processing stages which are used by convolutional neural network architectures (convolution, pooling, and fully-connected layers), an example embodiment of the system has a larger and more varied library of visual processing routines which can be applied in different orders. When given a task of learning to interpret what is in an image with respect to structures and relations which must be inferred, the system learns to compose sequences of visual routines which are most useful to run, in a specific order, to reliably extract the relevant data to accomplish the task. This active visual routine perception architecture creates a space of possible combinations of computational steps of image processing transforms which is much larger than those in the fixed convolutional neural network architectures.

A useful element of an example embodiment disclosed herein is that the library of visual routines includes not just image-parallel operations like convolutions, but also operations which perform more serial processing, inherently, which cannot be done using purely convolutional neural network architectures. Importantly, a focus-of-attention mechanism is tightly integrated with the learning system, and it operates in both a top-down and bottom-up manner. The learning system can actively place attention markers which are used by many visual routines (top down control). The learning system can also take suggestions from the visual routines as to where attention should be focused next (bottom-up control).

FIG. 9G is a prior art display of human eye-tracking data that shows use of different eye motion sequences when solving different visual tasks as disclosed by Yarbus, A., "Eye Movements and Vision," Institute for Problems of Information Transmission Academy of Sciences of the USSR, Moscow, (1967) (hereinafter, "Yarbus"). In FIG. 9G, Yarbus shows a visualization of the different movement patterns the humans use to direct their foveal point of attention using saccadic eye motion while analyzing a scene, depending on the visual task being performed. The human subject uses active control of the eye's motion itself as part of the mechanism for solving different visual tasks presented to them.

The operation of the visual routine attention mechanism can be thought of as behaving in a similar, though more general, manner as saccadic eye motion in humans; many of the sequences of image-processing visual routines start from a point of attention in the scene, and act as a kind of probe of the scene to extract different types of relevant spatial and structural relations to surrounding or connected image features.

According to an example embodiment, a schema or APP node learning engine constructs schemas or APP nodes which encode what the expected results should be after executing a sequence of visual routines, under different starting context conditions. Results and context conditions may be learned functions of Boolean valued input items that are delivered from the output of visual routines and from internal state items (synthetic-items) inside the learning system.

Figure 9H:
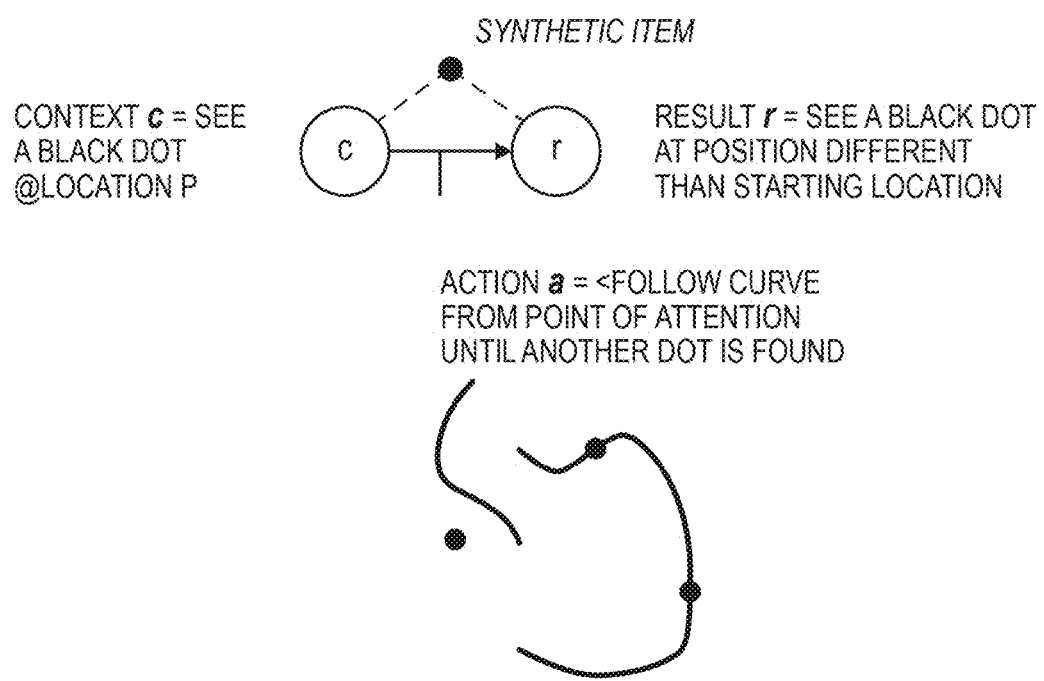
FIG. 9H shows a prior art schema that could be learned by an example embodiment of a system to solve a visual task to find if two dots lie on the same curve.

FIG. 9H shows a prior art schema that could be learned by an example embodiment of a system to solve a visual task to find if two dots lie on the same curve. The schema has a context of starting with attention focused on a black dot that lies on a curve, an action visual routine to follow the curve, and an expected result of seeing a black dot in a different location along the curve than the starting point. A synthetic item for the schema is generated to remember success or failure of the activation of the schema. The example schema in FIG. 9H forms a reusable piece of structural knowledge, that can be used by other schemas to solve more complex visual routines that require the dot finding task as a subtask.

According to an example embodiment, a computer visions learning system performs vision tasks for which convolutional neural networks cannot be efficiently or accurately trained. The kinds of image classification performed by convolutional neural networks is quite limited compared to the kinds of image understanding that a human being can perform. For example, a convolutional neural network cannot be trained to correctly perform the visual cognition tasks such as those disclosed in FIG. 9I, which even a young child can answer.

Figure 9I:
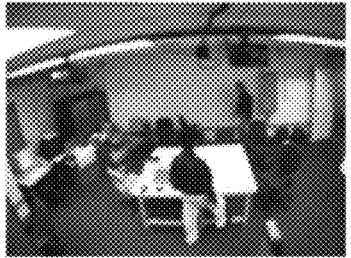
FIG. 9I is a prior art example of difficult visuospatial tasks.
Figure 9I:
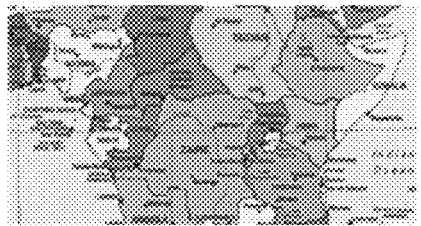
Figure 9I:
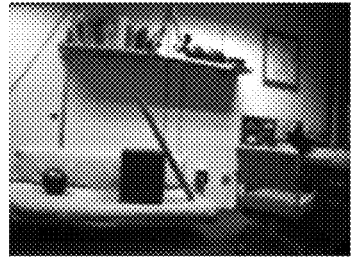
Figure 9I:
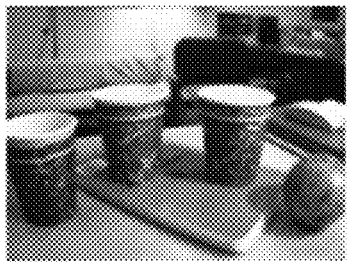
Figure 9I:
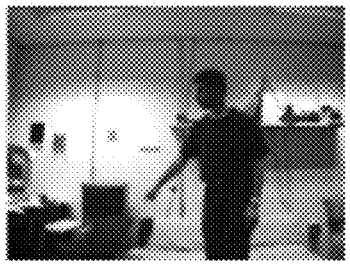
Figure 9I:
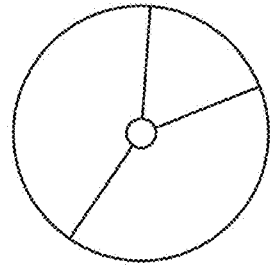
Figure 9I:
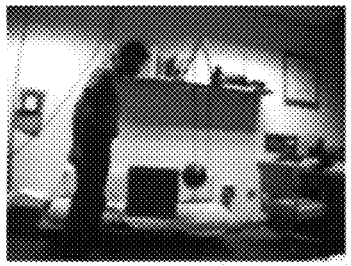
Figure 9I:
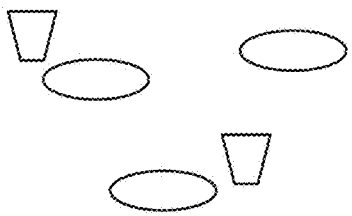
Figure 9I:

FIG. 9I is a prior art example of difficult visuospatial tasks from Ullman. Many of these tasks require some knowledge of the behavior of real physical objects which are represented in an image. For example, asking if a visible object can fit into a container in the scene requires the system to have some representation of the relative size and possible physical interactions between the container and the contained object. A convolutional neural network might be trainable to answer these questions for a particular set of images, but would not be then able to correctly generalize if the objects are allowed to be arbitrarily shaped and positioned. This is because convolutional neural networks are very poor at modeling many kinds of topological and geometric relations between objects in a scene. There are numerous other tasks involving visual information for which a machine learning system cannot be effectively trained by example using present neural network image processing systems, and for which the only approach is still laborious and often unreliable special case programming which interleaves sequences of image processing routines and hand coded logic. Another task which convolutional networks perform poorly at is understanding containment relations of arbitrary objects, such as whether one object is in front of, next to, behind, standing on, or contained in another object as disclosed in FIG. 9J.

Figure 9J:
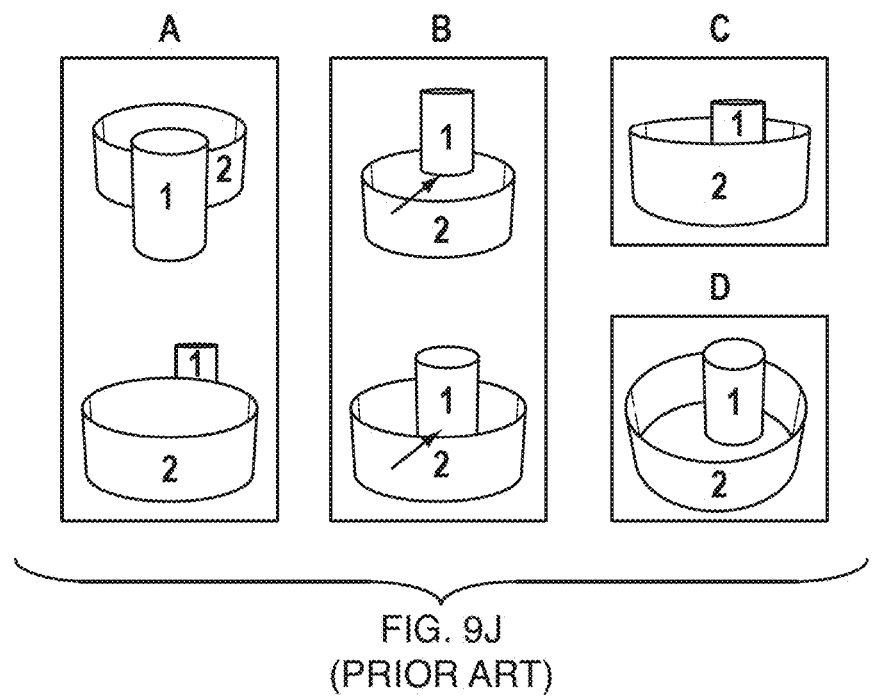
FIG. 9J is a prior art diagram illustrating a task of finding containment relations between objects in a scene.

FIG. 9J is a prior art diagram illustrating a task of finding containment relations between objects in a scene. A system to solve containment problems can be coded using fixed sequences of hand-coded visual routines, such as described in Ullman, Shimon et al., "A model for Discovering 'Containment' Relations," Cognition 183: 67-871 (2019), but that solution suffers from brittleness as progressively wider variations of examples are supplied of real world containers and objects with different illumination, geometry, and shapes. It is useful to have a system which can learn on its own to adjust its application of the visual processing steps to wider variations of objects and background in scenes, learning which combinations of routines to use under different conditions to gather the most reliable evidence to infer what the containment relation of the objects is.

Figure 9K:
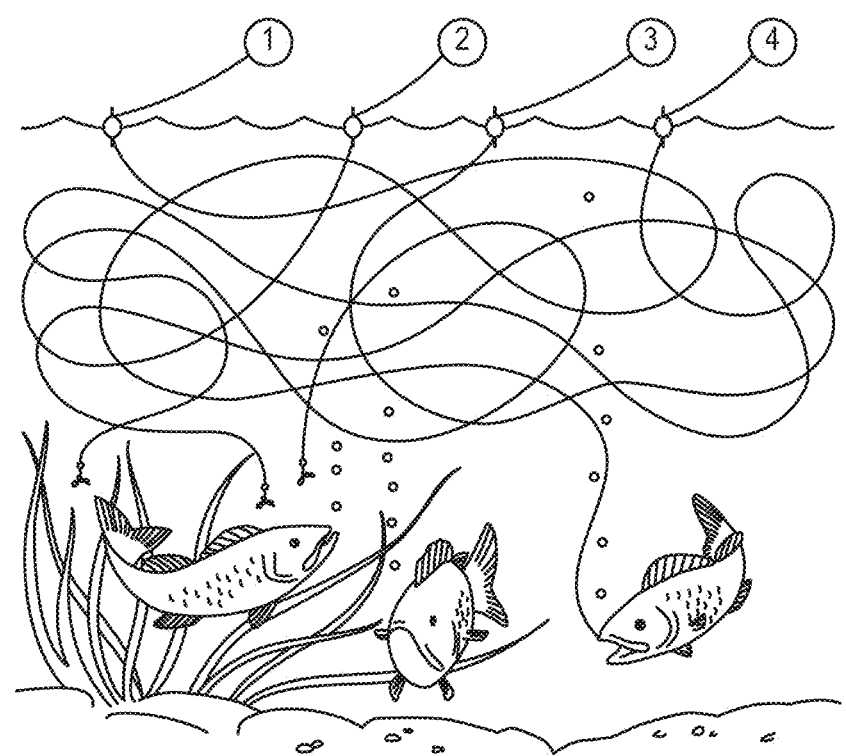
FIG. 9K is an illustration of a prior art children's puzzle.

Similarly, a convolutional network cannot be trained to answer the prior art children's puzzle of FIG. 9K, namely "Which line would you pull to catch the fish?" for arbitrary curve paths of the fishing lines.

FIG. 9K is an illustration of a prior art children's puzzle that may be solved via an example embodiment of action sequence learning and recognition, such as disclosed below.

Action Sequence Learning and Recognition using the Schema Mechanism

According to an example embodiment, to be able to recognize when activities are initiated, underway, or completed, the schema mechanism (APP network, knowledge graph) may use "implicit activation" machinery to identify, within its network (knowledge graph) of schemas (APP nodes), those who appear to be active. One of the ways such implicit activation may operate is that the learning system may check for any schema S (APP node) whose context is satisfied, and then some time later check that the same schema Ss result becomes satisfied. When this happens, the learning system can infer that the schema's action was performed. For non-limiting example, if a block is seen on the floor, and soon after on top of a table, and a schema S (APP node 5) exists for lifting blocks up which describes that starting and ending state, the learning system could infer that schema S was activated, causing the block to be lifted from the floor to the table.

The schema learning system (APP network, knowledge graph) builds more complex composite actions out of simpler ones using the action composition machinery, such as the action-controller 232 of FIG. 2A, disclosed above. It also maintains synthetic state items which represent indirectly perceived latent states of the world (environment), namely world states whose values are not directly provided by the system's raw sensory inputs, but whose existence and state values must be inferred by the learning system. The combination of these mechanisms can be used by the system to learn to recognize which sequences of actions may indicate more complex actions being performed.

For non-limiting example, referring back to FIG. 8, disclosed above, video input from the 3D camera 801 watching the elderly person 883 in bed could be used to understand when they are waking up and attempting to leave the bed, as disclosed above. This activity could be broken down into smaller sub-goals (sub-tasks) that are recognized, such as bringing the body to a sitting position, swinging the legs over the edge of the bed, placing hands on bed to help push the body up, etc.

The learning system may learn first to recognize each of these sub-tasks, and then compactly represent the "getting out of bed" activity as an action with a goal of standing up, and requiring some or all of these sub-tasks to be performed in an ordered sequence. When the system recognizes one or more of these sub-tasks, it can infer that the person 882 is trying to get out of bed, and verify when they have succeeded. Importantly, there may be several different actions and ordered sequences which achieve the same final goal, and all of these would be recognized as "getting out of bed."

By representing an activity such as "getting out of bed" as a goal-oriented action, the system can make use of its powerful schema dependency chaining mechanism (implemented in a schema's action controller, such as the action-controller 232 if FIG. 2A) to both recognize when the activity has been completed, as well as infer from partially observed data that the person 882 is in the process of trying to reach a given goal.

A sequence of actions that need to be performed for the person 882 to "get out of bed," may need to be performed in a certain order. For the system to verify that the actions are performed in a chronological order, an example embodiment may employ the episodic memory 793, disclosed above with regard to FIGS. 7C and 7D, and employ such memory to recall actions which were recently completed, and the order in which they happened.

The synthetic item machinery is capable, in a somewhat constrained way, of representing this kind of sequence of ordered actions, if the sequence is built from progressively longer chains of schema-activation pairs, for non-limiting example, "lying in bed" might be a starting item, and then a schema (APP node) whose meaning is "sit up" might be learned, with the context item "lying in bed," and a result item designating the person's back is now upright. A synthetic item could be instantiated representing that this schema (APP node) had succeeded. Thus, such APP node may represent the first in a chain of states needed to get to the standing position, such as the first APP node 720-1 in the schema sequence of FIG. 7E, disclosed above.

In the example embodiment of FIG. 7E, the first APP node 720-1 and second APP node 720-2 form a schema sequence for "getting out of bed," as disclosed above, with two chained schemas (APP nodes) for non-limiting example. This kind of "prefix chain" learning and recognition can be implemented using just the synthetic item machinery and implicit activation machinery disclosed above. In the example embodiment of FIG. 7E, episodic memory is not employed, this just uses chains of schemas, and synthetic state items, which enforce an ordering due to the context->result dependency chains.

However, an episodic memory system, such as the episodic memory 793, disclosed above, would potentially be a more efficient way to store and retrieve long learned sequences of actions. For example, a child learning the clapping game of "Miss Mary Mack" has to learn an arbitrary series of target hand positions and actions, for which there is no clear purpose except to correctly follow the rules of the game. In this situation, storing sequences of actions in the episodic memory 793 and replaying them or searching for them could be used to more efficiently learn and recognize such longer chains of arbitrary action sequences. The actions themselves are still goal-oriented however, e.g., a single target action/schema may represent, in the non-limiting example, "aiming your right or left hand to hit the right or left hand of the person you are playing with at the right point in the sequence." Some of these repeated sequences may be encapsulated as single, higher level composite-action schemas (APP nodes), disclosed above. It is these sequences that make up the correct performance of such a game.

Multi-Sensor Fusion

In the hand clapping game of the non-limiting example, disclosed above, there is potentially more than visual sensory data coming in as input to a computer vision system monitoring same, where, for example, audio data indicating a successful clap could be integrated into the input state vectors coming into the computer vision system, to allow it to more accurately determine if the game were being played correctly. In less frivolous tasks, such as industrial process monitoring, such multi-sensory input streams may be supplied to the schema (APP node) learning system of the computer vision system and the core marginal attribution (disclosed above) system may be used for learning observed regularities where the world state transitions from an initial to final state, and encapsulate them as schemas (APP nodes). The implicit activation machinery would be used to recognize when these learned regularities occurred, and output this by indicating which schemas (APP nodes) the learning system determined were activated and, hence, which actions were taken, in an observed stream of input states. It should be understood, however, that a computer vision learning system disclosed herein is not limited just to recognizing what actions are being taken.

An example embodiment of a computer vision learning system architecture disclosed herein includes visual routine machinery (including a library of visual routines) that is tightly bound with the APP knowledge network machinery disclosed above. As such, a computer vision learning system described herein is not limited just to recognizing what actions are being taken, but can also infer (deduce, conclude) other latent information from image data (e.g., representing an image or sequence of images) and, thus, has capability that extends beyond current neural network system capability.

According to an example embodiment, a computer vision learning system is designed to allow the schema mechanism (e.g., APP node network) to reason about (e.g., figure out) the function and interaction of seen or inferred function of objects in a scene (e.g., represented by an image or sequence of images), at the right level of granularity, which in many cases is not in terms of complete objects, but of the parts that make them up, and the interaction of the shape, size, or other inferred properties of such parts with other objects.

According to an example embodiment, a computer vision learning system may apply knowledge (e.g., obtained via training) of object behaviors, appearance, and function to answer queries about function and interaction of objects and persons. This knowledge can be used by the system to infer not just if an activity is taking place now, but whether performing a desired task might be possible, or what outcome an action might cause in the context of the image. For example, the computer vision learning system that is based on the schema system (APP node network, knowledge graph) might be asked "Is there something that a person could comfortably sit on?," and it would make certain queries of the visual routines system (visual routines) which look not for predefined objects, but are queries that look for functional relations (as described in various APP nodes) among structures and possibly unfamiliar objects seen in an image or sequence of images.

While a convolutional neural network may recognize an image of a chair after being trained on images of many similar appearing chairs, the schema mechanism (APP node network) connected (in combination) with the visual routines system might be asked a more general question such as to find if there is something in a scene that "a human being could sit on." If the system has been trained previously with knowledge about the action of sitting, it will have context requirements enumerated in different APP nodes of the knowledge graph (APP network) as to required height, orientation, texture and strength of a surface required to support a human comfortably. As such, a computer vision learning system disclosed herein may infer, for non-limiting example, that a tree stump would suffice for sitting, even though the stump does not have legs or a back like all the images of chairs that it had been previously trained on. The computer vision learning system disclosed herein may further infer, for non-limiting example, that a cardboard box may not suffice for sitting because, while the cardboard box may have the right height and shape for sitting, it may collapse if it tried to support the weight of a person.

As such, an example embodiment of a computer vision architecture disclosed herein enables the computer vision learning system to go beyond recognizing static images of objects, and gives the reasoning machinery the capability of extracting the functional behavior of ensembles of objects or object parts in a scene, based on known relations between visual appearance and functional characteristics, in order to answer queries not just about what is happening but what would happen if selected hypothetical conditions or actions were taken, e.g., "Will these two parts fit together?," "Is this pipe able to fit through this hole in the wall?," "Is there enough space to place a container?," "Is there a clear path to move a refrigerator from the front door of a house into the kitchen?," "Is this rope holding all the weight of this object, or is it supported by something else?," the answers (results) of which can then be used, in turn, to answer the question "If I cut this rope will this object fall?" FIG. 10, disclosed below, describes a computer vision learning system with an architecture enabling same.

Figure 10A:
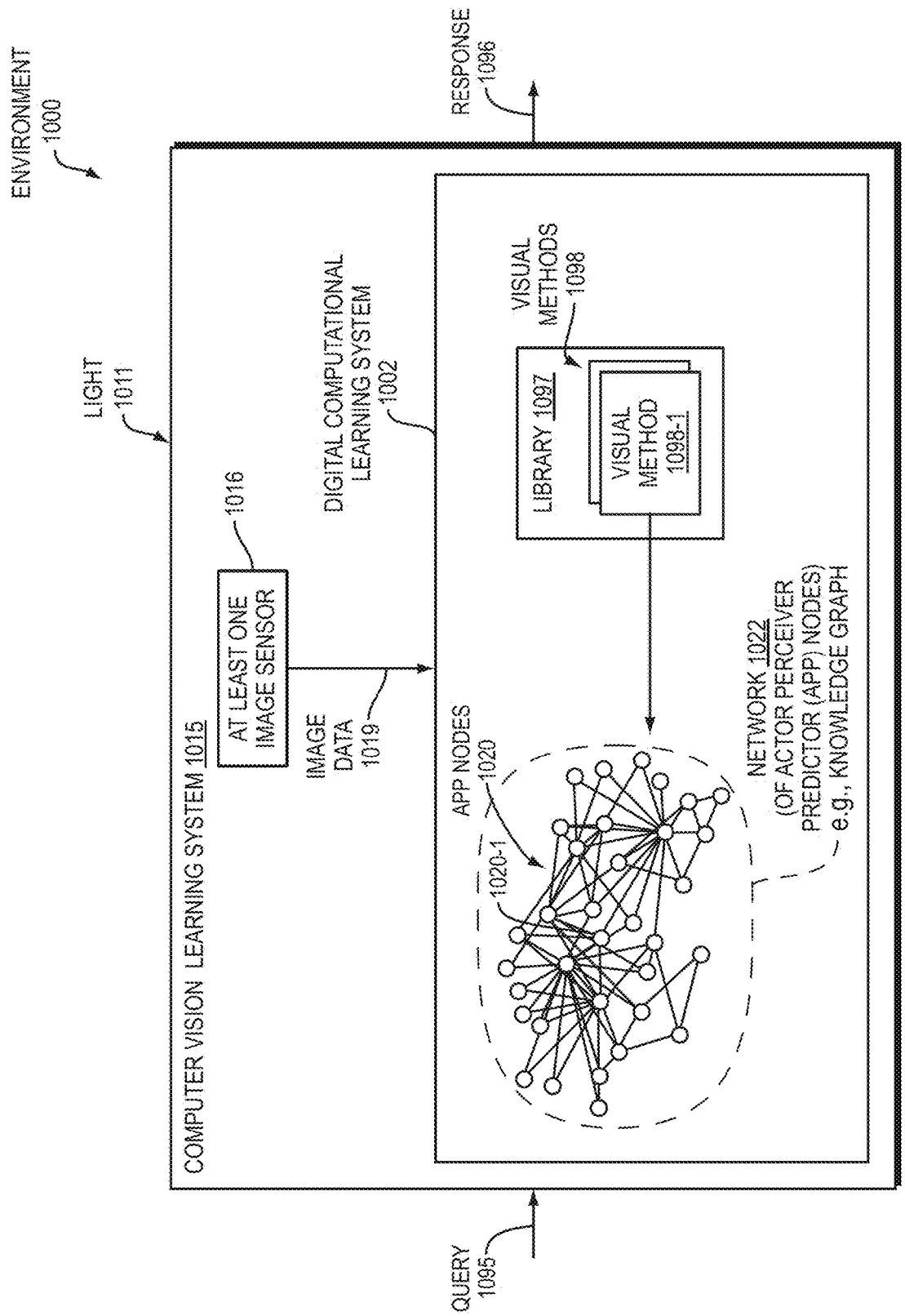
FIG. 10A is a block diagram of another example embodiment of a computer vision learning system operating in an environment.

FIG. 10A is a block diagram of another example embodiment of a computer vision learning system 1015 operating in an environment 1000. According to an example embodiment, the computer vision learning system 1015 comprises at least one image sensor 1016 configured to transform light 1011 sensed from an environment 1000 of the computer vision learning system 1015 into image data 1019 representing a scene (not shown) of the environment 1000. The image data 1019 may represent an image, sequence of images, continuous video stream, or sequence of video segments. The digital computational learning system 1002 is coupled to the at least one image sensor 1016. The digital computational learning system 1002 includes a network 1022 of actor perceiver predictor (APP) nodes 1020 and a library 1097 of visual methods 1098 (visual routines—such as disclosed above for non-limiting example) is available to the APP nodes 1020 for applying to the image data 1019. The digital computational learning system 1002 is configured to employ the network 1022 in combination with the library 1097 to determine a response 1096 to a query 1095 and output the response 1096 determined. The query 1095 is associated with the scene.

The computer vision learning system 1015 may further comprise at least one communications interface. The query 1095 may be a natural language input (speech or text) received via the at least one communications interface, such as any of the queries described above for non-limiting example. The response 1096 may be a natural language output that is output via the at least one communications interface. Examples of such responses are described above for non-limiting example.

Each APP node of the APP nodes 1020 is associated with a context, action, and result, such as disclosed above with regard to FIG. 2C. The result is expected to be achieved in response 1096 to the action being taken as a function of the context having been satisfied.

The action may be at least one visual method (visual routine) of the library 1097 of visual methods 1098 or at least one sequence of a plurality of visual methods 1098 from the library 1097 of visual methods 1098.

At least one APP node of the APP nodes 1020, such as the APP node 1020-1, may have been trained during a learning mode of the digital computational learning system 1002. Such training enables the digital computational learning system 1002 to "know" which visual methods to apply given a task/goal, for example, interpreted from the query 1095. A learning mode and inference mode of the digital computational learning system 1002 is disclosed above. The at least one APP node may be configured to encode expected results to be output by the at least one APP node in response 1096 to applying at least one visual method, such as the visual method 1098-1, from the library 1097 of visual methods 1098 to training image data 1019 under at least one context condition input to the at least one APP node in the learning mode. According to an example embodiment, the visual method 1098 may be include a first set of visual methods and a second set of visual methods, wherein the first set is computationally more expensive relative to the second set and be configured to select from the first set, second set, or combination thereof.

At least a portion of the APP nodes 1020 may be trained based on training image data (not shown) representing at least one scene from a constrained environment. The constrained environment may be a real environment or computer simulated environment.

Each APP node of the APP nodes 1020 may be associated with an action-controller that includes an instance of a planner, such as the action-controller 232 disclosed above with regard to FIG. 2A. The planner includes allied planners, such as the allied planners 234 disclosed above with regard to FIG. 2A. The action-controller may be configured to employ the allied planners to select at least one visual method of the library 1097 of visual methods 1098 for applying to the image data 1019.

The network 1022 of APP nodes 1020 may be configured to select at least one visual method from the library 1097 of visual methods 1098 and apply the at least one visual method selected to the image data 1019. The response 1096 to the query 1095 may be determined based on at least one result produced by at least one APP node of the APP nodes 1020 in response 1096 to applying the at least one visual method selected.

Applying the at least one visual method selected may cause the network 1022 to extract functional behavior associated with at least a portion of an object in the scene, such as described above for non-limiting example. The functional behavior extracted may be based on known relations between visual appearance and functional characteristics of objects. The known relations may be encoded in at least a portion of the APP nodes 1020 of the network 1022 during a learning mode of the digital computational learning system 1002. The at least one result produced may represent the functional behavior extracted.

The network 1022 of APP nodes 1020 may be configured to extract functional behavior associated with at least a portion of an object in the scene. The functional behavior may be based on an inferred interaction of shape, size, or other property of the at least a portion of the object with a different object present or not present in the scene, and wherein the query 1095 is further associated with the different object.

The network 1022 may be a knowledge graph including information associated with object behavior, object appearance, object function, or a combination thereof, such as disclosed above. The query 1095 may be associated with a function of an object or person in the scene or an interaction associated with the object or person, such as disclosed above for non-limiting example.

The computer vision learning system 1015 may further comprise an audio sensor (not shown) configured to transform audio from the environment 1000 to audio data. The digital computational learning system 1002 may be further configured to employ the audio data to determine the response 1096 to the query 1095, such as disclosed above for non-limiting example.

According to another example embodiment, a computer vision learning system 1015 comprises at least one image sensor 1016 configured to transform light 1011 sensed from an environment 1000 of the computer vision learning system 1015 into image data 1019. The image data 1019 may represent an image, sequence of images, continuous video stream, or sequence of video segments. The computer vision learning system 1015 further comprises a digital computational learning system 1002 configured to determine activity-related information (not shown) from the image data 1019 based on a network 1022 of actor perceiver predictor (APP) nodes 1020. The activity-related information is associated with an activity in the environment 1000. The image data 1019 may represent a scene wherein the active is captured (digitally) by the scene. According to an example embodiment, the activity-related information may be determined responsive to the query 1095 and the response 1096 may include the activity-related information. Such activity-related information is disclosed further below for non-limiting example.

The digital computational learning system 1002 may be further configured to determine the activity-related information (which may be included in the response 1096 disclosed above) based on identifying at least one APP node of the APP nodes 1020 in the network 1022 as active based on a context and result of the at least one APP node being satisfied. The context and result are associated with the activity. The context may include a neural network 1022, such as disclosed above with regard to FIG. 2C.

The digital computational learning system 1002 may be further configured to determine that the context of the at least one APP node has been satisfied based on the image data 1019 and, subsequent to a determination that the context of the at least one APP node has been satisfied, determine that the result of the at least one APP node has been satisfied. To determine that the result has been satisfied, the digital computational learning system 1002 may be further configured to identify, from the image data 1019, that an action of the at least one APP node has been performed.

The action may be a sub-action of an overall action associated with an overall goal of the activity. The overall action may represent the activity. The sub-action may be associated with a sub-goal of the overall goal. The sub-goal may be associated with the at least one APP node. The sub-action may be among a plurality of sub-actions of the overall action. The plurality of sub-actions may be associated with at least one ordered sequence. The digital computational learning system 1002 may be further configured to identify, based on the image data 1019 and network 1022 of APP nodes 1020, at least a portion of the at least one ordered sequence. The digital computational learning system 1002 may be further configured to determine status of the activity based on the at least a portion of the at least one ordered sequence identified. The status may indicate whether the activity is in progress or has completed. The activity-related information may represent the status.

The network 1022 of APP nodes 1020 may be a knowledge graph. The digital computational learning system 1002 may include at least one processor configured to learn, automatically, the APP nodes 1020 of the knowledge graph. Each APP node of the APP nodes 1020 may be associated with a respective context, respective action, and respective result. The respective result is expected to be achieved in response 1096 to the action being taken as a function of the context having been satisfied.

The computer vision learning system 1015 further comprises memory, wherein the network 1022 is a knowledge graph stored in the memory, wherein each APP node of the APP nodes 1020 is associated with an action-controller including an instance of a planner that includes allied planners. The action-controller may be associated with a goal state and configured to access the knowledge graph in the memory and employ the allied planners to determine a sequence of actions for reaching the goal state by selecting and chaining, dynamically in the memory, at least a portion of the APP nodes 1020 of the knowledge graph. The sequence of actions may include respective actions of the at least a portion of APP nodes 1020 selected and chained. The sequence of actions may represent the activity or a sub-goal of the activity. The goal state may represent an overall goal associated with the activity or the sub-goal of the overall goal of the activity.

The digital computational learning system 1002 may include an episodic memory and the allied planners may be configured to store the sequence of actions in the episodic memory enabling the allied planners to verify whether a given series of actions represent a sub-activity of the activity in the image data 1019 are performed in accordance with a chronological order of the sequence of actions stored. The episodic memory may be a time-series data structure indexable by time or via associative lookup using partial vector state matching.

The allied planners may include a graph-based planner and a deep Q-learning (DQL) planner, such as disclosed above with regard to FIG. 2A. The graph-based planner may be configured to provide a partial reward to the DQL planner for progressing toward the goal state. The partial reward may be a portion of a total reward for reaching the goal state.

The graph-based planner may be configured to employ a breadth-first search (BFS) method, such as disclosed above with regard to FIG. 4A. The DQL planner may be a DQL neural network 1022. The instance of the planner may further include an auxiliary network 1022. The auxiliary network 1022 may be configured to decide whether to trust the graph-based planner or the DQL planner.

The digital computational learning system 1002 may further comprise a library 1097 of visual methods 1098 for applying to the image data 1019. The APP nodes 1020 may be configured to encode results expected after executing a sequence of the visual methods 1098 under different starting context conditions of the environment 1000.

The digital computational learning system 1002 may be further configured to automatically select a given visual method from the library 1097 and apply the given visual method selected to the image data 1019. The given visual method may be selected, dynamically, by an action-controller of a given APP node of the APP nodes 1020, such as the action-controller 232 disclosed above with regard to FIG. 2A.

The digital computational learning system 1002 may further comprise an attention control system (not shown) configured to place attention markers in the image data 1019. The attention markers may identify a respective location in the image data 1019 and a respective visual-image processing method of the library 1097 of image-processing methods for the digital computational learning system 1002 to apply at the location.

The digital computational learning system 1002 may be further configured to automatically select a plurality of visual methods 1098 from the library 1097 and apply the plurality of visual methods 1098 selected, sequentially, to the image data 1019. The plurality of visual methods 1098 selected may be employed as actions of at least a portion of the APP nodes 1020. Respective results of the at least a portion of the APP nodes 1020 resulting from taking the actions may enable the digital computational learning system 1002 to determine the activity-related information.

The digital computational learning system 1002 may be further configured to maintain synthetic state items. The synthetic items represent perceived latent state of the environment 1000 computed by the APP nodes 1020 in the network 1022 based on the image data 1019.

The computer vision learning system 1015 may further comprise an audio sensor (not shown) configured to transform audio from the environment 1000 to audio data. The digital computational learning system 1002 may be further configured to determine the activity-related information based on the audio data such as disclosed above for non-limiting example.

The activity-related information determined may include status of the activity, the status indicating that the activity has started, stopped, or completed.

The digital computational learning system 1002 may be further configured to compute a length of time taken to complete the activity. The activity-related information determined may include the length of time computed.

The activity-related information determined may indicate that a new activity has begun, the new activity different from the activity.

The digital computational learning system 1002 may be further configured to produce a prediction that a sub-activity of the activity is expected to be performed in the environment 1000. The activity-related information determined may include the prediction produced. The predication produced may be based on a sub-activated value of a given APP node of the APP nodes 1020. The sub-activated value may represent a simulated value of an actual value of the given APP node if the given APP node were to become active based on the image data 1019.

The digital computational learning system 1002 may be further configured to access a rule memory. The rule memory may include safety rules, compliance rules, or a combination thereof. The activity-related information may be determined based on (i) matching the activity or sub-components thereof with the safety rules, compliance rules, or the combination thereof, (ii) matching the safety rules, compliance rules, or the combination thereof with a manner in which the activity or sub-components thereof are performed in the image data 1019, or (i) and (ii).

The computer vision learning system 1015 may further comprise a plurality of sensors configured to produce multi-sensor data from input from the environment 1000. The plurality of sensors includes the image sensor 1016. The multi-sensor data produced includes the image data 1019. The activity-related information may be further determined based on the multi-sensor data produced.

The digital computational learning system 1002 may be further configured to generate an electronic report including the activity-related information determined. The digital computational learning system 1002 may be further configured to generate the electronic report in accordance with a schedule. The schedule may include at least one of: daily reporting, weekly reporting, or monthly reporting.

The computer vision learning system 1015 may further comprise a user interface. The digital computational learning system 1002 may be further configured to output, via the user interface, natural language representing the activity-related information determined.

Figure 10B:
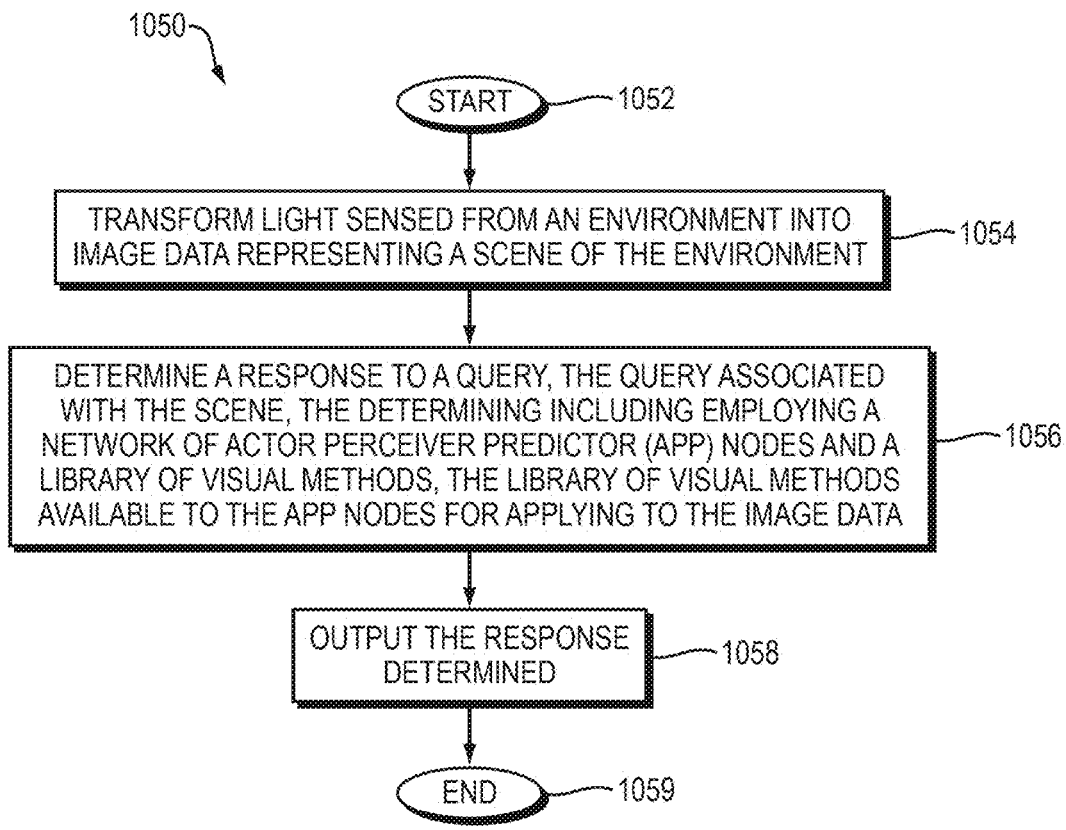
FIG. 10B is a flow diagram of an example embodiment of a computer-implemented method.

FIG. 10B is a flow diagram 1050 of an example embodiment of a computer-implemented method that may be implemented by an example embodiment of computer vision learning system disclosed herein, such as the computer vision learning system 1015 disclosed above. The computer-implemented method begins (1052) and transforms (1054) light sensed from an environment into image data representing a scene of the environment. The computer-implemented method comprises determining (1056) a response to a query, the query associated with the scene. The determining includes employing a network of actor perceiver predictor (APP) nodes and a library of visual routines. The library of visual routines is available to the APP nodes for applying to the image data. The computer-implemented method outputs (1058) the response determined and ends (1059) in the example embodiment.

The query may be a natural language input received via at least one communications interface. The response may be a natural language output. The computer-implemented method may further comprise outputting the response via the at least one communications interface. Each APP node of the APP nodes is associated with a context, action, and result, wherein the result is expected to be achieved in response to the action being taken as a function of the context having been satisfied. The action may be at least one visual routine of the library of visual routines or at least one sequence of a plurality of visual routines from the library of visual routines.

The computer-implemented method may further comprise encoding, in at least one APP node of the APP nodes, expected results to be output by the at least one APP node in response to applying at least one visual routine from the library of visual routines to training image data under at least one context condition input to the at least one APP node.

The computer-implemented method may further comprise training at least a portion of the APP nodes based on training image data representing at least one scene from a constrained environment. The constrained environment may be a real environment or computer simulated environment.

The computer-implemented method may further comprise selecting, by at least one APP node, at least one visual routine of the library of visual routines and applying the at least one visual routine selected to the image data.

The computer-implemented method may further comprise selecting, via the network, at least one visual routine from the library of visual routines, applying the at least one visual routine selected to the image data, and determining the response to the query based on at least one result produced by at least one APP node of the APP nodes in response to the applying. The applying causes the network to extract functional behavior associated with at least a portion of an object in the scene. The functional behavior may be extracted based on known relations between visual appearance and functional characteristics of objects. The known relations may be encoded in at least a portion of the APP nodes. The at least one result produced may represent the functional behavior extracted.

The computer-implemented method may further comprise extracting, via the network of APP nodes, functional behavior associated with at least a portion of an object in the scene. The functional behavior may be based on an inferred interaction of shape, size, or other property of the at least a portion of the object with a different object present or not present in the scene. The query may be further associated with the different object.

The network of APP nodes may be a knowledge graph including information associated with object behavior, object appearance, object function, or a combination thereof. The query may be associated with a function of an object or person in the scene or an interaction associated with the object or person.

The computer-implemented method may further comprise transforming audio from the environment to audio data. The determining may include employing the audio data to determine the response to the query. The image data may represent an image, sequence of images, continuous video stream, or sequence of video segments.

Figure 10C:
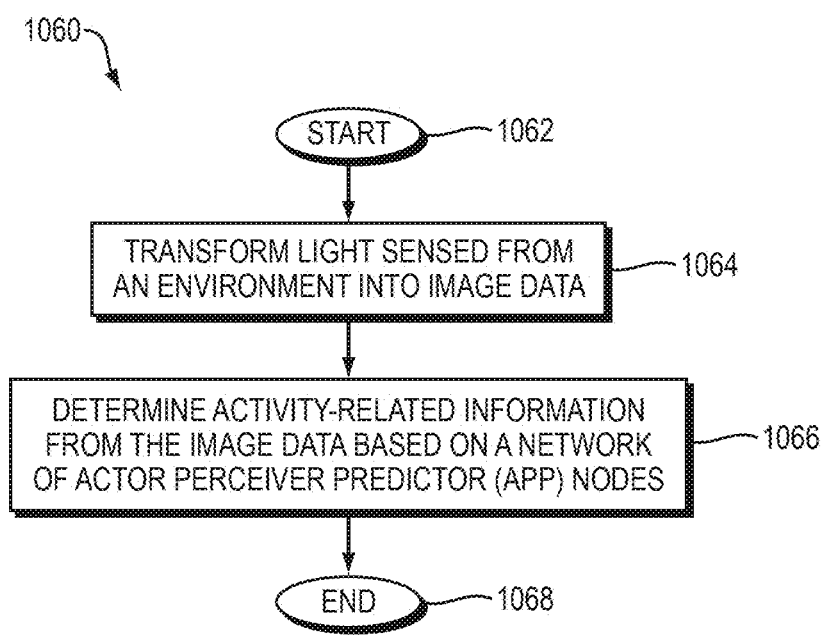
FIG. 10C is a flow diagram of another example embodiment of a computer-implemented method.

FIG. 10C is a flow diagram 1060 of another example embodiment of a computer-implemented method. The computer-implemented method begins (1062) and transforms (1064) light sensed from an environment into image data. The method determines (1066) activity-related information from the image data based on a network of actor perceiver predictor (APP) nodes, the activity-related information associated with an activity in the environment. The determining includes identifying at least one APP node of the APP nodes in the network as active based on a context and result of the at least one APP node being satisfied. The context and result are associated with the activity. The method thereafter ends (1068) in the example embodiment.

The computer-implemented method may further comprise determining that the context of the at least one APP node has been satisfied based on the image data and, subsequent to a determination that the context of the at least one APP node has been satisfied, the computer-implemented method may further comprise determining that the result of the at least one APP node has been satisfied. Such determining may include identifying, from the image data, that an action of the at least one APP node has been performed.

The action may be a sub-action of an overall action associated with an overall goal of the activity, wherein the overall action represents the activity, wherein the sub-action is associated with a sub-goal of the overall goal, and wherein the sub-goal is associated with the at least one APP node. The sub-action may be among a plurality of sub-actions of the overall action, wherein the plurality of sub-actions may be associated with at least one ordered sequence. The computer-implemented method may further comprise identifying, based on the image data and network of APP nodes, at least a portion of the at least one ordered sequence. The computer-implemented method may further comprise determining status of the activity based on the at least a portion of the at least one ordered sequence identified. The status may indicate whether the activity is in progress or has completed. The activity-related information may represent the status.

The network of APP nodes may be a knowledge graph. The computer-implemented method may further comprise learning, automatically, the APP nodes of the knowledge graph. Each APP node of the APP nodes may be associated with a respective context, respective action, and respective result. The respective result is expected to be achieved in response to the action being taken as a function of the context having been satisfied. The knowledge graph may be stored in a memory. Each APP node of the APP nodes may be associated with an action-controller including an instance of a planner that includes allied planners. The action-controller may be associated with a goal state. The computer-implemented method further may further comprise, by the action-controller, accessing the knowledge graph in the memory and employing the allied planners to determine a sequence of actions for reaching the goal state by selecting and chaining, dynamically in the memory, at least a portion of the APP nodes of the knowledge graph. The sequence of actions may include respective actions of the at least a portion of APP nodes selected and chained. The sequence of actions may represent the activity or a sub-goal of the activity. The goal state may represent an overall goal associated with the activity or the sub-goal of the overall goal of the activity.

The computer-implemented method may further comprise storing a sequence of actions in an episodic memory and verifying whether a given series of actions representing a sub-activity of the activity in the image data are performed in accordance with a chronological order of the sequence of actions stored. The episodic memory may be a time-series data structure indexable by time or via associative lookup using partial vector state matching.

The computer-implemented method may further comprise accessing a library of visual methods available for applying to the image data. The APP nodes may include encoded results expected after executing a sequence of the visual methods under different starting context conditions of the environment.

The computer-implemented method may further comprise automatically (responsively) selecting a given visual method from the library and applying the given visual method selected to the image data. The given visual method may be selected, dynamically, by an action-controller of a given APP node of the APP nodes.

The computer-implemented method may further comprise placing attention markers in the image data. The attention markers may identify a respective location in the image data and respective visual-image processing method of the library of image-processing methods for applying at the location.

The computer-implemented method may further comprise automatically selecting a plurality of visual methods from the library and applying the plurality of visual methods selected, sequentially, to the image data. The plurality of visual methods selected may be employed as actions of at least a portion of the APP nodes. The computer-implemented method may further comprise determining the activity-related information from respective results of the at least a portion of the APP nodes resulting from taking the actions.

The computer-implemented method may further comprise computing perceived latent state of the environment by the APP nodes in the network. The computing may be based on the image data. The computer-implemented method may further comprise maintaining synthetic state items. The synthetic items represent the perceived latent state.

The computer-implemented method may further comprise transforming audio from the environment to audio data and determining the activity-related information based on the audio data.

The image data may represent an image, sequence of images, continuous video stream, or sequence of video segments. The activity-related information determined may include status of the activity. The status may indicate that the activity has started, stopped, or completed. The computer-implemented method may further comprise computing a length of time taken to complete the activity. The activity-related information determined may include the length of time computed. The activity-related information determined may indicate that a new activity has begun, the new activity different from the activity.

The computer-implemented method may further comprise producing a prediction that a sub-activity of the activity is expected to be performed in the environment. The activity-related information determined may include the prediction produced. Such producing may be based on a sub-activated value of a given APP node of the APP nodes. The sub-activated value may represent a simulated value of an actual value of the given APP node if the given APP node were to become active based on the image data.

The computer-implemented method may further comprise accessing a rule memory, the rule memory including safety rules, compliance rules, or a combination thereof. The activity-related information that is determined may be based on (i) matching the activity or sub-components thereof with the safety rules, compliance rules, or the combination thereof, (ii) matching the safety rules, compliance rules, or the combination thereof with a manner in which the activity or sub-components thereof are performed in the image data, or (i) and (ii).

The computer-implemented method may further comprise producing multi-sensor data from input from the environment. The multi-sensor data produced may include the image data. Determining the activity-related information may be further based on the multi-sensor data produced.

The computer-implemented method may further comprise generating an electronic report including the activity-related information determined. The computer-implemented method may further comprise generating the electronic report in accordance with a schedule. The schedule may include at least one of: daily reporting, weekly reporting, or monthly reporting.

The computer-implemented method may further comprise outputting, via a user interface, natural language representing the activity-related information determined.

FIG. 11 is a block diagram of an example of the internal structure of a computer 1100 in which various embodiments of the present disclosure may be implemented. The computer 1100 contains a system bus 1102, where a bus is a set of hardware lines used for data transfer. The system bus 1102 is essentially a shared conduit that connects different elements of a computer system (e.g., processor, disk storage, memory, input/output ports, network ports, etc.) that enables the transfer of information between the elements. Coupled to the system bus 1102 is an I/O interface 1104 for connecting various I/O devices (e.g., camera, microphone, keyboard, mouse, display monitors, printers, speakers, etc.) to the computer 1100. A network interface 1106 allows the computer 1100 to connect to various other devices attached to a network. Memory 1108 provides volatile or non-volatile storage for computer software instructions 1110 and data 1112 that may be used to implement an example embodiment of the present disclosure, where the volatile and non-volatile memories are examples of non-transitory media. Disk storage 1114 provides non-volatile storage for computer software instructions 1110 and data 1112 that may be used to implement embodiments (e.g., method of the flow diagrams 600, 620, 640, 660, 1050, 1060) of the present disclosure. A central processor unit 1118 is also coupled to the system bus 1102 and provides for the execution of computer instructions. The computer software instructions 1110 may cause the central processor unit 1118 to implement methods (e.g., method of the flow diagrams 600, 620, 640, 660, 1050, 1060) disclosed herein.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods and techniques described herein. It should be understood that elements of the block and flow diagrams may be implemented in software or hardware, such as via one or more arrangements of circuitry of FIG. 11, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

Example embodiments disclosed herein may be employed in a variety of use cases. For non-limiting example, an example embodiment of a learning agent disclosed herein may be employed in a simulated hand-eye sensorimotor system that can manipulate toy blocks on surface. The simulated hand-eye sensorimotor system may perform initial experiments in a "blocks" world of a computer application. An example embodiment of a learning agent disclosed herein may also benefit a specific application, such as a software assistant/robotic process automation (RPA).

An example embodiment disclosed herein may be employed in an AI that learns complex business logic to aid a user for non-limiting example. The AI may provide goal awareness and an ability to model user intention. According to an example embodiment, complex business logic can be automatically scanned and understood by a learning agent that may then present a simplified interface to a user and such simplified interface may be less prone to error and easier to use. For non-limiting example, such goal awareness may include determining a high-level knowledge of user intent, such as setting reinvest dividends and/or setting minimum quantity. The learning agent can find and suggest a new path if an obstacle is encountered, such as a change to a business form. The learning agent can provide explainability, such as by communicating via a user interface why a suggestion is being made. The learning agent integrates planning with learning and learns multiple pathways to achieve a goal and may utilized ground natural language, thus, communicating via natural language that is grounded in a user's actions.

An example embodiment disclosed herein provides an AI system that uses an advanced computer vision and learning system, such as disclosed above with regard to FIGS. 10A-C, that understands, for non-limiting example, that a staff person (e.g., manufacturing line operator, health-care staff person, construction-site worker): a) is stopping an activity, b) has completed that activity, c) is beginning a new activity, and can: d) measure the length of time taken to complete the activity, e) match sub-components of the activity and/or the way they are executed to existing safety or compliance rules, f) add information from additional sensors attached to the machines being used, or other people in the area to do any or all of the above, and can be configured for non-limiting example to g) supply a daily, weekly, monthly report on the catalogued information described above to i) support decision making and ii) save staff/operator time thereby lowering costs. The advanced computer vision and learning system may be used to monitor operations of an assembly line, count how many times a day a particular process happens, providing operational insight for improving a manufacturing process. As such, the advanced computer vision and learning system may be employed to solve problems, represented as visual tasks for non-limiting example, in the form of a query. The advanced computer vision and learning system may be employed, for non-limiting example, to monitor a workplace for efficiency/safety by being able to interpret meaning from image content and answer questions regarding same, for non-limiting example. The advanced computer vision and learning system can apply visual routines (methods) repeatedly to image data to, for example, find a shortest path between points in a maze of plausible paths. Such a shortest path may be scoped out by a composite action machinery, disclosed above, which may select a sequence(s) of visual routines for applying to the image data for solving such a problem. It should be understood that such example and use cases of system(s) disclosed herein are for non-limiting example.

It should be understood that example embodiments disclosed herein may be combined a manner not explicitly disclosed herein.

The teachings of all patents, published applications and references cited herein are incorporated by reference in their entirety While example embodiments have been particularly shown and described, it will be understood by those skilled in the art that various changes in form and details may be made therein without departing from the scope of the embodiments encompassed by the appended claims.

What is claimed is:

1. A computer vision learning system comprising:
at least one image sensor configured to transform light sensed from an environment of the computer vision learning system into image data; and
a digital computational learning system configured to determine activity-related information from the image data based on a network of actor perceiver predictor (APP) nodes, the activity-related information associated with an activity in the environment,
the digital computational learning system further configured to determine the activity-related information based on identifying at least one APP node of the APP nodes in the network of APP nodes as active based on a context and a result of the at least one APP node being satisfied, the context and the result associated with the activity, wherein the network of APP nodes is a knowledge graph stored in a memory of the computer vision learning system, wherein each APP node of the APP nodes is associated with an action-controller including an instance of a planner that includes allied planners, the action-controller associated with a goal state and configured to:

access the knowledge graph in the memory, and employ the allied planners to determine a sequence of actions for reaching the goal state by selecting and chaining, dynamically in the memory, at least one portion of the APP nodes of the knowledge graph, the sequence of actions including respective actions of the at least one portion of the APP nodes selected and chained, the sequence of actions representing the activity or a sub-activity of the activity, and the goal state representing an overall goal associated with the activity or a sub-goal of the overall goal of the activity; and wherein the allied planners include a graph-based planner and a deep Q-learning (DQL) planner, the graph-based planner configured to provide a partial reward to the DQL planner for progressing toward the goal state, wherein the partial reward is a portion of a total reward for reaching the goal state.

2. The computer vision learning system of claim 1, wherein the digital computational learning system is further configured to:

determine that the context of the at least one APP node has been satisfied based on the image data; and subsequent to a determination that the context of the at least one APP node has been satisfied, determine that the result of the at least one APP node has been satisfied, wherein, to determine that the result has been satisfied, the digital computational learning system is further configured to identify, from the image data, that an action of the at least one APP node has been performed.

3. The computer vision learning system of claim 2, wherein the action is a sub-action of an overall action associated with the overall goal of the activity, wherein the overall action represents the activity, wherein the sub-action is associated with the sub-goal of the overall goal, and wherein the sub-goal is associated with the at least one APP node.

4. The computer vision learning system of claim 3, wherein the sub-action is among a plurality of sub-actions of the overall action, wherein the plurality of sub-actions is associated with at least one ordered sequence, and wherein the digital computational learning system is further configured to:

identify, based on the image data and the network of APP nodes, at least one portion of the at least one ordered sequence; and determine a status of the activity based on the at least one portion of the at least one ordered sequence identified, the status indicating whether the activity is in progress or has completed, the activity-related information representing the status.

5. The computer vision learning system of claim 1, wherein the digital computational learning system includes at least one processor configured to learn, automatically, the APP nodes of the knowledge graph, each APP node of the APP nodes is associated with a respective context, respective action, and respective result, the respective result expected to be achieved in response to the respective action being taken as a function of the respective context having been satisfied.

6. The computer vision learning system of claim 1, wherein the graph-based planner is configured to employ a breadth-first search (BFS) method, wherein the DQL planner is a DQL neural network, and wherein the instance of the planner further includes an auxiliary network, the auxiliary network configured to decide whether to trust the graph-based planner or the DQL planner.

7. The computer vision learning system of claim 1, wherein the digital computational learning system includes an episodic memory and wherein the allied planners are configured to store the sequence of actions in the episodic memory enabling the allied planners to verify whether a given series of actions representing a sub-activity of the activity in the image data are performed in accordance with a chronological order of the sequence of actions stored.

8. The computer vision learning system of claim 7, wherein the episodic memory is a time-series data structure indexable by time or via associative lookup using partial vector state matching.

9. The computer vision learning system of claim 1, wherein the digital computational learning system further comprises a library of visual image processing methods for applying to the image data and wherein the APP nodes are configured to encode results expected after executing a sequence of the visual image processing methods under different starting context conditions of the environment.

10. The computer vision learning system of claim 9, wherein the digital computational learning system is further configured to automatically select a given visual image processing method from the library and apply the given visual image processing method selected to the image data, the given visual image processing method selected, dynamically, by an action-controller of a given APP node of the APP nodes.

11. The computer vision learning system of claim 9, wherein the digital computational learning system further comprises an attention control system configured to place attention markers in the image data, the attention markers identifying a respective location in the image data and a respective visual image processing method of the library of visual image processing methods for the digital computational learning system to apply at the location.

12. The computer vision learning system of claim 9, wherein the digital computational learning system is further configured to automatically select a plurality of visual image processing methods from the library and apply the plurality of visual image processing methods selected, sequentially, to the image data, the plurality of visual image processing methods selected employed as actions of at least a second portion of the APP nodes, and wherein respective results of the at least second portion of the APP nodes resulting from taking the actions enable the digital computational learning system to determine the activity-related information.

13. The computer vision learning system of claim 1, wherein the digital computational learning system is further configured to maintain synthetic state items, the synthetic state items representing perceived latent states of the environment computed by the APP nodes in the network based on the image data.

14. The computer vision learning system of claim 1, further comprising an audio sensor configured to transform audio from the environment to audio data and wherein the digital computational learning system is further configured to determine the activity-related information based on the audio data.

15. The computer vision learning system of claim 1, wherein the image data represents an image, sequence of images, continuous video stream, or sequence of video segments.

16. The computer vision learning system of claim 1, wherein the activity-related information determined includes a status of the activity, the status indicating that the activity has started, stopped, or completed.

17. The computer vision learning system of claim 1, wherein the digital computational learning system is further configured to compute a length of time taken to complete the activity and wherein the activity-related information determined includes the length of time computed.

18. The computer vision learning system of claim 1, wherein the activity-related information determined indicates that a new activity has begun, the new activity different from the activity.

19. The computer vision learning system of claim 1, wherein the digital computational learning system is further configured to produce a prediction that a sub-activity of the activity is expected to be performed in the environment, wherein the activity-related information determined includes the prediction produced, wherein the prediction produced is based on a sub-activated value of a given APP node of the APP nodes, the sub-activated value representing a simulated value of an actual value of the given APP node if the given APP node were to become active based on the image data.

20. The computer vision learning system of claim 1, wherein the digital computational learning system is further configured to access a rule memory, the rule memory including safety rules, compliance rules, or a combination thereof, and wherein the activity-related information is determined based on (i) matching the activity or sub-components thereof with the safety rules, compliance rules, or the combination thereof, (ii) matching the safety rules, compliance rules, or the combination thereof with a manner in which the activity or sub-components thereof are performed in the image data, or (i) and (ii).

21. The computer vision learning system of claim 1, further comprising a plurality of sensors configured to produce multi-sensor data from input from the environment, the plurality of sensors including the at least one image sensor, wherein the multi-sensor data produced includes the image data, and wherein the activity-related information is further determined based on the multi-sensor data produced.

22. The computer vision learning system of claim 1, wherein the digital computational learning system is further configured to generate an electronic report including the activity-related information determined.

23. The computer vision learning system of claim 22, wherein the digital computational learning system is further configured to generate the electronic report in accordance with a schedule, the schedule including at least one of: daily reporting, weekly reporting, or monthly reporting.

24. The computer vision learning system of claim 1, further comprising a user interface and wherein the digital computational learning system is further configured to output, via the user interface, natural language representing the activity-related information determined.

25. The computer vision learning system of claim 1, wherein the context includes a neural network.

26. A computer-implemented method comprising:
transforming light sensed from an environment into image data; and
determining activity-related information from the image data based on a network of actor perceiver predictor (APP) nodes, the activity-related information associated with an activity in the environment, the determining including identifying at least one APP node in the network of APP nodes as active based on a context and a result of the at least one APP node being satisfied, the context and the result associated with the activity,
wherein the network of APP nodes is a knowledge graph stored in a memory, wherein each APP node of the APP nodes is associated with an action-controller including an instance of a planner that includes allied planners, the action-controller associated with a goal state, and wherein the computer-implemented method further comprises, by the action-controller:
accessing the knowledge graph in the memory; and
employing the allied planners to determine a sequence of actions for reaching the goal state by selecting and chaining, dynamically in the memory, at least one portion of the APP nodes of the knowledge graph, the sequence of actions including respective actions of the at least one portion of the APP nodes selected and chained, the sequence of actions representing the activity or a sub-activity of the activity, and the goal state representing an overall goal associated with the activity or a sub-goal of the overall goal of the activity; and
wherein the allied planners include a graph-based planner and a deep Q-learning (DQL) planner, the graph-based planner providing a partial reward to the DQL planner for progressing toward the goal state, wherein the partial reward is a portion of a total reward for reaching the goal state.

27. The computer-implemented method of claim 26, further comprising:
determining that the context of the at least one APP node has been satisfied based on the image data; and
subsequent to a determination that the context of the at least one APP node has been satisfied, determining that the result of the at least one APP node has been satisfied, wherein determining that result has been satisfied includes identifying, from the image data, that an action of the at least one APP node has been performed.

28. The computer-implemented method of claim 27, wherein the action is a sub-action of an overall action associated with the overall goal of the activity, wherein the overall action represents the activity, wherein the sub-action is associated with the sub-goal of the overall goal, and wherein the sub-goal is associated with the at least one APP node.

29. The computer-implemented method of claim 28, wherein the sub-action is among a plurality of sub-actions of the overall action, wherein the plurality of sub-actions is associated with at least one ordered sequence, and wherein the computer-implemented method further comprises:
identifying, based on the image data and the network of APP nodes, at least one portion of the at least one ordered sequence; and
determining a status of the activity based on the at least one portion of the at least one ordered sequence identified, the status indicating whether the activity is in progress or has completed, the activity-related information representing the status.

30. The computer-implemented method of claim 26, wherein the computer-implemented method further comprises learning, automatically, the APP nodes of the knowledge graph, wherein each APP node of the APP nodes is associated with a respective context, respective action, and respective result, the respective result expected to be achieved in response to the respective action being taken as a function of the respective context having been satisfied.

31. The computer-implemented method of claim 26, further comprising storing a sequence of actions in an episodic memory and verifying whether a given series of actions representing a sub-activity of the activity in the image data are performed in accordance with a chronological order of the sequence of actions stored.

32. The computer-implemented method of claim 31, wherein the episodic memory is a time-series data structure indexable by time or via associative lookup using partial vector state matching.

33. The computer-implemented method of claim 26, further comprising accessing a library of visual image processing methods available for applying to the image data, the APP nodes including encoded results expected after executing a sequence of the visual image processing methods under different starting context conditions of the environment.

34. The computer-implemented method of claim 33, further comprising automatically selecting a given visual image processing method from the library and applying the given visual image processing method selected to the image data, the given visual image processing method selected, dynamically, by an action-controller of a given APP node of the APP nodes.

35. The computer-implemented method of claim 34, further comprising placing attention markers in the image data, the attention markers identifying a respective location in the image data and a respective visual image processing method of the library of visual image processing methods for applying at the location.

36. The computer-implemented method of claim 34, further comprising automatically selecting a plurality of visual image processing methods from the library and applying the plurality of visual image processing methods selected, sequentially, to the image data, the plurality of visual image processing methods selected employed as actions of at least a second portion of the APP nodes, and determining the activity-related information from respective results of the at least second portion of the APP nodes resulting from taking the actions.

37. The computer-implemented method of claim 26, further comprising computing perceived latent states of the environment by the APP nodes in the network, the computing based on the image data, and maintaining synthetic state items, the synthetic state items representing the perceived latent states.

38. The computer-implemented method of claim 26, further comprising transforming audio from the environment to audio data and determining the activity-related information based on the audio data.

39. The computer-implemented method of claim 26, wherein the image data represents an image, sequence of images, continuous video stream, or sequence of video segments.

40. The computer-implemented method of claim 26, wherein the activity-related information determined includes a status of the activity, the status indicating that the activity has started, stopped, or completed.

41. The computer-implemented method of claim 26, further comprising computing a length of time taken to complete the activity and wherein the activity-related information determined includes the length of time computed.

42. The computer-implemented method of claim 26, wherein the activity-related information determined indicates that a new activity has begun, the new activity different from the activity.

43. The computer-implemented method of claim 26, further comprising producing a prediction that a sub-activity of the activity is expected to be performed in the environment, wherein the activity-related information determined includes the prediction produced, wherein the producing is based on a sub-activated value of a given APP node of the APP nodes, the sub-activated value representing a simulated value of an actual value of the given APP node if the given APP node were to become active based on the image data.

44. The computer-implemented method of claim 26, further comprising accessing a rule memory, the rule memory including safety rules, compliance rules, or a combination thereof, and wherein the activity-related information is determined based on (i) matching the activity or sub-components thereof with the safety rules, compliance rules, or the combination thereof, (ii) matching the safety rules, compliance rules, or the combination thereof with a manner in which the activity or sub-components thereof are performed in the image data, or (i) and (ii).

45. The computer-implemented method of claim 26, further comprising producing multi-sensor data from input from the environment, wherein the multi-sensor data produced includes the image data, and wherein determining the activity-related information is further based on the multi-sensor data produced.

46. The computer-implemented method of claim 26, further comprising generating an electronic report including the activity-related information determined.

47. The computer-implemented method of claim 46, further comprising generating the electronic report in accordance with a schedule, the schedule including at least one of: daily reporting, weekly reporting, or monthly reporting.

48. The computer-implemented method of claim 26, further comprising outputting, via a user interface, natural language representing the activity-related information determined.

* * * * *